(12) United States Patent
Donegan et al.

(10) Patent No.: US 10,463,025 B2
(45) Date of Patent: Nov. 5, 2019

(54) REVERSIBLE INSERT FOR BIRD FEEDER

(71) Applicant: Classic Brands, LLC, Denver, CO (US)

(72) Inventors: Robert Donegan, Denver, CO (US); James Carter, Denver, CO (US); Bryan Krueger, Denver, CO (US)

(73) Assignee: Classic Brands, LLC, Denver, CO (US)

( * ) Notice: Subject to any disclaimer, the term of this patent is extended or adjusted under 35 U.S.C. 154(b) by 104 days.

(21) Appl. No.: 14/514,196

(22) Filed: Oct. 14, 2014

(65) Prior Publication Data

US 2015/0027377 A1    Jan. 29, 2015

Related U.S. Application Data

(63) Continuation-in-part of application No. 13/107,841, filed on May 13, 2011, now Pat. No. 8,857,374.

(60) Provisional application No. 61/330,842, filed on May 3, 2010.

(51) Int. Cl.
*A01K 61/02* (2006.01)
*A01K 39/012* (2006.01)

(52) U.S. Cl.
CPC .................................. *A01K 39/012* (2013.01)

(58) Field of Classification Search
USPC ......... 119/57.8, 52.2, 51.01, 52.1, 429, 52.3, 119/464, 52.4, 57.9, 74, 537, 72; D30/124–128, 121; 221/44, 241, 304; 222/142.2, 142.3–142.9
See application file for complete search history.

(56) References Cited

U.S. PATENT DOCUMENTS

| | | | |
|---|---|---|---|
| 110,473 A | * | 12/1870 | Kennedy ............... A47G 19/24 222/142.3 |
| 117,807 A | | 8/1871 | Orndoff |
| D8,908 S | | 1/1876 | Wiley |
| 276,392 A | | 4/1883 | Gregory |
| 447,006 A | | 2/1891 | Sweeney |
| 632,167 A | | 8/1899 | Biesmeyer |
| 727,597 A | | 5/1903 | Day |
| 813,954 A | | 2/1906 | Davis |
| D43,781 S | | 4/1913 | Sanford |

(Continued)

OTHER PUBLICATIONS

Non-Final Office Action, U.S. Appl. No. 13/107,841, dated Jun. 27, 2012, 9 pages.

(Continued)

*Primary Examiner* — Andrea M Valenti
(74) *Attorney, Agent, or Firm* — Polsinelli PC

(57) ABSTRACT

Implementations described and claimed herein provide systems and methods for attracting different types of wild birds, as chosen by a user. In one implementation, a top section is configured to engage a cap, and a bottom section positioned opposite the top section includes at least one feeding station. A supporting member extends vertically from the bottom section to the top section. The supporting member, the top section, and the bottom section form a frame. A reversible insert has an elongated body extending between a first edge and a second edge. The first edge has a plurality of ports, and the second edge one or more slots. The frame is adapted to receive the reversible insert in an orientation based on a size of the bird seed.

9 Claims, 42 Drawing Sheets

(56) References Cited

U.S. PATENT DOCUMENTS

| | | | |
|---|---|---|---|
| 1,166,100 A | * | 12/1915 | Unknown .............. A01K 31/14 119/428 |
| 1,251,935 A | | 1/1918 | Stevens |
| D63,321 S | | 11/1923 | Pirson |
| 1,558,316 A | | 10/1925 | Tipple |
| 1,634,569 A | | 7/1927 | Bray |
| 1,716,432 A | | 6/1929 | Qualmann |
| D81,602 S | | 7/1930 | Teague |
| 1,791,956 A | | 2/1931 | Cowles |
| D87,460 S | | 8/1932 | Cook |
| 1,879,318 A | | 9/1932 | Klein |
| 1,891,042 A | | 12/1932 | Benoit |
| D109,128 S | | 4/1938 | Copeman |
| D115,321 S | | 6/1939 | Pueschel |
| 2,283,373 A | | 5/1942 | Krafft |
| 2,350,922 A | | 6/1944 | Planeta |
| 2,417,178 A | | 3/1947 | Ritter |
| D153,759 S | | 5/1949 | Blatt |
| 2,510,721 A | | 6/1950 | Smith |
| 2,531,915 A | | 11/1950 | Maly |
| D164,692 S | | 10/1951 | Kelly |
| D165,799 S | | 1/1952 | Stedman |
| D167,179 S | | 7/1952 | Stewart |
| 2,634,705 A | | 4/1953 | Mayes |
| D170,150 S | | 8/1953 | Kowap |
| D173,658 S | | 12/1954 | Jones |
| 2,696,803 A | | 12/1954 | Deffenbaugh |
| D174,139 S | | 3/1955 | Sadler |
| 2,725,663 A | | 12/1955 | Mullen |
| D178,917 S | | 10/1956 | England et al. |
| 2,773,474 A | | 12/1956 | Nugent |
| 2,786,446 A | | 3/1957 | Newman |
| D180,686 S | | 7/1957 | Everett |
| 2,804,844 A | | 9/1957 | Gigliotti |
| 2,887,987 A | | 5/1959 | Fitzgerald |
| D185,456 S | | 6/1959 | Michalek et al. |
| 2,891,508 A | | 6/1959 | Bower |
| 2,944,516 A | | 7/1960 | Malloy, Sr. |
| 2,971,671 A | | 2/1961 | Shakman |
| 2,987,041 A | | 6/1961 | Bard |
| 3,022,768 A | | 2/1962 | Lynch |
| 3,051,126 A | | 8/1962 | Merritt et al. |
| 3,051,303 A | | 8/1962 | Daanen |
| D193,558 S | | 9/1962 | Parry |
| D194,750 S | | 3/1963 | Dahmus |
| 3,090,354 A | | 5/1963 | Merritt et al. |
| 3,136,296 A | | 6/1964 | Luin |
| 3,145,690 A | | 8/1964 | Bachman |
| D199,995 S | | 1/1965 | Knodt |
| D200,778 S | | 4/1965 | Pregont |
| 3,244,150 A | | 4/1966 | Blair |
| 3,295,498 A | * | 1/1967 | Brown .................. A01K 31/14 119/429 |
| D206,975 S | | 2/1967 | Dawson |
| 3,307,602 A | | 3/1967 | Boster |
| 3,316,884 A | | 5/1967 | Viggars |
| 3,372,676 A | | 3/1968 | Williams |
| D216,002 S | | 11/1969 | Stone |
| D216,361 S | | 12/1969 | Pappas, Jr. |
| 3,499,413 A | | 3/1970 | Heard |
| D217,470 S | | 5/1970 | Morrow |
| 3,526,335 A | | 9/1970 | Swett et al. |
| 3,693,310 A | | 9/1972 | Middleton |
| D230,948 S | | 3/1974 | Moon |
| D234,180 S | | 1/1975 | Dart et al. |
| D235,744 S | | 7/1975 | England |
| 3,901,192 A | | 8/1975 | Adams |
| 3,967,576 A | | 7/1976 | Soerensen |
| 3,977,363 A | | 8/1976 | Fisher, Jr. |
| D241,699 S | | 10/1976 | Barecki |
| D241,860 S | | 10/1976 | Calamia |
| D244,786 S | | 6/1977 | Dryden |
| D244,883 S | | 6/1977 | Rohrmuller |
| 4,030,451 A | | 6/1977 | Miller |
| D245,349 S | | 8/1977 | Fisher, Jr. |
| D245,643 S | | 8/1977 | Orfei |
| D245,927 S | | 9/1977 | Edwards et al. |
| D248,006 S | | 5/1978 | Christian |
| D249,726 S | | 9/1978 | Cosman |
| 4,144,842 A | | 3/1979 | Schlising |
| 4,167,917 A | * | 9/1979 | Noll ...................... A01K 39/014 119/429 |
| 4,188,913 A | | 2/1980 | Earl et al. |
| 4,194,714 A | | 3/1980 | Schultz |
| 4,201,155 A | | 5/1980 | Hyde, Jr. |
| D257,179 S | | 9/1980 | Campo |
| 4,223,637 A | | 9/1980 | Keefe |
| D258,338 S | | 2/1981 | Gersin |
| D259,143 S | | 5/1981 | Aktinson |
| D260,843 S | | 9/1981 | Laird et al. |
| 4,327,669 A | | 5/1982 | Blasbalg |
| 4,328,605 A | | 5/1982 | Hutchison et al. |
| 4,331,104 A | | 5/1982 | Clarke |
| D266,611 S | | 10/1982 | Metts et al. |
| D267,355 S | | 12/1982 | Blasbalg |
| D268,056 S | | 2/1983 | Campbell-Kelly et al. |
| D268,362 S | | 3/1983 | Wong |
| 4,389,975 A | | 6/1983 | Fisher, Jr. |
| D272,507 S | | 2/1984 | Conti |
| D272,508 S | | 2/1984 | Conti |
| 4,434,745 A | * | 3/1984 | Perkins .............. A01K 39/0106 119/57.9 |
| 4,444,324 A | | 4/1984 | Grenell |
| D274,013 S | | 5/1984 | Sun |
| D274,563 S | | 7/1984 | Blasbalg |
| 4,466,376 A | | 8/1984 | Wells |
| D276,510 S | | 11/1984 | Bent et al. |
| D277,514 S | | 2/1985 | Bescherer |
| D277,739 S | | 2/1985 | Grammas et al. |
| D278,168 S | | 3/1985 | Latham et al. |
| D278,751 S | | 5/1985 | Seager |
| D282,019 S | | 12/1985 | Kilham |
| D284,033 S | | 5/1986 | Brodsky |
| D285,840 S | | 9/1986 | Poon |
| D289,210 S | | 4/1987 | Tucker et al. |
| D289,211 S | | 4/1987 | Riha |
| 4,664,066 A | | 5/1987 | Steuernagel et al. |
| D290,769 S | | 7/1987 | Taylor |
| D290,773 S | | 7/1987 | Liethen |
| 4,682,461 A | | 7/1987 | Sizemore |
| D292,372 S | | 10/1987 | Sykes |
| 4,712,512 A | | 12/1987 | Schreib et al. |
| 4,732,112 A | | 3/1988 | Fenner et al. |
| 4,738,221 A | | 4/1988 | Nock |
| D297,074 S | | 8/1988 | Burke et al. |
| 4,798,172 A | | 1/1989 | Clarke |
| D299,770 S | | 2/1989 | Coffer |
| 4,821,681 A | | 4/1989 | Tucker |
| D300,882 S | | 5/1989 | Olson |
| 4,896,628 A | | 1/1990 | Kadunce |
| 4,901,673 A | | 2/1990 | Overstreet |
| 4,938,168 A | | 7/1990 | Meidell |
| D309,858 S | | 8/1990 | Meyersburg |
| D313,169 S | | 12/1990 | Scott et al. |
| 4,974,547 A | | 12/1990 | Graham |
| 4,986,219 A | | 1/1991 | Harris |
| 4,989,548 A | | 2/1991 | Short et al. |
| 4,996,947 A | | 3/1991 | Petrides |
| 5,033,411 A | | 7/1991 | Brucker |
| D324,436 S | | 3/1992 | Embree |
| 5,094,417 A | | 3/1992 | Creed |
| 5,105,765 A | | 4/1992 | Loken |
| D326,003 S | | 5/1992 | Embree |
| D326,286 S | | 5/1992 | Kerivan |
| 5,115,343 A | | 5/1992 | Bennett |
| 5,140,945 A | | 8/1992 | Barnhart et al. |
| D329,892 S | | 9/1992 | Brister |
| 5,168,830 A | | 12/1992 | Deglis |
| D334,133 S | | 3/1993 | Hartzheim |
| 5,191,857 A | | 3/1993 | Boaz |
| D334,635 S | | 4/1993 | Wenstrand |
| 5,207,180 A | | 5/1993 | Graham |
| D337,271 S | | 7/1993 | Pezzoli et al. |
| D338,317 S | | 8/1993 | Woodward |

(56) References Cited

U.S. PATENT DOCUMENTS

| | | |
|---|---|---|
| 5,247,904 A | 9/1993 | Anderson |
| 5,255,631 A | 10/1993 | Anderson |
| 5,265,557 A | 11/1993 | Lovitz |
| 5,269,242 A | 12/1993 | Toldi |
| D343,030 S | 1/1994 | Harwick, Jr. |
| 5,289,796 A | 3/1994 | Armstrong |
| 5,291,855 A | 3/1994 | Laverty |
| D349,981 S | 8/1994 | Fasino |
| D351,691 S | 10/1994 | Lipton |
| D351,692 S | 10/1994 | Cossey |
| D352,575 S | 11/1994 | Bransky et al. |
| D352,787 S | 11/1994 | Hulse |
| 5,361,723 A | 11/1994 | Burleigh |
| D354,079 S | 1/1995 | Shapiro |
| D355,006 S | 1/1995 | Lo |
| D360,495 S | 7/1995 | Sanderson |
| D360,829 S | 8/1995 | Leeds |
| D365,893 S | 1/1996 | Thorp |
| D366,413 S | 1/1996 | Tober |
| 5,479,879 A | 1/1996 | Blek |
| 5,490,480 A | 2/1996 | Dumond |
| D370,311 S * | 5/1996 | Logan, Jr. .................. D30/110 |
| D370,313 S | 5/1996 | Nottingham et al. |
| D370,315 S | 5/1996 | Miller |
| D371,226 S | 6/1996 | Lee |
| D371,227 S | 6/1996 | Lee |
| D371,230 S | 6/1996 | Nottingham et al. |
| D371,979 S | 7/1996 | Nottingham et al. |
| 5,533,467 A | 7/1996 | Lancia |
| 5,558,040 A | 9/1996 | Colwell et al. |
| D376,731 S | 12/1996 | Lin |
| D380,066 S | 6/1997 | Green et al. |
| 5,655,477 A | 8/1997 | Hoffman et al. |
| D383,878 S | 9/1997 | Merino et al. |
| D384,443 S | 9/1997 | Olfert |
| D384,505 S | 10/1997 | Stewart |
| D386,834 S | 11/1997 | Nissim et al. |
| D386,835 S | 11/1997 | Passamare |
| D386,836 S | 11/1997 | Hunt |
| 5,682,835 A | 11/1997 | Walter et al. |
| D388,312 S | 12/1997 | Sorkin |
| 5,701,841 A | 12/1997 | Fasino |
| 5,711,247 A | 1/1998 | Henshaw |
| D390,490 S | 2/1998 | Ruderick |
| 5,729,949 A | 3/1998 | Hartzheim |
| 5,746,156 A * | 5/1998 | Petrides .................. A01K 31/14 119/428 |
| 5,775,256 A | 7/1998 | Henshaw |
| 5,782,200 A | 7/1998 | Knowles et al. |
| D397,529 S | 8/1998 | Fuller et al. |
| D399,611 S | 10/1998 | Ericson et al. |
| 5,829,382 A | 11/1998 | Garrison |
| D406,307 S | 3/1999 | Kang |
| D408,420 S | 4/1999 | Buter |
| 5,947,054 A | 9/1999 | Liethen |
| D414,901 S | 10/1999 | Cirelli |
| D420,176 S | 2/2000 | Heinzeroth |
| D421,709 S | 3/2000 | Haslem et al. |
| D425,259 S | 5/2000 | Lang |
| 6,071,867 A | 6/2000 | Purcell et al. |
| 6,079,361 A | 6/2000 | Bowell et al. |
| D428,437 S | 7/2000 | Hmelar et al. |
| D428,537 S | 7/2000 | Miller |
| 6,095,087 A | 8/2000 | Bloedorn |
| 6,119,627 A | 9/2000 | Banyas et al. |
| D431,760 S | 10/2000 | Sullivan |
| D433,633 S | 11/2000 | La Fata |
| 6,145,477 A | 11/2000 | Jansen |
| D434,980 S | 12/2000 | Suzuki |
| D435,666 S | 12/2000 | Barsomian |
| D440,361 S | 4/2001 | Colwell |
| 6,213,054 B1 | 4/2001 | Marshall |
| 6,253,706 B1 | 7/2001 | Sloop |
| D448,290 S | 9/2001 | Schultz et al. |
| 6,305,321 B1 | 10/2001 | Potente |
| D451,251 S | 11/2001 | Chrisco et al. |
| D452,929 S | 1/2002 | Perelli |
| 6,360,690 B1 | 3/2002 | Canby |
| 6,408,788 B1 | 6/2002 | Lieb et al. |
| D459,840 S | 7/2002 | Lian |
| 6,415,737 B2 | 7/2002 | Banyas et al. |
| 6,418,878 B1 | 7/2002 | Cathell et al. |
| D461,827 S | 8/2002 | Koebbe |
| 6,427,629 B1 | 8/2002 | Lush |
| D462,172 S | 9/2002 | Aurelio, Jr. |
| D462,286 S | 9/2002 | Perelli |
| 6,450,120 B1 | 9/2002 | Nylen |
| 6,457,439 B1 | 10/2002 | Engelking |
| D466,255 S | 11/2002 | Kuelbs |
| D466,656 S | 12/2002 | Kuelbs et al. |
| D467,513 S | 12/2002 | Neff |
| D468,368 S | 1/2003 | Jones |
| D470,630 S | 2/2003 | Kuelbs |
| D471,327 S | 3/2003 | Kuelbs |
| D472,490 S | 4/2003 | Perelli |
| 6,543,384 B2 | 4/2003 | Cote |
| 6,546,894 B2 | 4/2003 | Chrisco et al. |
| D475,128 S | 5/2003 | Svendsen et al. |
| 6,561,126 B2 | 5/2003 | Carter |
| 6,584,933 B1 | 7/2003 | Stone |
| 6,591,781 B2 | 7/2003 | Hardison |
| D478,475 S | 8/2003 | Backes et al. |
| 6,622,654 B2 | 9/2003 | Fasino |
| D480,291 S | 10/2003 | Sorkin |
| D482,262 S | 11/2003 | Sorkin |
| 6,659,041 B1 | 12/2003 | Curts |
| D485,930 S | 1/2004 | Chen |
| D490,576 S | 5/2004 | Rich et al. |
| D491,019 S | 6/2004 | Marsden et al. |
| D491,443 S | 6/2004 | Lowery |
| D493,053 S | 7/2004 | Snell |
| D495,900 S | 9/2004 | Mayse |
| 6,789,916 B2 | 9/2004 | Ruggles |
| 6,792,891 B1 | 9/2004 | Coburn et al. |
| D497,226 S | 10/2004 | Nauert |
| D497,406 S | 10/2004 | King |
| D497,458 S | 10/2004 | Nauert |
| D499,515 S | 12/2004 | Schulzw et al. |
| D500,243 S | 12/2004 | Turek |
| 6,830,009 B1 | 12/2004 | Kuelbs |
| D500,668 S | 1/2005 | Kelly et al. |
| D503,019 S | 3/2005 | Swift et al. |
| 6,863,024 B1 | 3/2005 | Obenshain |
| 6,866,004 B1 | 3/2005 | Lush |
| D504,547 S | 4/2005 | Nauert |
| D504,746 S | 5/2005 | Lee |
| D505,521 S | 5/2005 | Schrodt |
| D505,755 S | 5/2005 | Lundstrom et al. |
| 6,895,894 B2 | 5/2005 | Fort, II |
| 6,901,882 B2 | 6/2005 | Kuelbs |
| D509,325 S | 9/2005 | Jung et al. |
| 6,945,192 B2 | 9/2005 | Cote |
| D511,866 S | 11/2005 | Lundstrom et al. |
| D512,661 S | 12/2005 | Morris et al. |
| D512,800 S | 12/2005 | Jung et al. |
| 6,986,322 B2 | 1/2006 | Lumpkin et al. |
| D514,319 S | 2/2006 | King et al. |
| D515,748 S | 2/2006 | Jung et al. |
| D515,916 S | 2/2006 | Bleuer |
| D516,413 S | 3/2006 | Anderson et al. |
| 7,017,517 B2 | 3/2006 | Paquette |
| 7,017,521 B2 | 3/2006 | Kuelbs |
| D518,380 S | 4/2006 | Moran |
| 7,021,241 B2 | 4/2006 | Nock |
| 7,032,538 B1 | 4/2006 | Lush |
| 7,032,539 B1 | 4/2006 | Obenshain |
| D522,180 S | 5/2006 | Goria, II |
| D523,141 S | 6/2006 | Massey |
| D524,490 S | 7/2006 | Obenshain |
| 7,086,352 B2 | 8/2006 | Goodger |
| 7,096,821 B2 | 8/2006 | Ruff |
| 7,168,392 B2 | 1/2007 | Kuelbs |
| D535,445 S | 2/2007 | Obenshain |
| 7,185,605 B1 | 3/2007 | Lush |

(56) References Cited

U.S. PATENT DOCUMENTS

| | | | |
|---|---|---|---|
| D540,349 S | 4/2007 | Waki | |
| D542,659 S | 5/2007 | Meether et al. | |
| D542,982 S | 5/2007 | Wendell | |
| D543,256 S | 5/2007 | Chen | |
| D544,153 S * | 6/2007 | Obenshain | D30/125 |
| D544,942 S | 6/2007 | Chen | |
| 7,234,416 B2 | 6/2007 | Hoff | |
| D546,506 S * | 7/2007 | Barszcz | D30/124 |
| D548,587 S | 8/2007 | DuVal et al. | |
| 7,258,075 B1 | 8/2007 | Jones et al. | |
| 7,261,056 B2 | 8/2007 | Hunter et al. | |
| D551,952 S | 10/2007 | Palmer | |
| 7,278,613 B2 | 10/2007 | Roy | |
| 7,287,486 B2 | 10/2007 | Hunter | |
| D556,568 S | 12/2007 | DuVal | |
| D557,595 S | 12/2007 | Ernst et al. | |
| 7,302,911 B1 | 12/2007 | Lush | |
| D558,567 S | 1/2008 | Ismert et al. | |
| D561,021 S | 2/2008 | DuVal et al. | |
| D561,040 S | 2/2008 | Sequeira | |
| D567,098 S | 4/2008 | Sequeira | |
| D568,754 S | 5/2008 | Sequeira | |
| 7,370,607 B2 | 5/2008 | O'Dell | |
| 7,373,901 B2 | 5/2008 | Baynard | |
| D575,118 S | 8/2008 | Bignon | |
| D575,591 S | 8/2008 | Bonetti | |
| 7,409,922 B1 | 8/2008 | Baynard et al. | |
| D578,379 S | 10/2008 | Sorkin | |
| D581,183 S | 11/2008 | Kutscha et al. | |
| D581,259 S | 11/2008 | Portz | |
| 7,448,346 B2 | 11/2008 | Stone et al. | |
| 7,451,580 B2 | 11/2008 | Kelly et al. | |
| 7,469,656 B2 | 12/2008 | Hunter et al. | |
| 7,484,475 B2 | 2/2009 | Milliner | |
| 7,503,282 B1 | 3/2009 | Lush | |
| 7,506,611 B1 | 3/2009 | Lush | |
| D590,541 S | 4/2009 | Chaoui | |
| 7,516,716 B2 | 4/2009 | Puckett et al. | |
| D591,589 S | 5/2009 | Myers et al. | |
| D592,046 S | 5/2009 | Myers et al. | |
| D592,362 S | 5/2009 | Rutherford et al. | |
| 7,530,330 B1 | 5/2009 | Valle | |
| D594,737 S | 6/2009 | Kelly et al. | |
| 7,540,260 B2 | 6/2009 | Rich et al. | |
| 7,540,262 B2 | 6/2009 | Kuelbs | |
| 7,549,394 B2 | 6/2009 | Nock | |
| D596,033 S | 7/2009 | Zach et al. | |
| D599,159 S | 9/2009 | Stein | |
| D600,099 S | 9/2009 | Dahlin | |
| 7,610,875 B2 | 11/2009 | Webber | |
| D606,447 S | 12/2009 | West et al. | |
| D606,708 S | 12/2009 | McMullen | |
| D607,612 S | 1/2010 | Yang | |
| D609,064 S | 2/2010 | Najaryan et al. | |
| D609,864 S | 2/2010 | Tsai | |
| 7,654,225 B2 | 2/2010 | Madsen et al. | |
| D612,108 S | 3/2010 | Torres et al. | |
| D612,730 S | 3/2010 | Rushe | |
| 7,669,553 B2 | 3/2010 | White et al. | |
| D614,019 S | 4/2010 | Goodman et al. | |
| D616,040 S | 5/2010 | Spencer | |
| D616,288 S | 5/2010 | Simon et al. | |
| 7,721,677 B1 | 5/2010 | McClaskey | |
| 7,726,259 B2 | 6/2010 | Hepp et al. | |
| 7,739,982 B2 | 6/2010 | Cote | |
| 7,743,732 B2 | 6/2010 | Webber | |
| D620,074 S | 7/2010 | Muhlenbruck | |
| D621,241 S | 8/2010 | Mirer et al. | |
| D621,268 S | 8/2010 | Morabito | |
| D622,910 S | 8/2010 | Puckett | |
| D623,805 S | 9/2010 | Vosbikian | |
| 7,798,099 B2 | 9/2010 | Vosbikian | |
| 7,874,264 B2 | 1/2011 | McMullen | |
| D632,952 S | 2/2011 | Dablemont | |
| D635,844 S | 4/2011 | Boothby | |
| D636,238 S | 4/2011 | Elmelund | |
| 7,930,994 B2 | 4/2011 | Stone et al. | |
| D638,501 S | 5/2011 | Fishman | |
| D638,588 S | 5/2011 | Vosbikian | |
| 7,958,845 B2 | 6/2011 | Gardner | |
| D643,442 S | 8/2011 | Sato et al. | |
| D643,855 S | 8/2011 | Taniguchi et al. | |
| D644,090 S | 8/2011 | Sittig | |
| 7,997,434 B2 | 8/2011 | Benetti | |
| 8,006,642 B2 | 8/2011 | Vosbikian | |
| 8,028,460 B2 | 10/2011 | Kelly et al. | |
| D649,299 S | 11/2011 | Lush | |
| D649,302 S | 11/2011 | Hickok | |
| D650,261 S | 12/2011 | McDuff et al. | |
| 8,070,380 B2 | 12/2011 | Pucillo et al. | |
| D652,059 S | 1/2012 | Sato et al. | |
| D656,690 S | 3/2012 | Tu | |
| D657,399 S | 4/2012 | Nemoto | |
| 8,156,894 B1 | 4/2012 | Krah | |
| D658,684 S | 5/2012 | Roman | |
| D664,307 S | 7/2012 | Krueger et al. | |
| D664,437 S | 7/2012 | Barel | |
| 8,230,809 B2 | 7/2012 | Cote | |
| 8,245,666 B2 | 8/2012 | Sena et al. | |
| D667,294 S | 9/2012 | Wang | |
| D667,573 S | 9/2012 | Yamamoto et al. | |
| 8,272,607 B2 | 9/2012 | Bonnema | |
| 8,276,541 B2 | 10/2012 | LoRocco et al. | |
| D671,276 S | 11/2012 | Krueger | |
| D671,277 S | 11/2012 | Vosbikian et al. | |
| D671,692 S | 11/2012 | Carter | |
| 8,347,818 B2 | 1/2013 | Cowger et al. | |
| D676,614 S | 2/2013 | Fields et al. | |
| D677,016 S | 2/2013 | Carter | |
| 8,413,605 B2 | 4/2013 | Baynard et al. | |
| 8,857,374 B1 * | 10/2014 | Donegan | A01K 39/012 |
| | | | 119/52.2 |
| 2003/0033985 A1 | 2/2003 | Hardison | |
| 2003/0136347 A1 | 7/2003 | Fasino | |
| 2003/0226514 A1 | 12/2003 | Cote | |
| 2004/0098942 A1 | 5/2004 | Lee et al. | |
| 2004/0134436 A1 * | 7/2004 | Fort, II | A01K 39/012 |
| | | | 119/57.8 |
| 2004/0216684 A1 | 11/2004 | Obenshain | |
| 2004/0231606 A1 | 11/2004 | Nock | |
| 2004/0250777 A1 | 12/2004 | Stachowiak | |
| 2004/0261726 A1 | 12/2004 | Lumpkin | |
| 2005/0120967 A1 | 6/2005 | Ruff | |
| 2005/0257749 A1 | 11/2005 | Kuelbs | |
| 2005/0263085 A1 | 12/2005 | Rich | |
| 2006/0207512 A1 * | 9/2006 | Fort, II | A01K 39/012 |
| | | | 119/57.8 |
| 2006/0225658 A1 | 10/2006 | Baynard | |
| 2006/0266295 A1 | 11/2006 | McDarren | |
| 2006/0272585 A1 | 12/2006 | O'Dell | |
| 2007/0034160 A1 | 2/2007 | Nock | |
| 2007/0163506 A1 | 7/2007 | Bloedorn | |
| 2007/0227453 A1 | 10/2007 | Puckett et al. | |
| 2007/0227454 A1 | 10/2007 | Fahey | |
| 2007/0266951 A1 | 11/2007 | Berns | |
| 2008/0022936 A1 | 1/2008 | Stone et al. | |
| 2008/0078329 A1 | 4/2008 | Hunter et al. | |
| 2008/0105206 A1 | 5/2008 | Rich et al. | |
| 2008/0127902 A1 | 6/2008 | Bent et al. | |
| 2008/0134979 A1 | 6/2008 | Crocker | |
| 2008/0210172 A1 | 9/2008 | Waikas | |
| 2008/0276874 A1 | 11/2008 | Evans | |
| 2008/0302304 A1 | 12/2008 | Mayfield | |
| 2009/0020075 A1 | 1/2009 | Wood et al. | |
| 2009/0071408 A1 | 3/2009 | Wechsler | |
| 2009/0223456 A1 | 9/2009 | Hunter et al. | |
| 2009/0260576 A1 | 10/2009 | Vosbikian | |
| 2009/0283046 A1 | 11/2009 | Black | |
| 2009/0304900 A1 | 12/2009 | Augustin | |
| 2010/0061091 A1 | 3/2010 | Galipeau et al. | |
| 2010/0089330 A1 | 4/2010 | McMullen | |
| 2010/0258054 A1 | 10/2010 | Frazier | |
| 2010/0288200 A1 | 11/2010 | Lush | |
| 2011/0067637 A1 | 3/2011 | Baynard | |

(56) References Cited

U.S. PATENT DOCUMENTS

| | | |
|---|---|---|
| 2011/0073043 A1 | 3/2011 | Dault |
| 2011/0083609 A1 | 4/2011 | Cote |
| 2011/0088626 A1 | 4/2011 | Hepp et al. |
| 2011/0180004 A1 | 7/2011 | Humphries et al. |
| 2011/0226186 A1 | 9/2011 | Hunter et al. |
| 2012/0037080 A1 | 2/2012 | Hepp et al. |
| 2012/0055410 A1 | 3/2012 | Cote Paul |
| 2012/0234249 A1 | 9/2012 | Gaze |
| 2013/0125826 A1* | 5/2013 | Meter .................. A01K 39/00 119/302 |

OTHER PUBLICATIONS

Response to Non-Final Office Action, U.S. Appl. No. 13/107,841, filed Nov. 27, 2012, 21 pages.
Final Office Action, U.S. Appl. No. 13/107,841, dated Jan. 9, 2013, 22 pages.
Response to Final Office Action, U.S. Appl. No. 13/107,841, filed Jul. 8, 2013, 10 pages.
Non-Final Office Action, U.S. Appl. No. 13/107,841, filed Aug. 19, 2013, 20 pages.
Response to Non-Final Office Action, U.S. Appl. No. 13/107,841, filed Jan. 22, 2014, 12 pages.
Notice of Allowance, U.S. Appl. No. 13/107,841; dated Jun. 12, 2014, 18 pages.

* cited by examiner

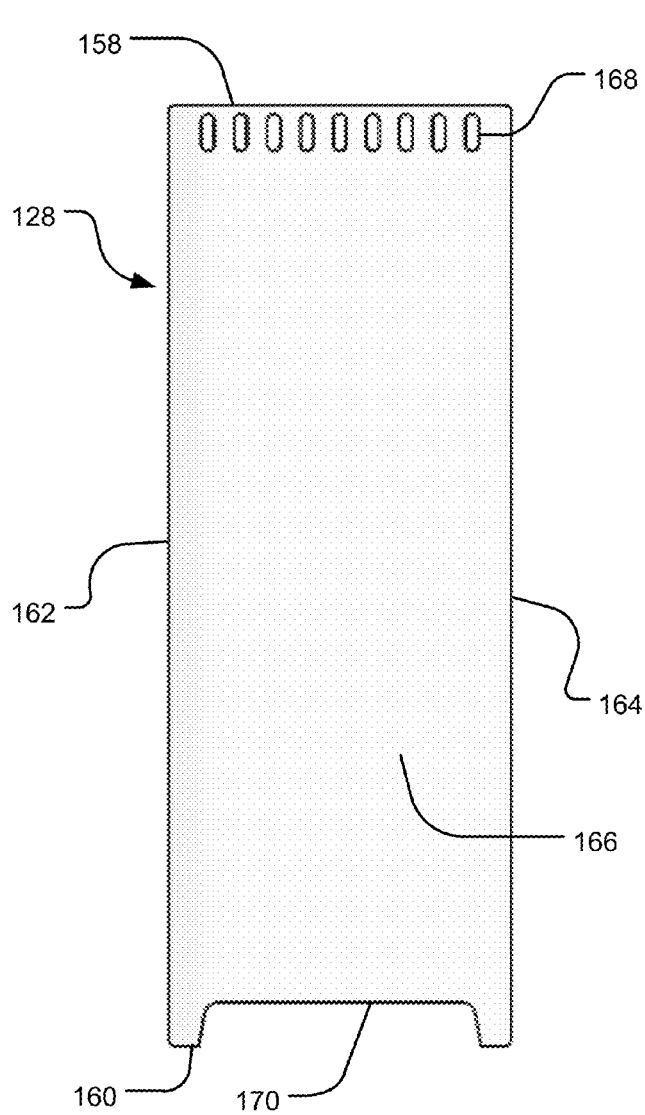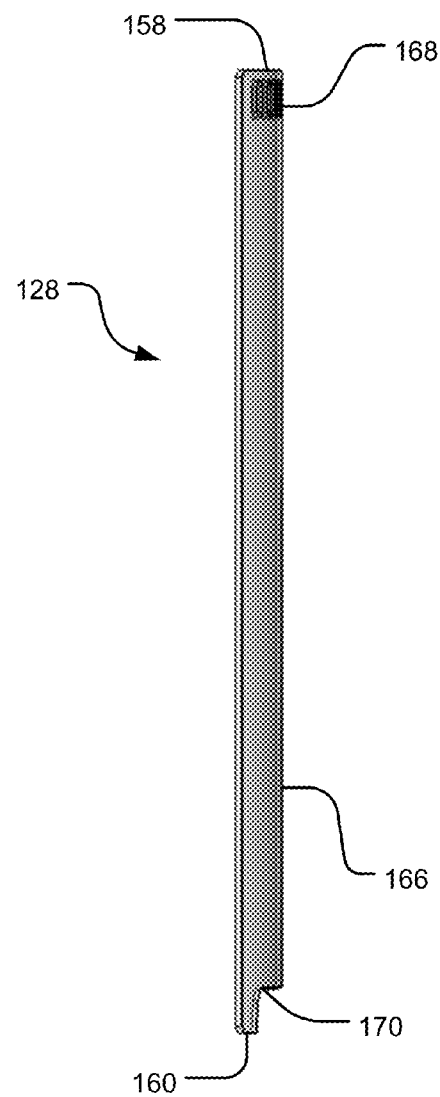
FIG. 20A
FIG. 20B
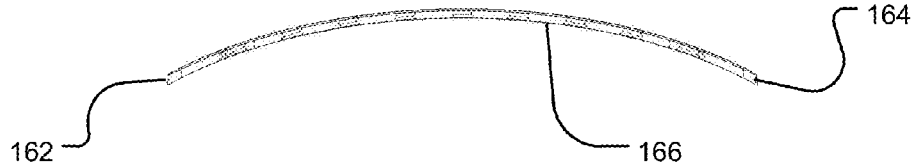
FIG. 20C

FIG. 26A
FIG. 26B
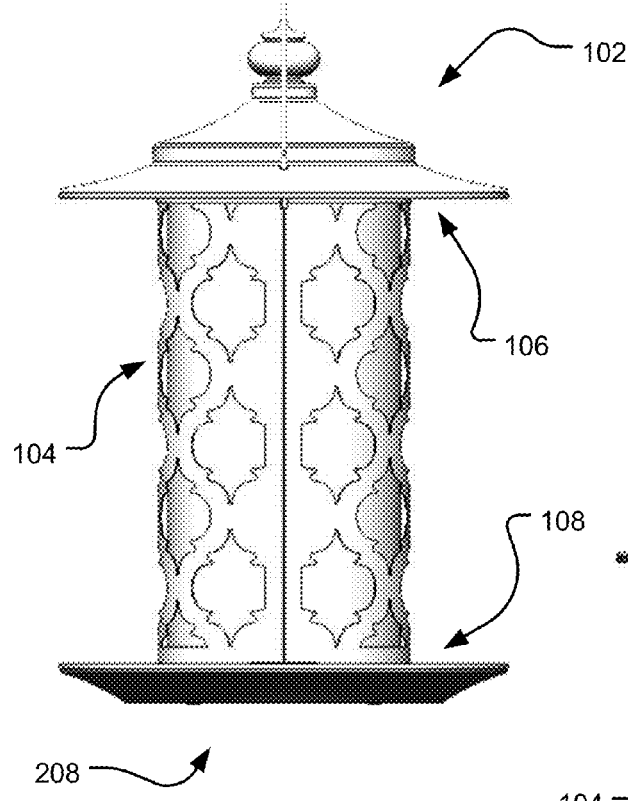
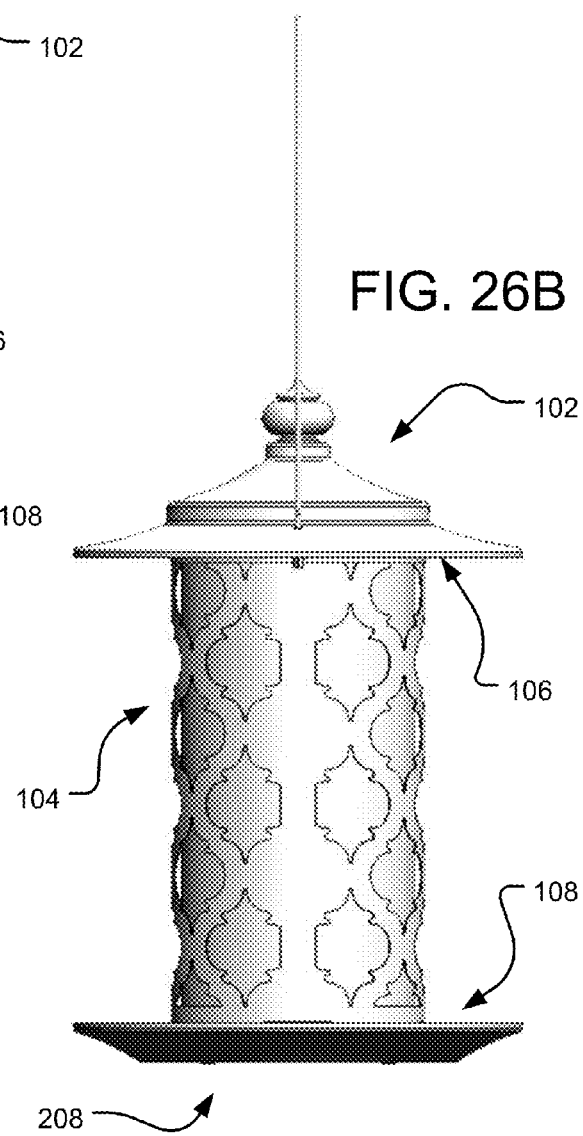

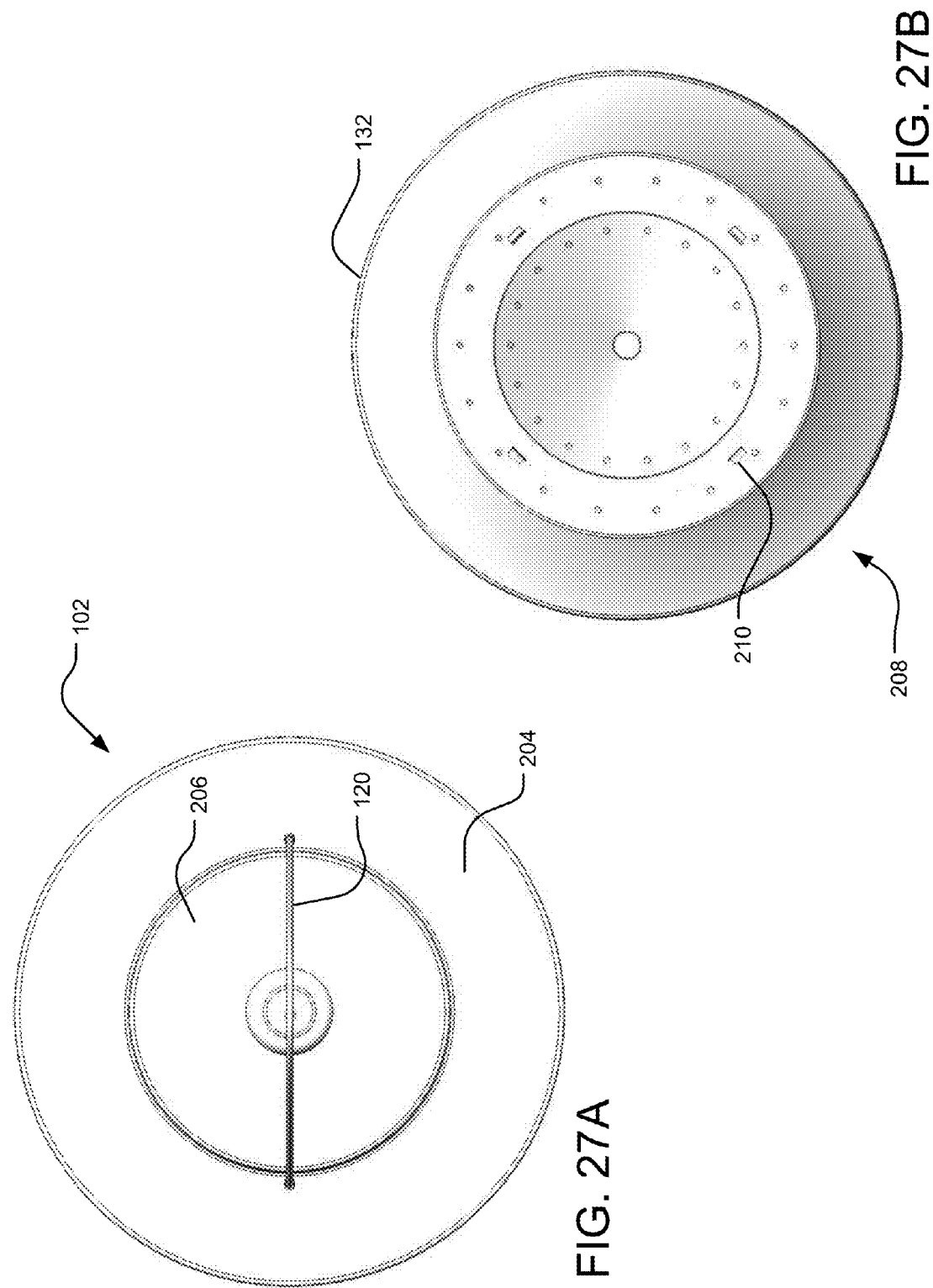

REVERSIBLE INSERT FOR BIRD FEEDER

CROSS-REFERENCE TO RELATED APPLICATIONS

The present application is a continuation-in-part of U.S. patent application Ser. No. 13/107,841, entitled "Hopper Type Wild Bird Feeder" and filed on May 13, 2011, now Pat. No. 8,857,374 and issued Oct. 14, 2014, which claims benefit under 35 U.S.C. § 119 to U.S. Provisional Patent Application No. 61/330,842, entitled "Hopper Type Wild Bird Feeder" and filed on May 3, 2010. Both of these applications are incorporated by reference in their entirety herein.

TECHNICAL FIELD

Aspects of the present disclosure relate to wild bird feeders and in particular to systems and methods for attracting different types of wild birds, as chosen by a user.

BACKGROUND

Each type of wild bird generally eats seed depending on the size of the type of bird. For example, finches and other small birds often prefer small seeds, such as thistle seeds, and larger birds prefer relatively large seeds. Many bird feeders fail to adapt to a user's desire to attract different types of wild birds. Specifically, conventional bird feeders are generally able to accommodate either large seeds or small seeds but not both. As a result, if a user purchases a large seed bird feeder but later wishes to attract birds that eat only small seeds, the user must purchase another bird feeder that is configured to dispense small seeds exclusively.

It is with these observations in mind, among others, that various aspects of the present, disclosure were conceived and developed.

SUMMARY

Implementations described and claimed herein address the foregoing problems, among others, by providing systems and methods for attracting different types of wild birds, as chosen by a user. In one implementation, a top section is configured to engage a cap, and a bottom section positioned opposite the top section includes at least one feeding station. A supporting member extends vertically from the bottom section to the top section. The supporting member, the top section, and the bottom section forma frame. A reversible insert has an elongated body extending between a first edge and a second edge. The first edge has a plurality of ports, and the second edge one or more slots. The frame is adapted to receive the reversible insert in an orientation based on a size of the bird seed.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 20A-C show side, front, and top views, respectively of the reversible insert of FIG. 19.

FIGS. 25, 26A, and 26B are side, front, and back views, respectively, of the bird feeder of FIG. 24.

FIGS. 27A and 27B are top and bottom views, respectively, of the bird feeder of FIG. 24.

DETAILED DESCRIPTION

Aspects of the present disclosure relate to wild bird feeders for attracting different types of wild birds, as chosen by a user. In one aspect, a bird feeder includes a top section configured to engage a cap, which may be, for example, a roof, a lid, or the like. A bottom section is positioned opposite the top section and includes at least one feeding station from which one or birds may access seed. A supporting member extends vertically from the bottom section to the top section to form a frame. The supporting member may be, for example, a pair of opposing edge portions, an body, a cage, or the like. A reversible insert is removably insertable into the supporting member to hold and dispense seed via the at least one feeding station. The reversible insert includes an elongated body extending between a first end and a second end. The second end has one or more slots configured to dispense large or mixed size seed, and the first end has a plurality of ports configured to dispense exclusively small seed, such as thistle. The frame receives the reversible insert in an orientation depending on a size of the bird seed chosen, which dictates the type of birds that will be attracted to the bird feeder. To attract smaller birds, such as finches, the orientation of the reversible insert positions the first end having the plurality of ports adjacent to the feeding station. A user may then fill the bird feeder with small seed, which will be dispensed through the ports and accessible from the feeding station by the small birds. To attract larger birds, the orientation of the reversible insert positions the second end having the slot adjacent to the feeding station. A user may then fill the bird feeder with large or mixed seed, which will be dispensed through the slot and accessible from the feeding station by the large birds. As a result, the user is able to choose which birds to attract.

Figure 1:
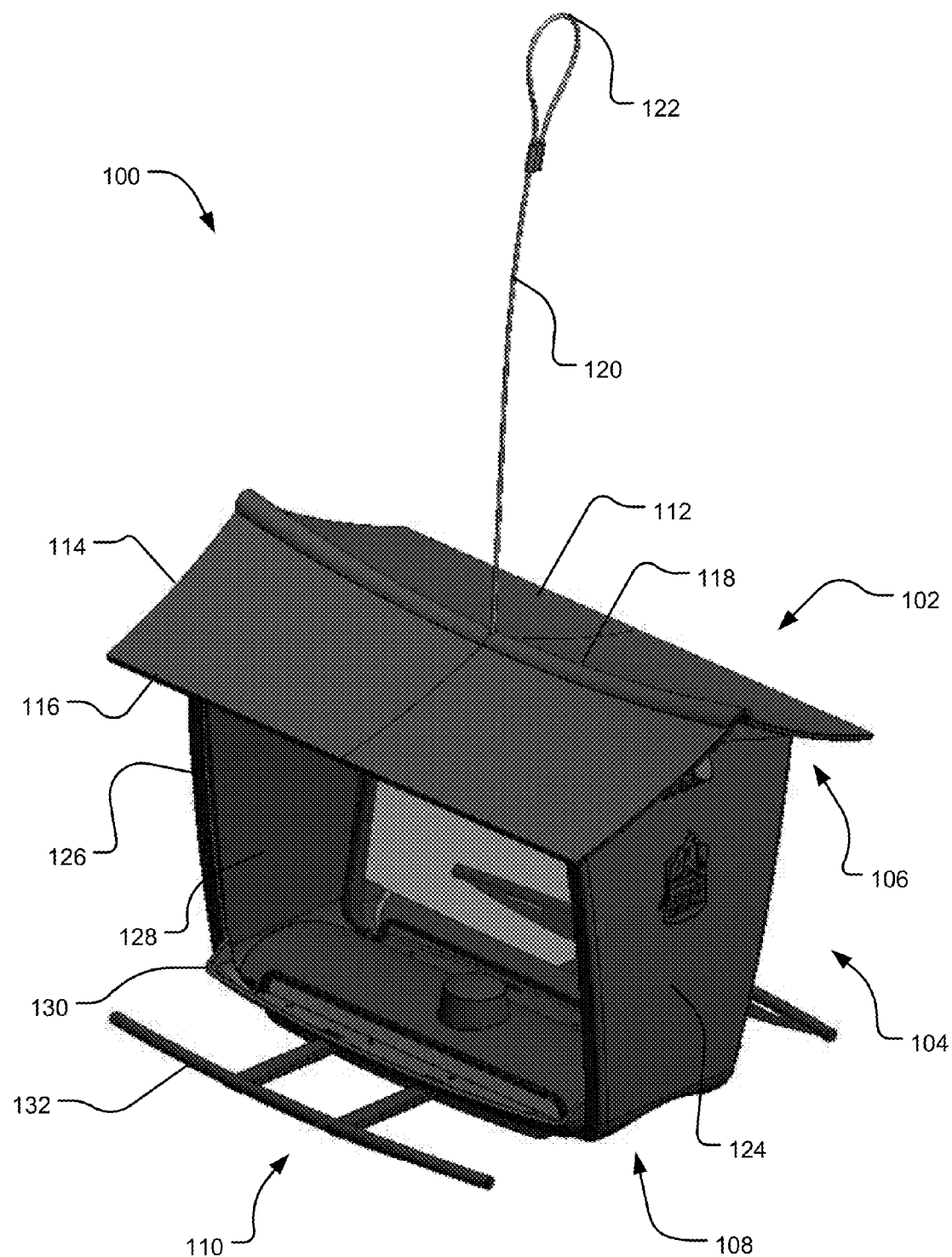
FIG. 1 illustrates a perspective view of an example bird feeder having a reversible insert for selectively attracting one or more types of wild birds.

To begin a detailed description of an example bird feeder having a reversible insert for selectively attracting one or more types of wild birds, reference is made to FIG. 1. In one implementation, a feeder 100 includes a cap 102, a supporting member 104, a top section 106, and a bottom section 108. The supporting member 104, the top section 106, and the bottom section 108 form a frame, which may be a variety of shapes and sizes. In the example shown in FIG. 1, the frame forms a rectangular shaped bin with open sides.

In one implementation, the cap 102 is a roof having one or more surfaces forming a panel 112 defined by edges 114 and sides 116. The surfaces may be planar, contoured, angled, textured, smooth, and/or the like. To dispel precipitation, the roof may include two panels 112 sloping outwardly from a ridge 118 extending longitudinally between the ends 114 along a length of the panels 112 generally parallel to the sides 116. In one implementation, a cable 120 extends from the cap 102. The cable 120 includes a hanging portion 122 configured to engage a structure for suspending the feeder 100. As shown in FIG. 1, in one implementation, the cable 120 extends from an approximate center of the cap 120 and forms a loop including the hanging portion 122.

The cap 102 is configured to occlude an opening to a reservoir for holding a supply of seed. To fill the reservoir, the cap 102 is removed, the seed for attracting the desired bird types is added to the reservoir through the opening, and the cap 102 is replaced to occlude the opening. In one implementation, the reservoir is formed by the frame and/or one or more reversible inserts 128. The reversible inserts 128 may be transparent to provide a visual indication to the user of the level of the seed supply, for quick reference regarding whether the feeder needs to be refilled.

In one implementation, the supporting member 104 includes a first edge portion 124 and a second edge portion 126, each extending vertically from the bottom section 108 to the top section 106. The edge portions 124, 126 are positioned generally opposite each other. In one implementation, the edge portions 124, 126 are generally planar, smooth surfaces. However, other shapes and surfaces are contemplated. The edge portions 124, 126 are configured to receive the reversible inserts 128 to partially occlude the side openings defined by the frame. As such, in the example shown in FIG. 1, the reversible inserts 128 are sidewalls. In one implementation, the feeder 100 includes a pair of reversible inserts 128, each configured to be received by the edge portions 124, 126, such that the reversible inserts 128 are positioned generally opposite each other. To position each of the reversible inserts 128, in one implementation, the cap 102 is removed, and each of the reversible inserts 128 is slidably inserted along a length of the edge portions 124, 126 from the top section 106 until meeting the bottom section 108. The cap 102 is then replaced. The reversible inserts 128 are removable and invertible, such that the frame is configured to receive the reversible inserts 128 in an orientation depending on a size of the bird seed chosen, which dictates the type of birds that will be attracted to the bird feeder.

The bottom section 108 includes at least one feeding station 110 providing access to bird seed in the reservoir. The feeding station 110 may have any shape, size, and/or configuration. For example, each of the feeding stations 110 may be defined by an opening in the frame through which bird seed may be accessed. In the example shown in FIG. 1, the feeding stations 110 are each defined by a trough 130 configured to collect and hold seed dispensed from the reservoir through the side openings. In one implementation, the troughs 130 extend along a length of the bottom section 108 between the edge portions 124 and 126, and the troughs 130 are positioned generally opposite each other to form two feeding stations 110. A perch 132 is positioned adjacent to each of the troughs 130 from which birds may access the dispensed seed. The perch 132 may be variety of shapes and/or sizes. Furthermore, in some implementations, there may be a plurality perches 132 positioned adjacent to each of the troughs 130.

Figure 2:
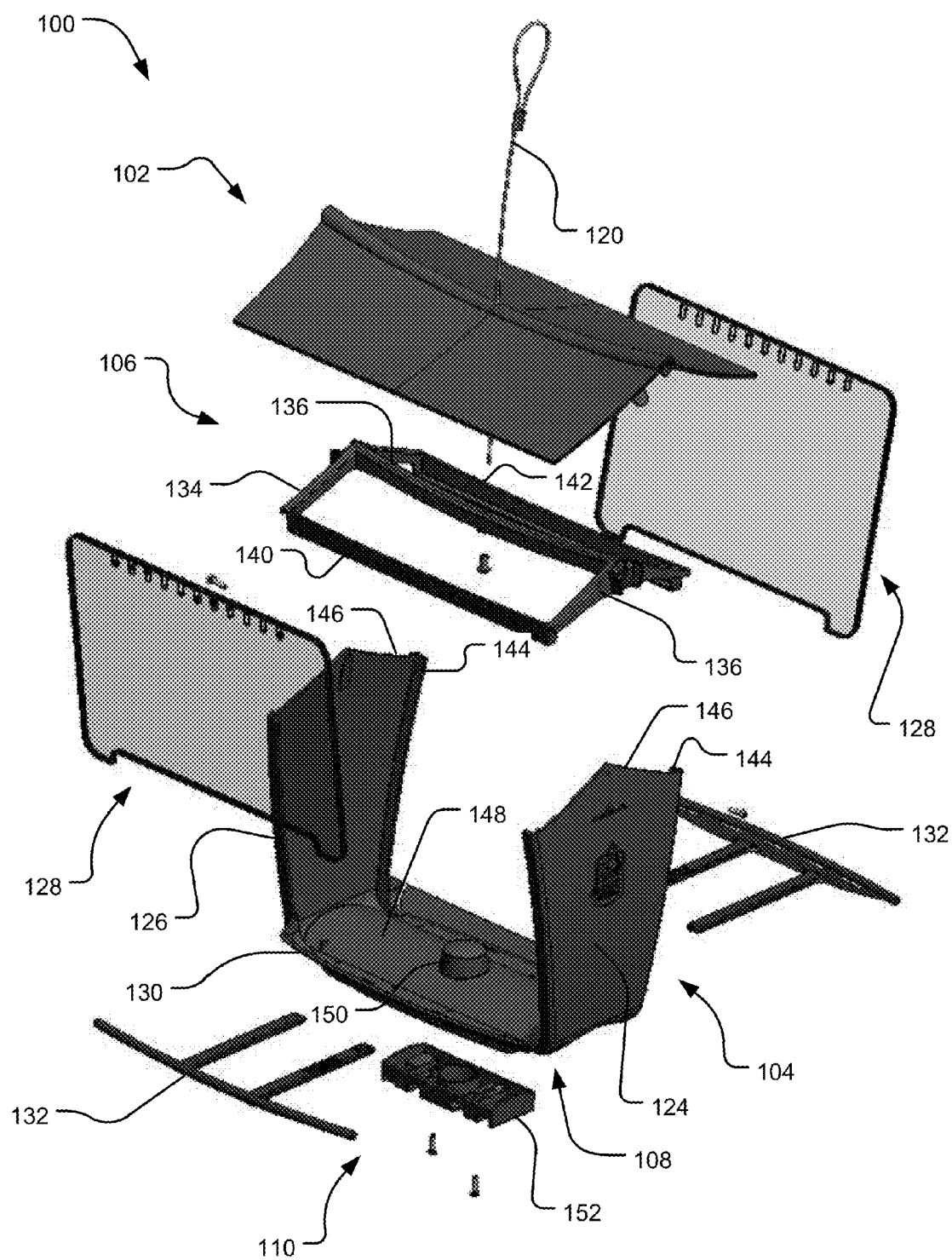
FIG. 2 is an exploded view of the bird feeder of FIG. 1.

Turning to FIG. 2, an exploded view of the feeder 100 is shown. In one implementation, the top section 106 is sized and shaped to receive the cap 102. Where the cap 102 is a roof, as shown in FIG. 2, the top section 106 may include a pair of opposing end frames 134 connecting a side frame 140 and a ride beam 136 to form a panel frame for supporting the panel 112. Each of the panels 112 of the roof may be supported in this manner, with the ridge beam 136 configured to receive the ridge 118 of the roof. In one implementation, the edge portions 124, 126 each include top edges 146 configured to receive an edge panel 136 of the top section 106 and guides 144 configured to receive the reversible inserts 128. In one implementation, the guides. 144 are channels extending along a length of each edge of the edge portions 124, 126 from the top edge 146 to the base 148.

The reversible inserts 128 are removable and invertible, such that the guides 144 configured to receive the reversible inserts 128 in an orientation depending on a size of the bird seed chosen, which dictates the type of birds that will be attracted to the bird feeder. To further adapt the feeder 100 for the type of bird chosen, in one implementation, an adjustable perch assembly 142 is provided, which may be used to adjust the distance between the perches 132 and the troughs 130 based on the size of the bird type. As detailed herein, the perches 132 are mounted to the bottom section 108 using a perch mount 152, which enables the adjustment of the distance of the perches 132.

As can be understood from FIG. 2, in one implementation, the edge portions 124 and 126 are integrally molded with a base 148 extending horizontally from the first edge portion 124 to the second edge portion 126, and the troughs 130 protrude outwardly from the base 148. The base 148 may include one or more surfaces configured to direct the supply of seed to the troughs 130. For example, as shown in FIG. 2, in one implementation, the base 148 includes a contoured surface curving from one trough 130 to the other to direct the seed to the troughs 130.

Figure 3:
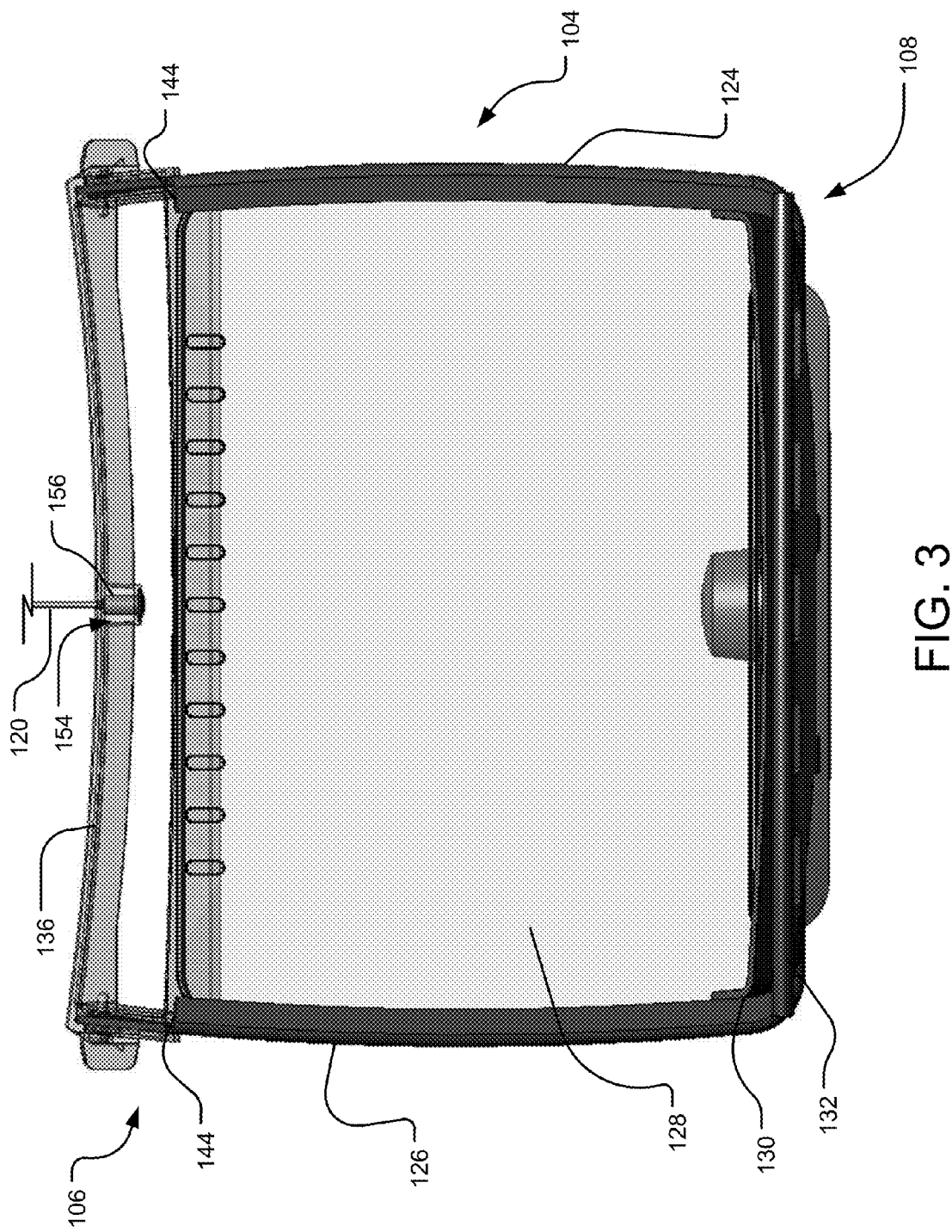
FIG. 3 is a side view of the bird feeder of FIG. 1 with the cap not shown and the top portion shown transparent for clarity.
Figure 4:
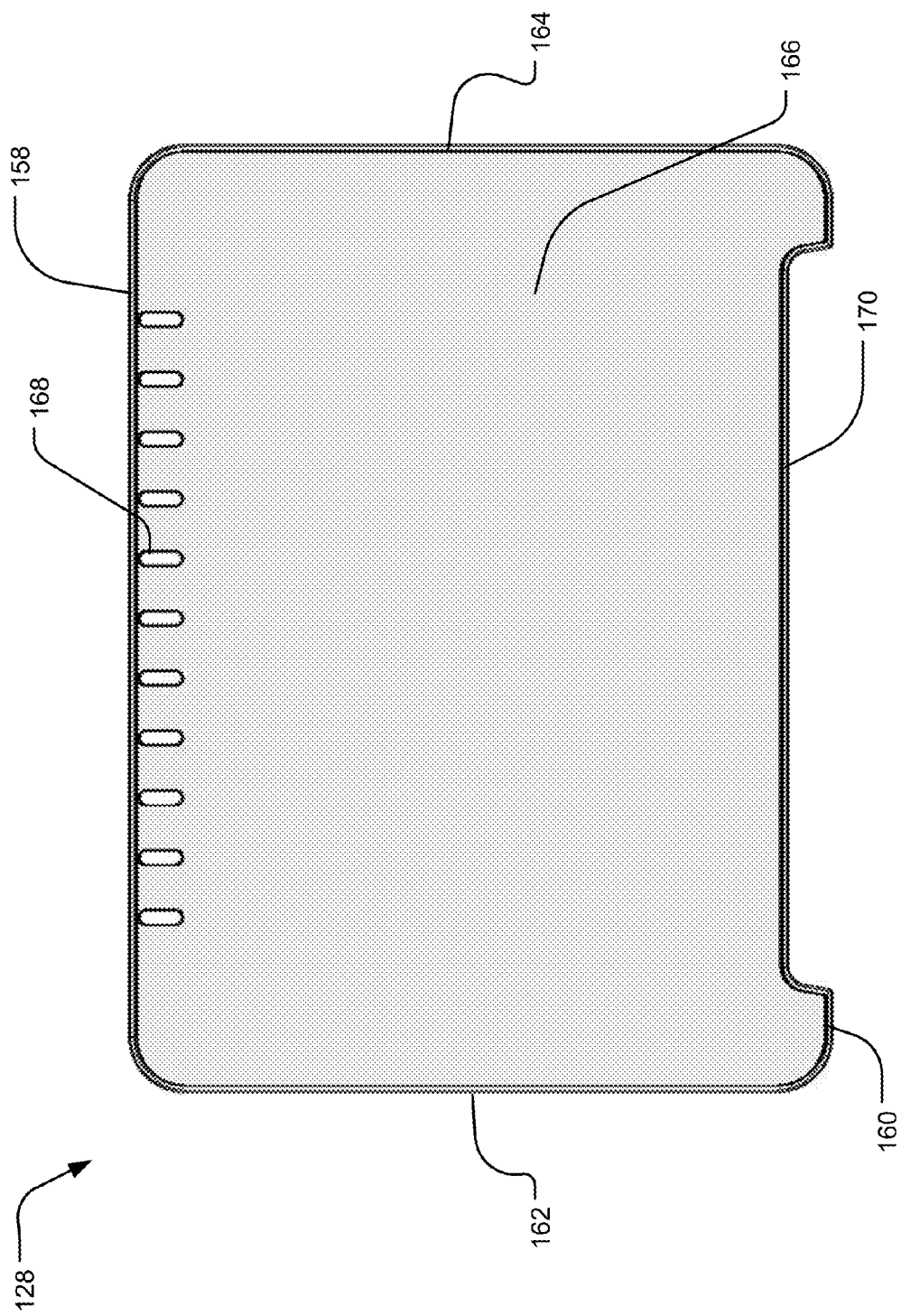
FIG. 4 shows a detailed view of the bird feeder of FIG. 1 with the cap engaged to the top portion.
Figure 5:
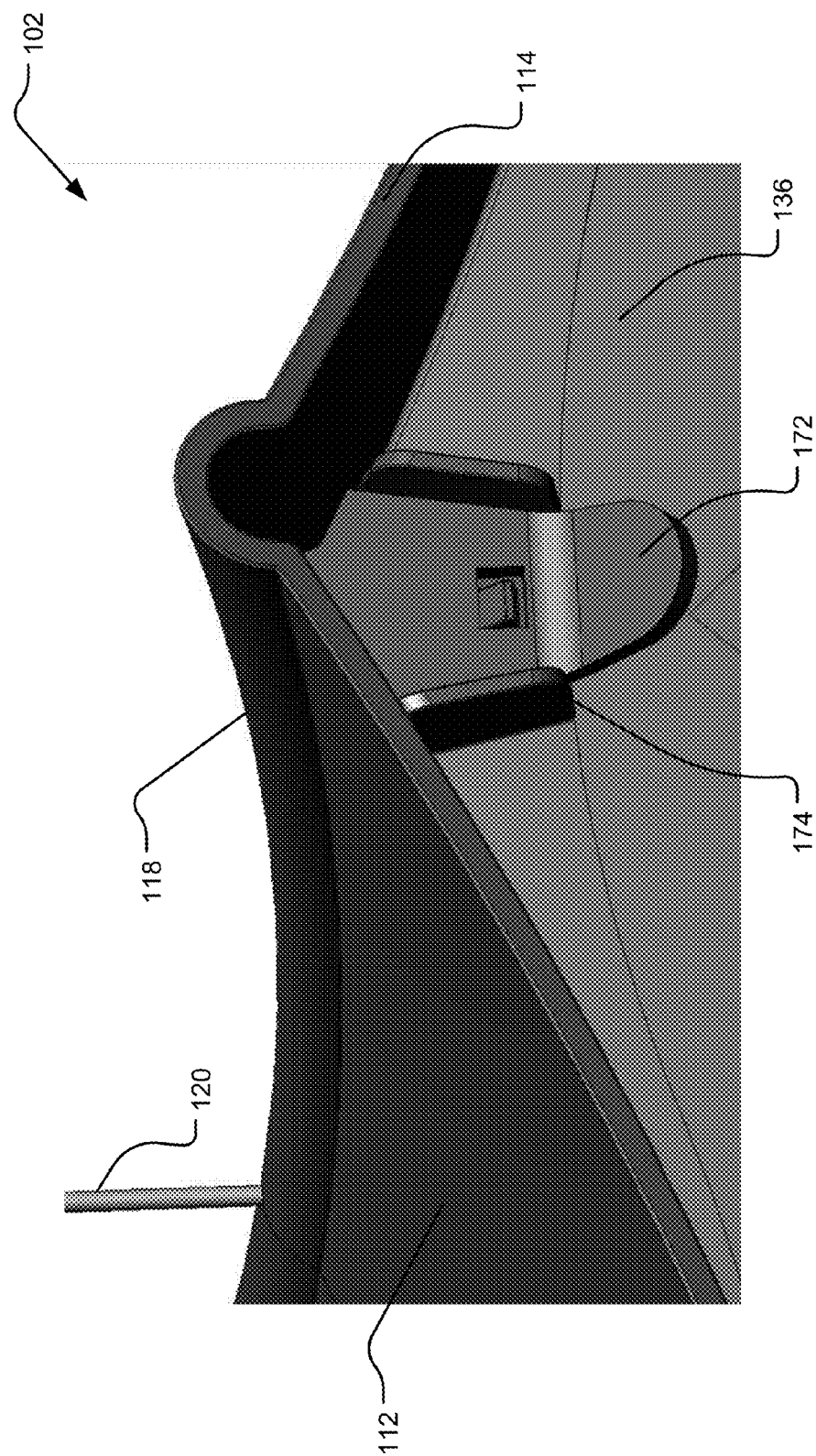
FIG. 5 is a perspective, view of the bird feeder of FIG. 1 with the cap partially removed and the edge portions transparent.

To prevent squirrels from reaching the seed in the troughs 130, a user may wish to position the feeder 100 away from trees or similar support structures. Thus, the base 148 may include a receiver 150 configured to mount the feeder 100 on a pole or other support structure. Where the user wishes to suspend the feeder 100 from a tree branch or similar support structure, the hanging portion 122 of the cable 120 may be used. As can be understood from FIGS. 3-5, in, one implementation, the cable 120 extends through the cap 102 into an opening 154 in the top section 106 (e.g., in the ridge beam 136) where the cable is secured with a hanger mount 156. The cap 102 may be removably secured to the top section 106 using a latch 172 and a latch receiver 174. As a result, when the latch 172 is disengaged from the latch receiver 174, the cap 102 is permitted to move along a length of the cable 120 to remove the cap 102 for filling the reservoir with seed and/or reorienting the reversible inserts 128, as shown in FIG. 5. In one implementation, the latch 172 and the latch receiver 174 are configured to prevent accidental opening of the cap 102 and access by non-birds, such as squirrels.

Figure 6:
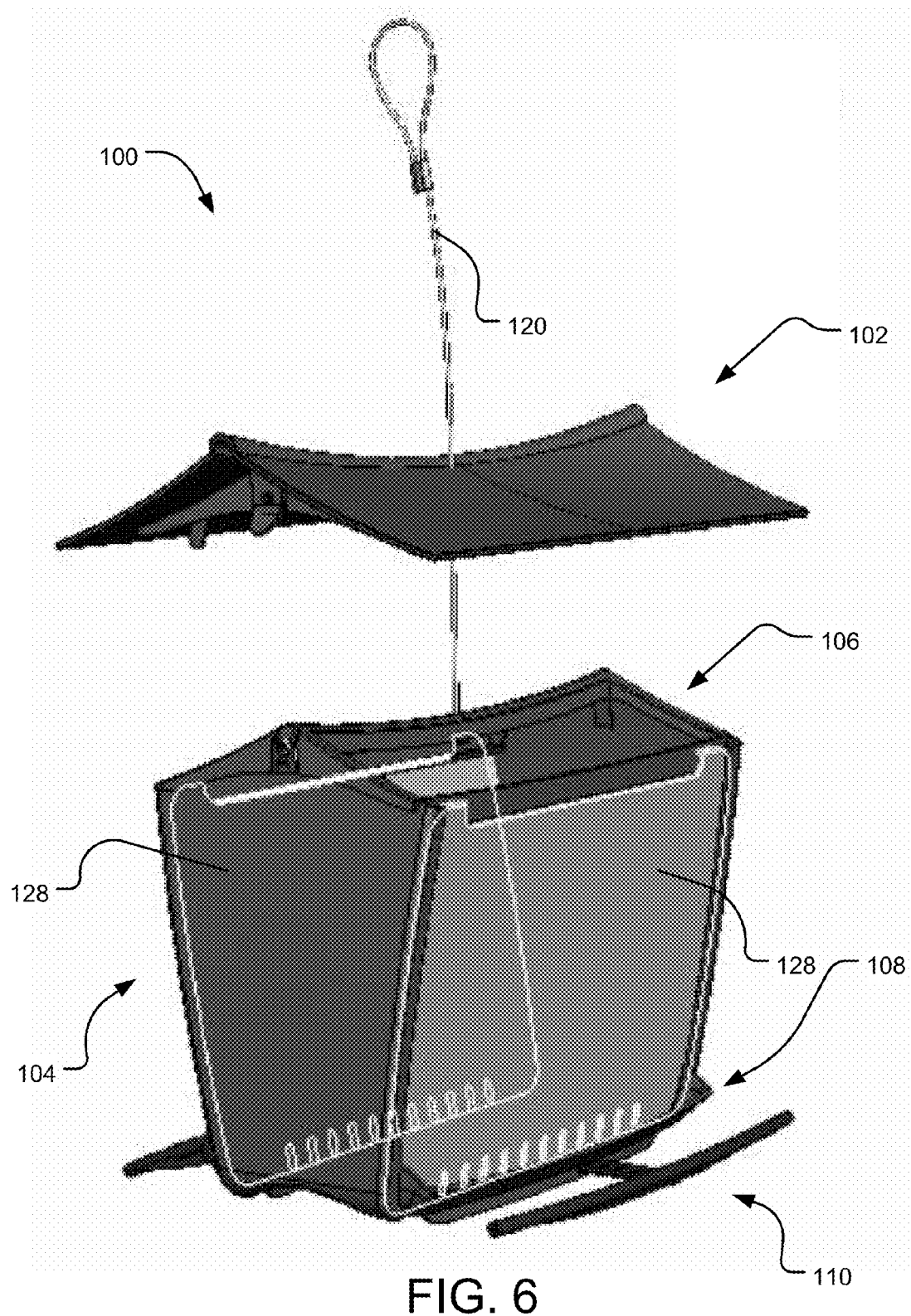
FIG. 6 illustrates an example reversible insert.

Referring to FIG. 6, an example reversible insert 128 is shown. In one implementation, the reversible insert 128 includes an elongated body 166 extending from a first end 158 to a second end 160. The first end 158 includes a plurality of ports defined in a surface of the elongated body 166 and configured to dispense exclusively small seed, such as thistle seeds, and the second end 160 includes one or more slots 170 defined in a surface of the elongated body 166 and configured to dispense large seed, such as sunflower seeds, or mixed size seed.

In one implementation, the ports 168 are relatively small openings sized to dispense small seed in a controlled manner and to restrict larger birds from accessing the seed. For example, each of the ports 168 may have a width extending along the length of the first end 158 of approximately 3.5 mm and a length extending generally perpendicularly to the first end 158 of approximately 1 cm. The ports 168 may have a variety of shapes, including, without limitation, circular, elliptical, rectangular, triangular, contoured, angled, and/or the like. For example, the ports 168 may have a flattened elliptical shape, as shown in FIG. 6. However, other sizes and shapes are contemplated. In one implementation, the ports 168 are positioned near but not intersecting an edge of the first end 158.

In one implementation, the slots 170 are relatively large openings intersecting an edge of the second end 160 and sized to dispense large or mixed seed in a controlled manner. In one implementation, the second end 160 includes one slot 170 extending along a majority of the length of the second end 160, as shown in FIG. 6. For example, the slot 170 may have a width extending along the length of the second end 160 of approximately 10-12 cm and a length extending generally perpendicularly to the second end 160 of approximately 2 cm. The slots 170 may have a variety of shapes, including, without limitation, arched, circular, elliptical, rectangular, triangular, contoured, angled, and/or the like. For example, as shown in FIG. 6, the slots 170 may have an arched shape defined by two curved ends connecting an elongated edge to an edge of the second end 160, such that the slots 170 intersect the edge of the second end 160.

The elongated body 166 may be a variety of shapes and sizes configured to be removably inserted into the supporting member 104. For example, the elongated body 166 may be planar, cylindrical, cubical, pyramidal, and/or the like. The elongated body 166 may be made from a transparent or translucent material with a generally uniform thickness. In the example shown in FIG. 6, the elongated body 166 is planar with a rectangular shape having curved corners. The rectangular shape of the elongated body 166 is defined by opposing ends 158 and 160 and opposing sides 162 and 164.

Figure 7:
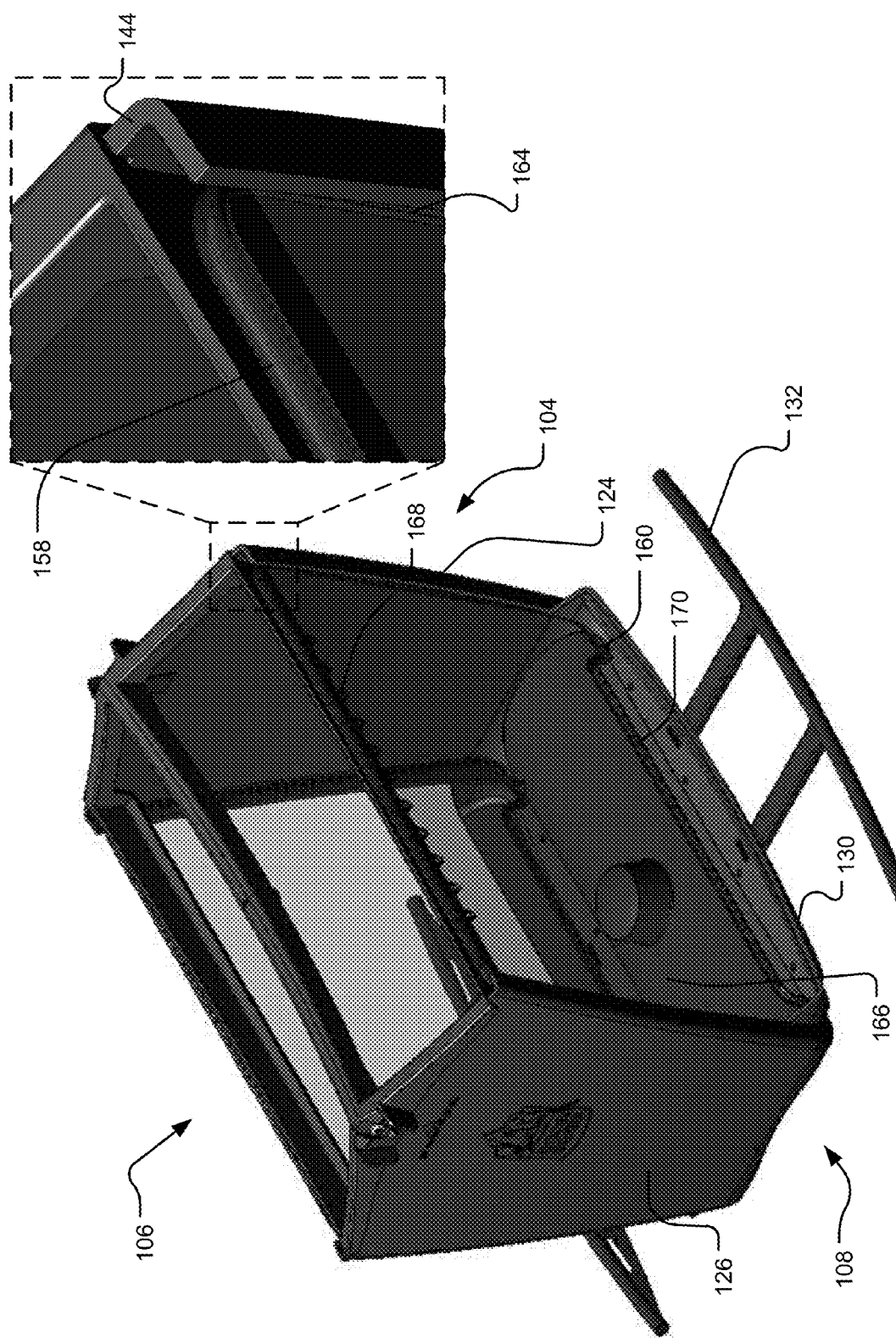
FIG. 7 shows a perspective view of the bird feeder of FIG. 1 with the cap removed and a detailed view of the reversible inserts positioned using guides.

Turning to FIG. 7, the reversible inserts 128 are removable and invertible, such that the frame is configured to receive the reversible inserts 128 in an orientation depending on a size of the bird seed chosen, which dictates the type of birds that will be attracted to the bird feeder.

In one implementation, the orientation includes positioning either the first end 158 or the second end 160 adjacent to the feeding station 110 depending on the size of the bird seed to be dispensed. For large seed, such as sunflower seeds, the orientation includes positioning the second end 160 adjacent to the feeding station 110, such that the large seed is dispensed through the slot(s) 170, and for small seed, such as thistle seeds, the orientation includes positioning the first end 158 adjacent to the feeding station 110, such that the small seed is dispensed through the ports 168.

To position each of the reversible inserts 128, in one implementation, the cap 102 is removed, and each of the reversible inserts 128 is slidably inserted along the guides 144 until meeting the bottom section 108. Once inserted, the reversible inserts 128 are held in place by the supporting member 104, the bottom section 108, and/or the top section 106. In one implementation, once inserted, one of the ends 158, 160 is positioned along the side frame 140, the other end 158, 160 is positioned along the base 148 adjacent to the trough 130, and the sides 162, 164 are positioned in the guides 144. In the example, shown in FIG. 7, the reversible insert 128 is oriented to dispense large seed, with the second end 160 positioned adjacent to the trough 130 and the first end 158 positioned along the side frame 140. If the user wishes to attract birds that eat smaller seeds, the reversible insert 128 may be removed, inverted, and inserted along the guides 144 until the first end 158 is positioned adjacent to the trough 130. Accordingly, the feeder 100 is convertible between a large seed feeder and a small seed feeder, such that the user may choose which birds to attract.

Figure 8:
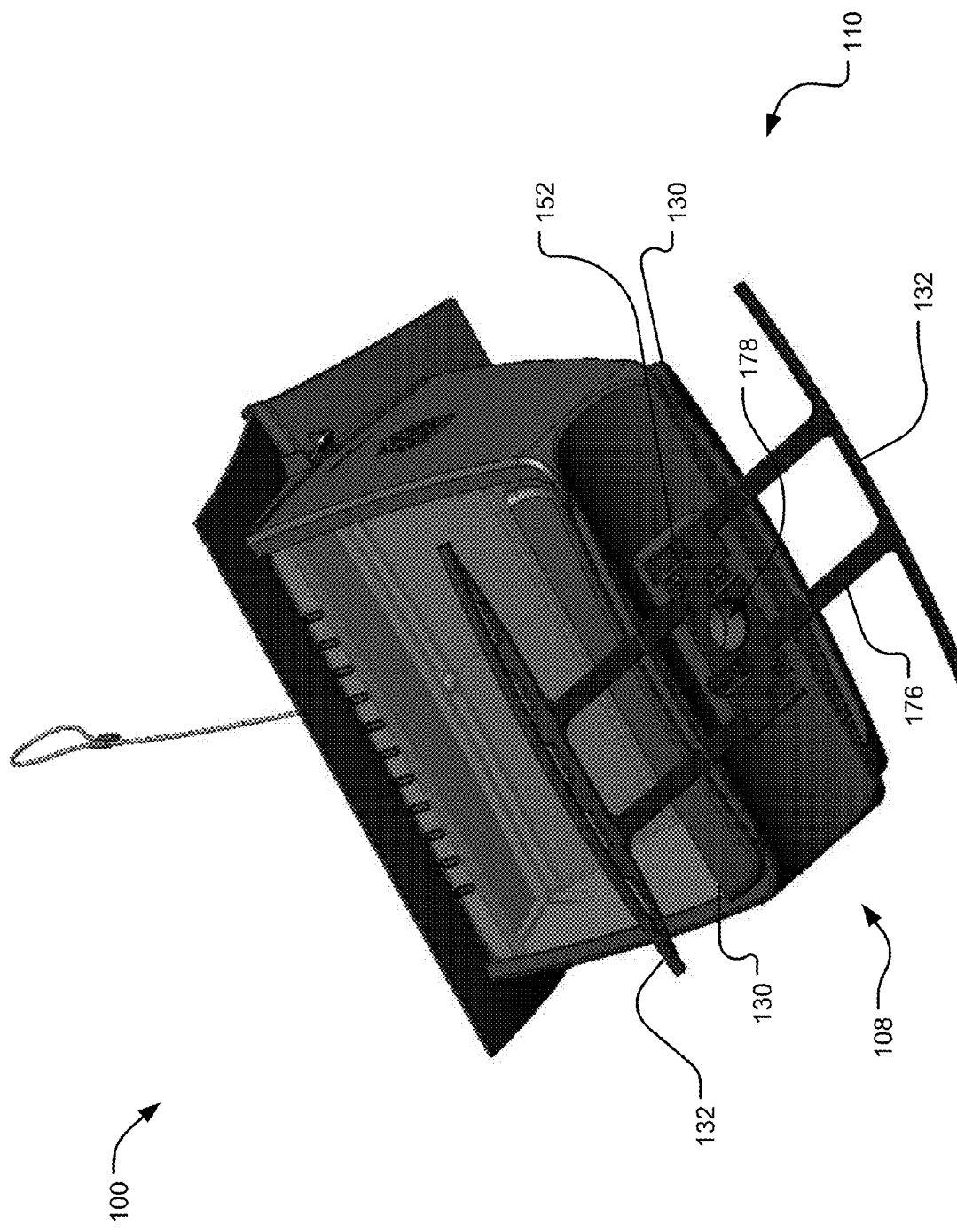
FIG. 8 is a bottom perspective view of the bird feeder of FIG. 1.
Figure 9:
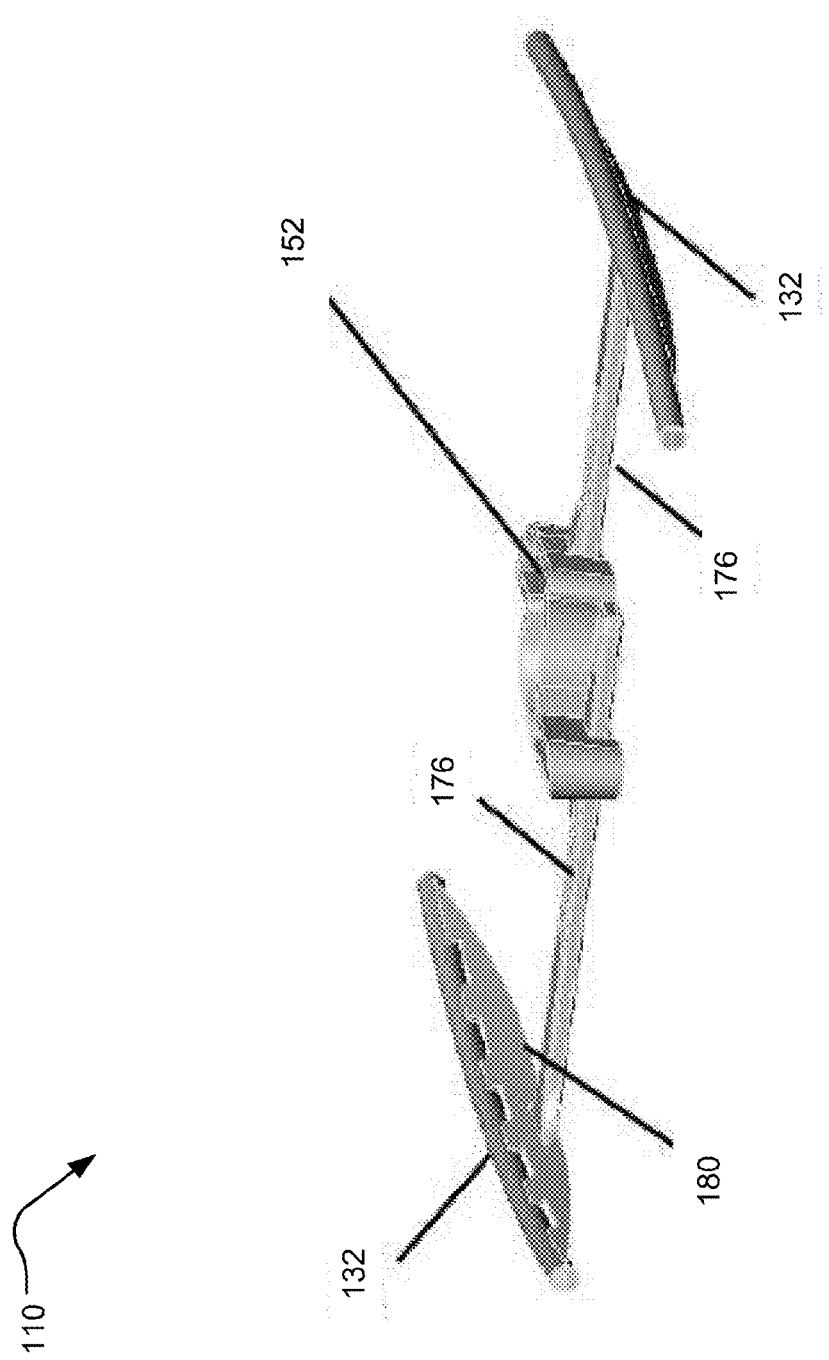
FIG. 9 illustrates a perspective view of an example perch assembly.
Figure 10:
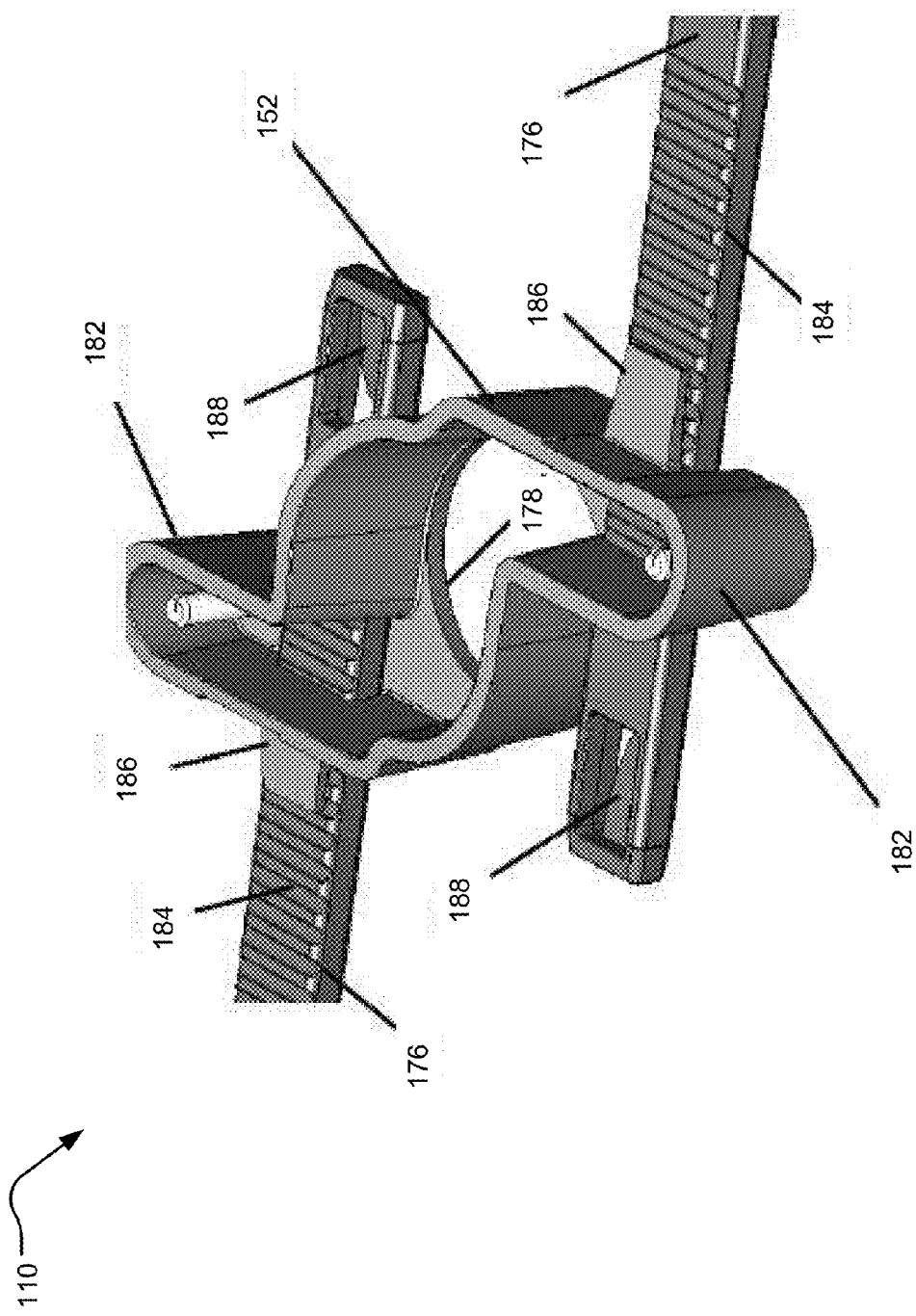
FIG. 10 shows a top perspective view of the perch assembly of FIG. 9.

For a detailed description of the adjustable perch assembly 142, reference is made to FIGS. 8-10. In one implementation, each of the perches 132 is a thin, elongated body supported by a structural member 180. However, other shapes and sizes of the perches 132 are contemplated, and the structural member 180 may be integrally formed with the perch 132, connected to the perch 132, or removed entirely. The perch mount 152 may include an opening 178 through which a pole or similar support may be inserted to engage the receiver 150.

In one implementation, each of the perches 132 is adjustably mounted to the perch mount 152 with one or more support arms 176. The distance of the perches 132 from the troughs 130 may be adjusted by changing the length of the support arms 176. In one implementation, one or more surfaces of the support arms 176 includes a series of indentations or detents 184, which an end of a flexing finger 186 extending from the perch mount 152 ratchets into and out of to adjust the length of the support arms 176.

To prevent the perches 132 from being accidentally removed from the perch mount 152, in one implementation, the adjustable perch assembly 142 includes perch support receivers 182 having holes configured to receive detent fingers 188, which bias outwardly from a plane of the support arms 176. As such if the support arm 176 is pulled too far, the detent finger 188 will engage the perch support receivers 182 to prevent the support arm 176 from being removed from the perch mount 152. In one implementation, the support arms 176 for opposing perches 132 are offset within the perch mount 152 to permit the support arms 176 to bypass each other and the opening 178 to move unobstructed.

Referring to FIGS. 11-43, in one implementation, the cap 102 is a lid including an extending portion 204 and a receiving portion 206. The extending portion 204 extends outwardly from the receiving portion 206, which is configured to engage the top section 106 to occlude the reservoir. The extending portion 204 and the receiving portion 206 may each have one or more surfaces, which may be planar, contoured, angled, textured, smooth, and/or the like. In one implementation, the extending portion 204 is disposed proximal to the top section 106 from the receiving portion 206 to create a generally sloped appearance. The cap 102 may include other features, such as a finial, for aesthetic appearance and for gripping to remove the cap 102. In one implementation, the cable 120 extends from a first opening in the cap 102 to a second opening in the cap 102 to form a loop with the hanging portion 122 at the top of the loop. The hanging portion 122 may be disposed over the approximate center of the cap 102 to stably suspend the feeder 100.

In one implementation, the feeder 100 includes a basin 208 configured to engage the bottom section 108. The basin 208 may be a variety of sizes and shapes, including, but not limited to, elliptical, circular, rectangular, triangular, contoured, angled, and/or the like. The basin 208 may be shaped to mirror the shape of the bottom section 108 and sized to mirror the size of the cap 102. In one implementation, the basin 208 includes a surface forming the trough 130 and a surface tapering outwardly to an outer edge forming the perch 132. The basin 208 may include one or more protruding members 210 on a bottom surface to support the feeder 100 when positioned on a surface, such as a table, for cleaning or filling, for example.

Turning to FIGS. 11-33, in one implementation, the supporting member 104 includes an elongated body 200 extending vertically from the bottom section 108 to the top section 106. The elongated body 200 may be a variety of shapes including, without limitation, cylindrical, cubical, pyramidal, tapered, contoured, angled, and/or the like. The elongated body 200 may be sized to accommodate various capacities for the supply of bird seed. In one implementation, the elongated body 200 is sized to hold a supply of bird seed weighing approximately 1.5-2.5 pounds. However, other sizes are contemplated. The elongated body 200 may include surfaces with aesthetically pleasing features, including patterns defined therein, as shown in FIGS. 11-18 and 24-26B, for example.

Figure 11:
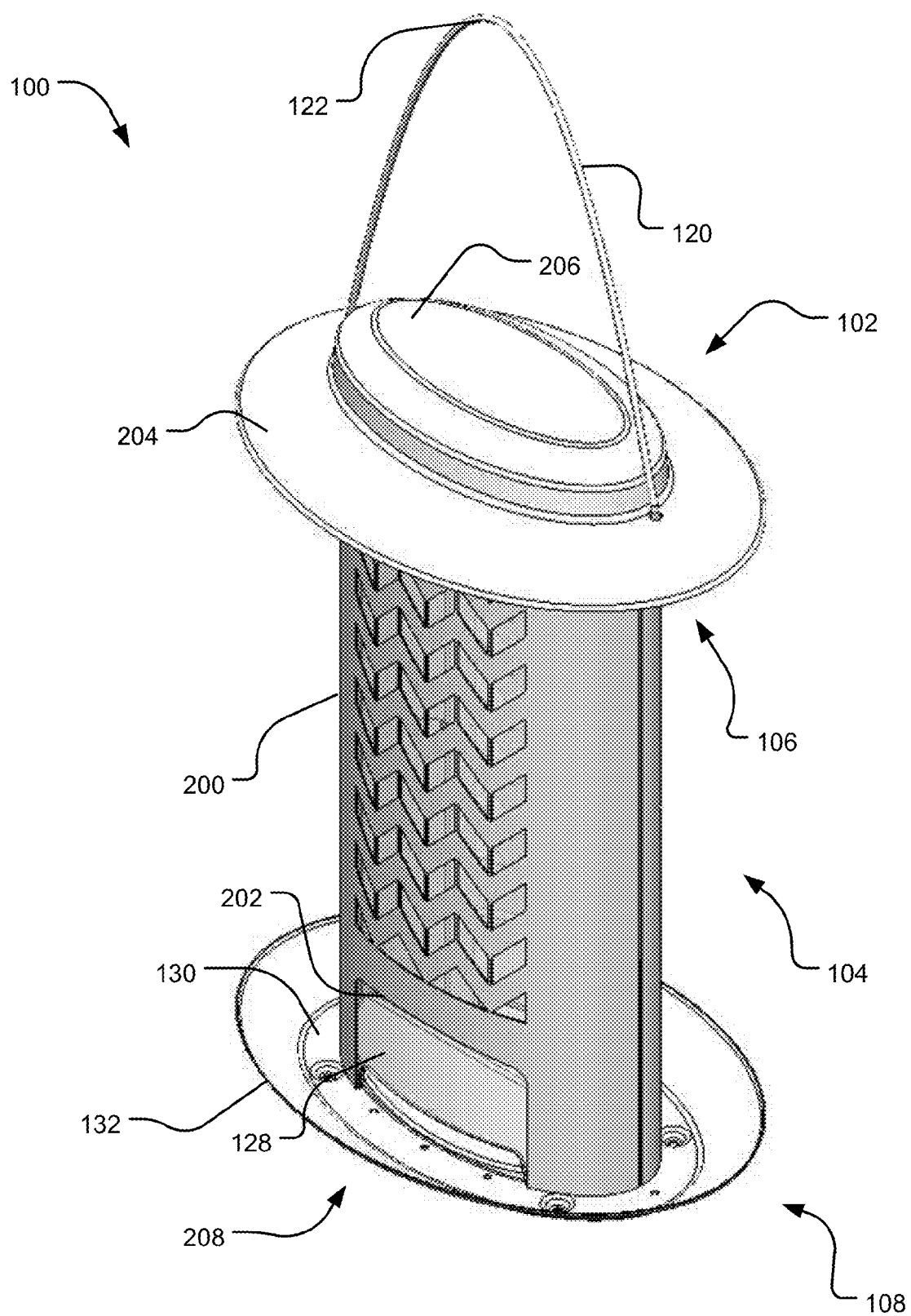
FIG. 11 illustrates an isometric view of another example bird feeder having a reversible insert for selectively attracting one or more types of wild birds.
Figure 12:
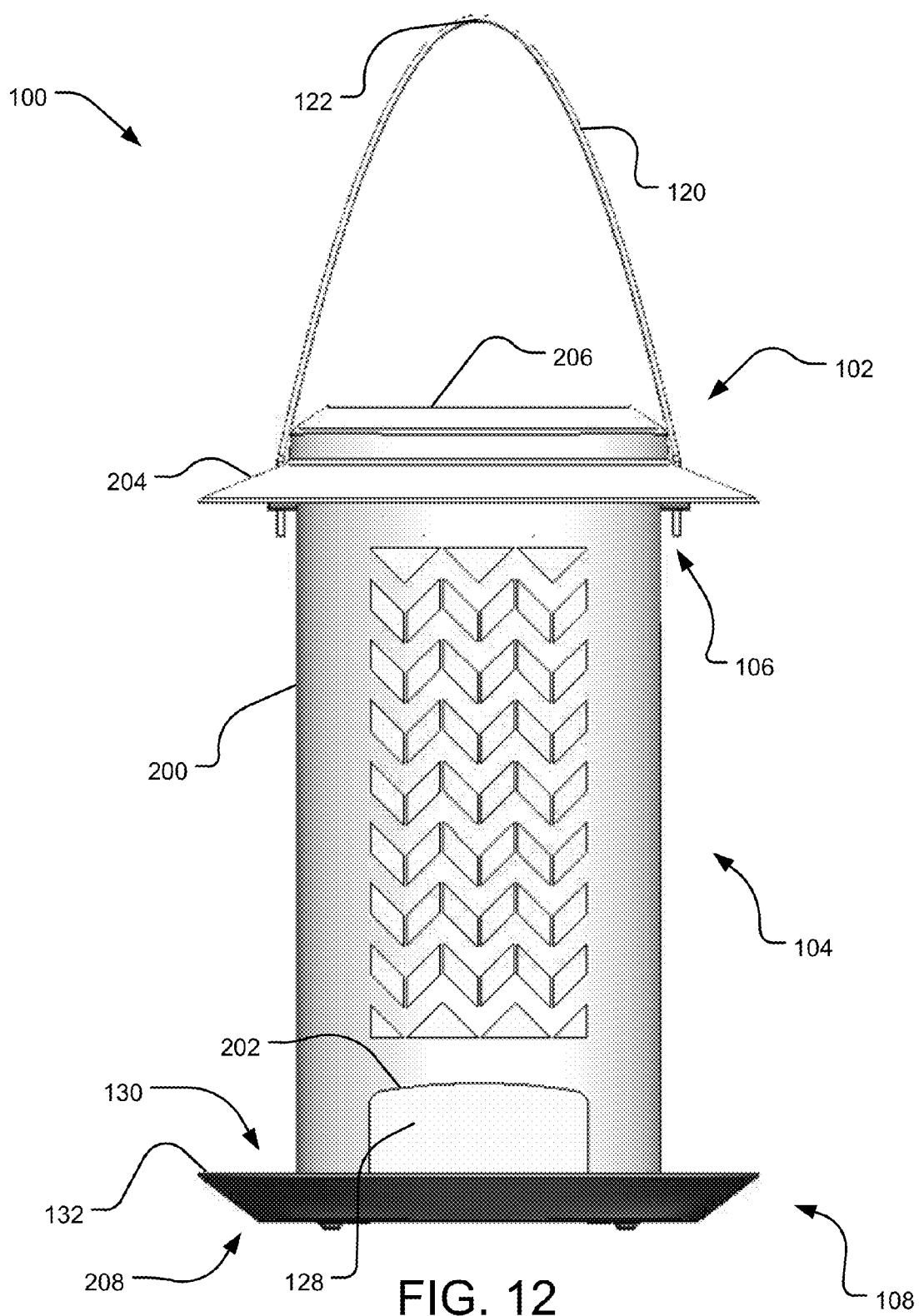
FIGS. 12 and 13 are side and front views, respectively, of the bird feeder of FIG. 11.
Figure 13:
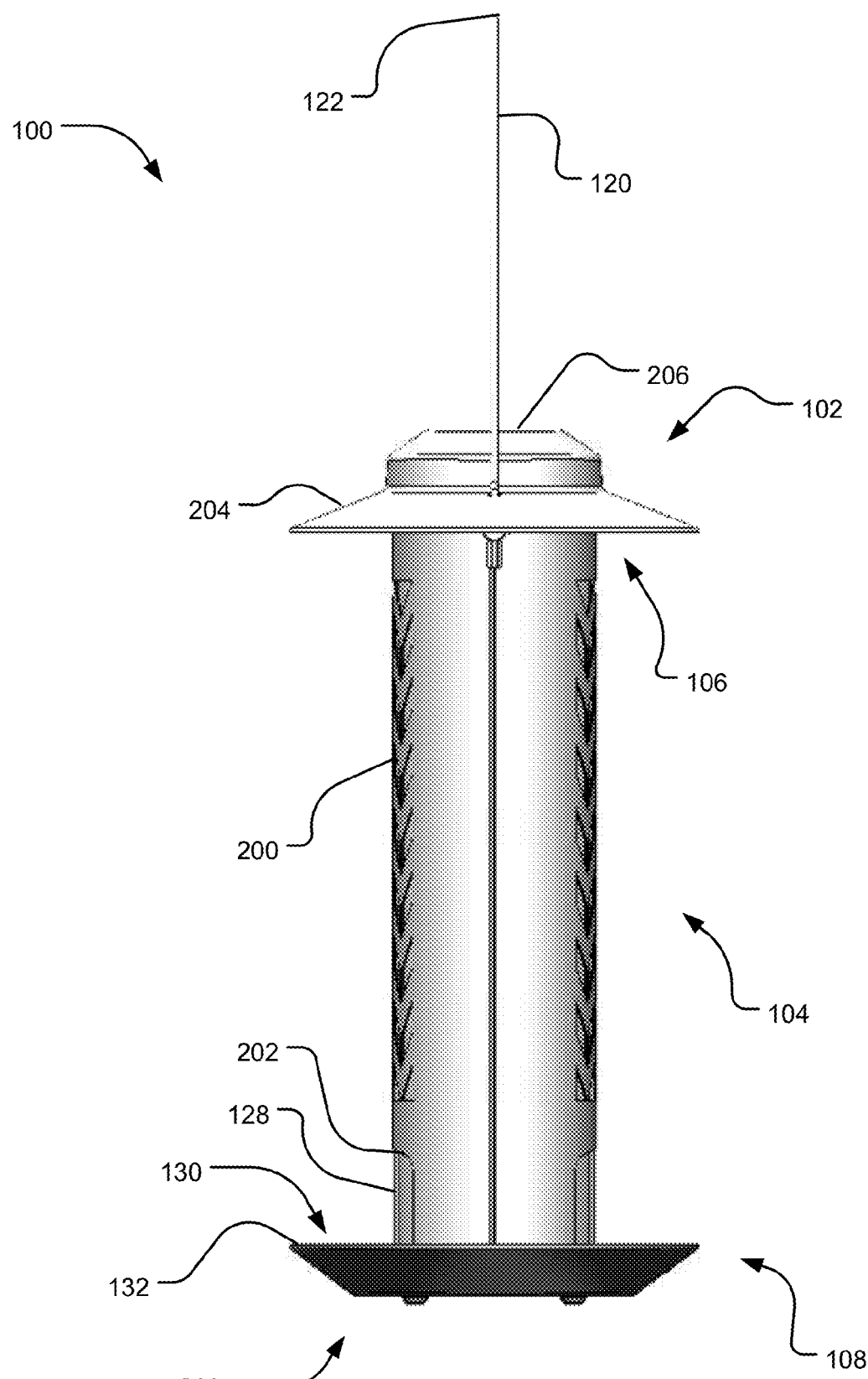
Figure 14:
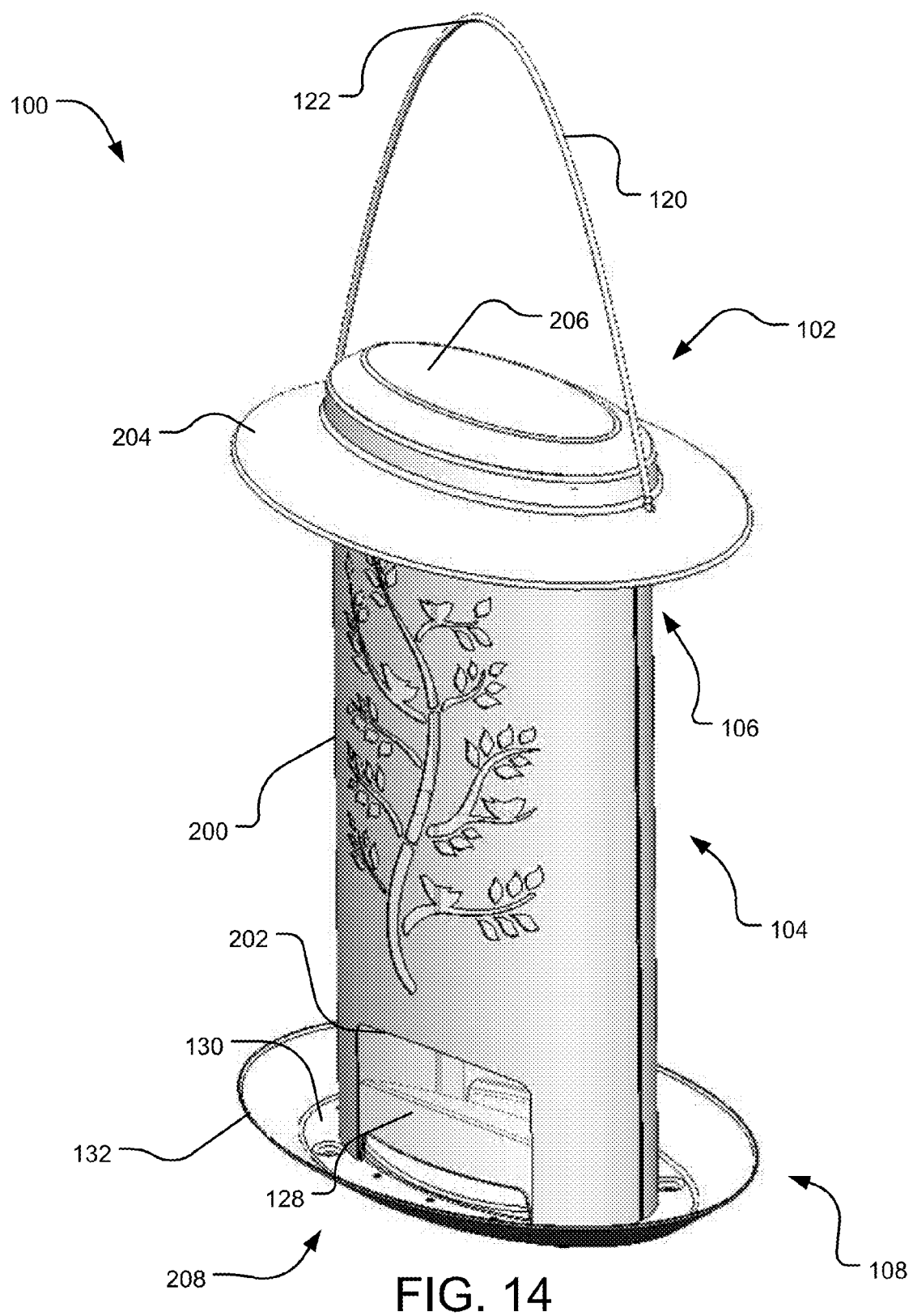
FIG. 14 is an isometric view of the bird feeder of FIG. 11 with a different ornamental pattern on the body of the supporting member.
Figure 15:
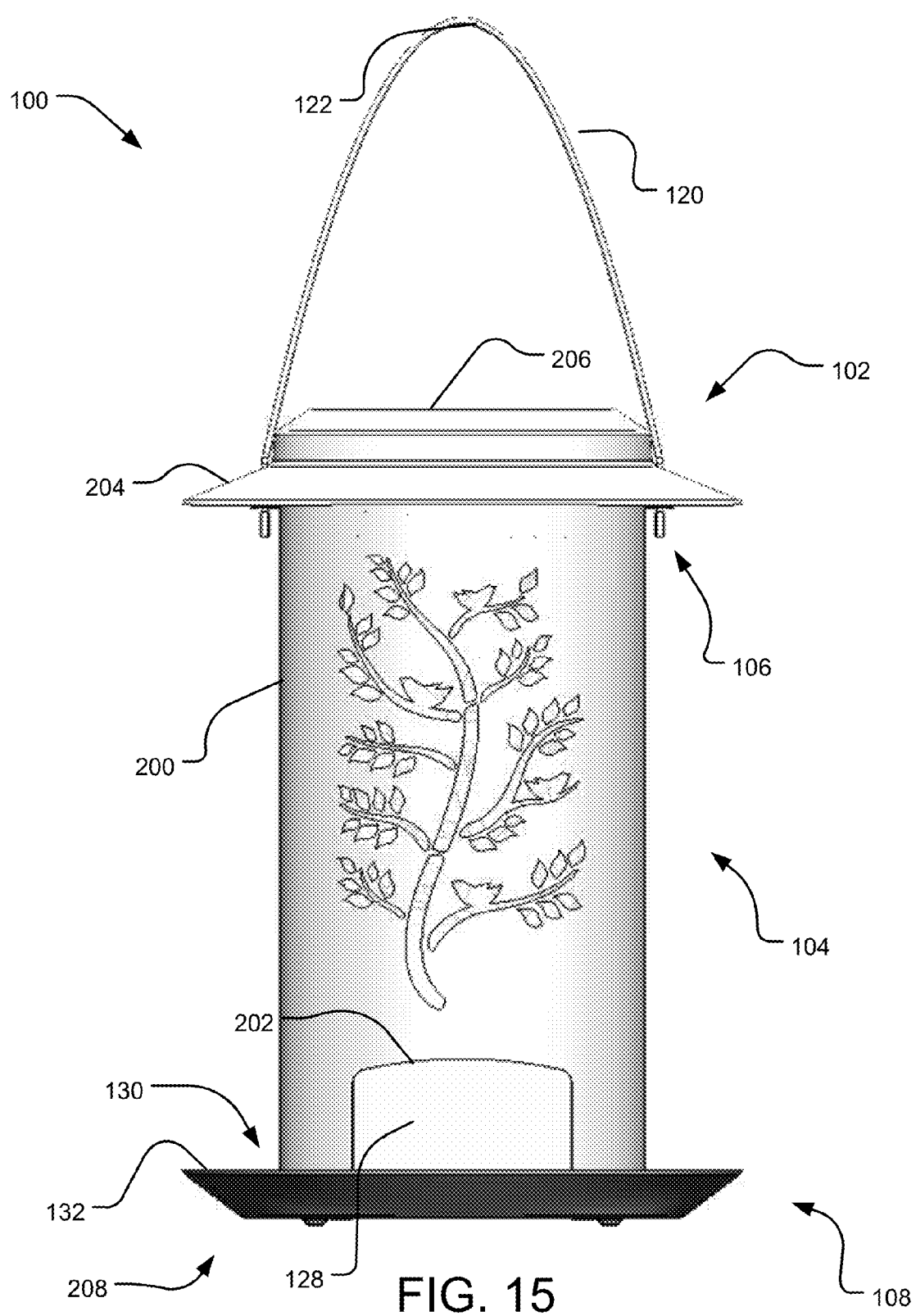
FIGS. 15 and 16 are side and front views, respectively, of the bird feeder of FIG. 14.
Figure 16:
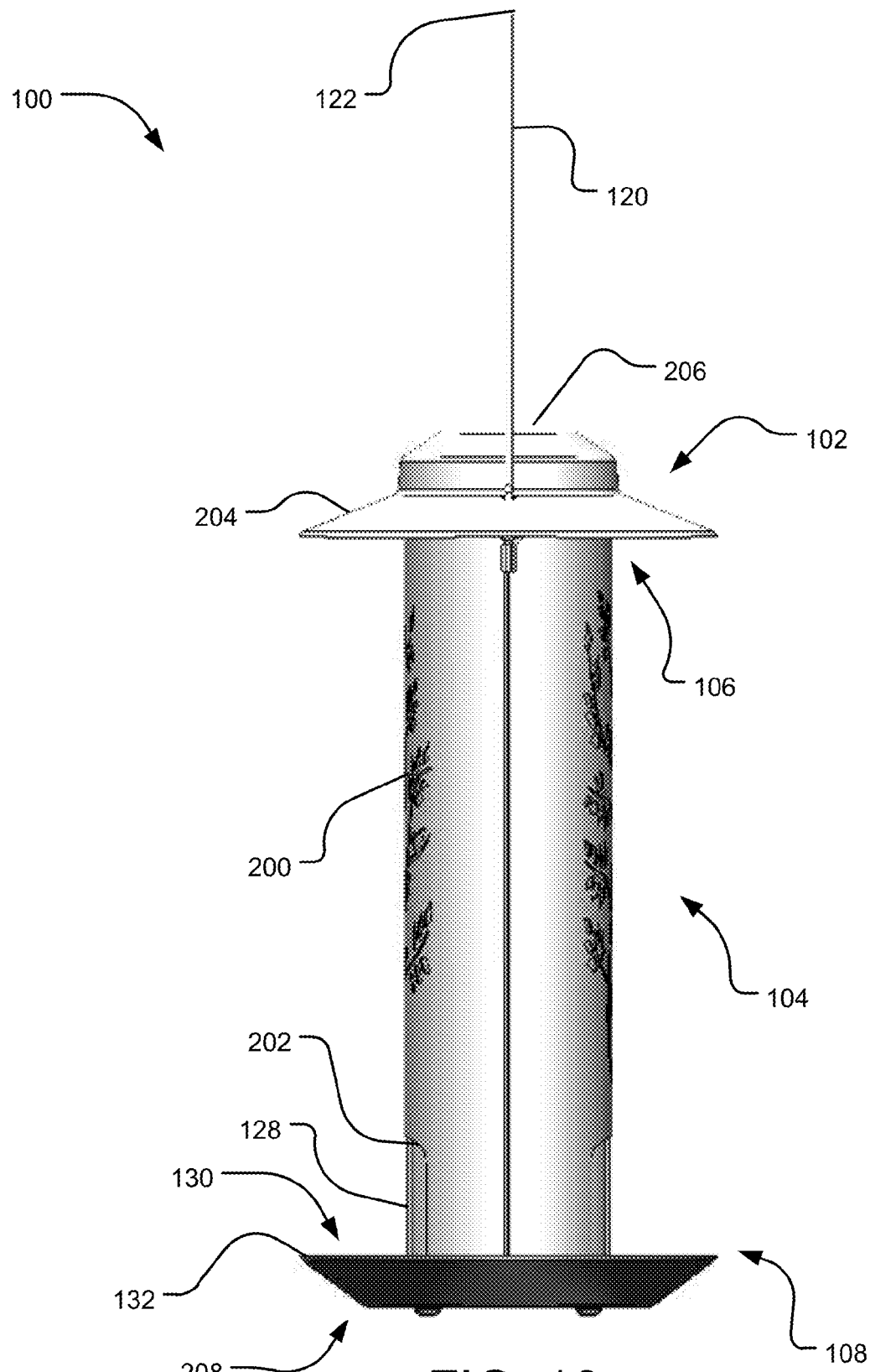
Figure 17A:
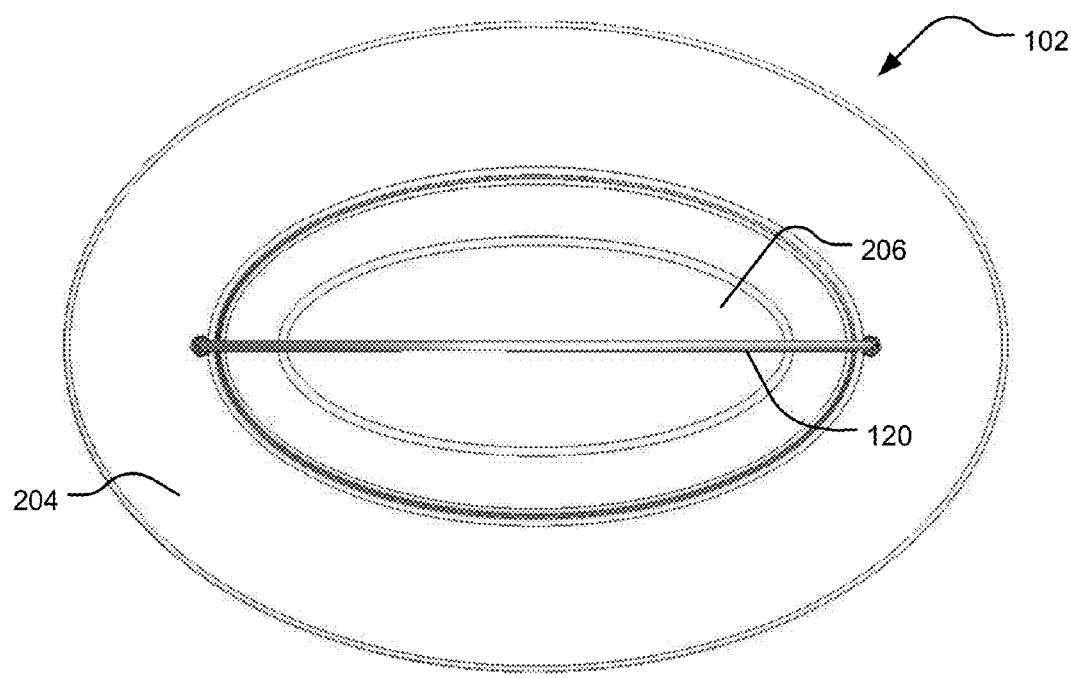
FIGS. 17A and 17B are top and bottom views, respectively, of the bird feeder of FIG. 11.
Figure 17B:
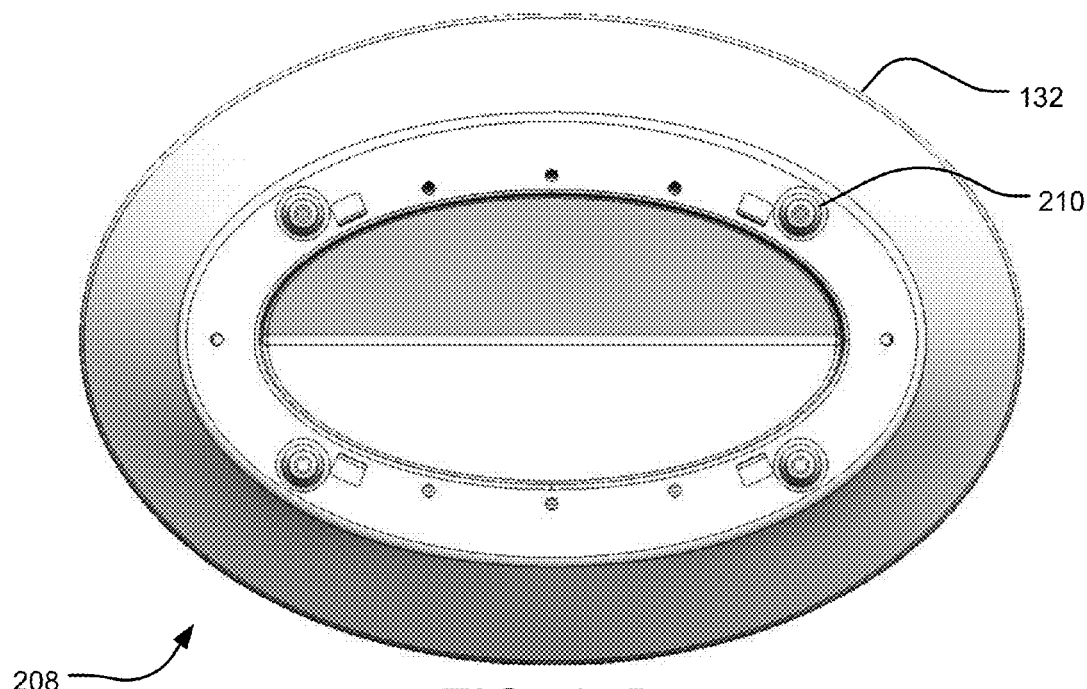

As can be understood from FIGS. 11-23B, in one implementation, the bottom section 108 includes a pair of opposing feeding stations 110, each defined by an opening in the elongated body 200 formed by a slot 202. The slots 202 may be a variety of sizes and shapes, including, but not limited to, arched, circular, elliptical, rectangular, triangular, contoured, angled, and/or the like. For example, as shown in FIGS. 11 and 14, the slots 202 may have a rectangular shape with curved corners. In one implementation, the slots 202 are sized to expose the slot 170 of the reversible insert 128 and the ports 168 when positioned adjacent to the slots 202.

Figure 18:
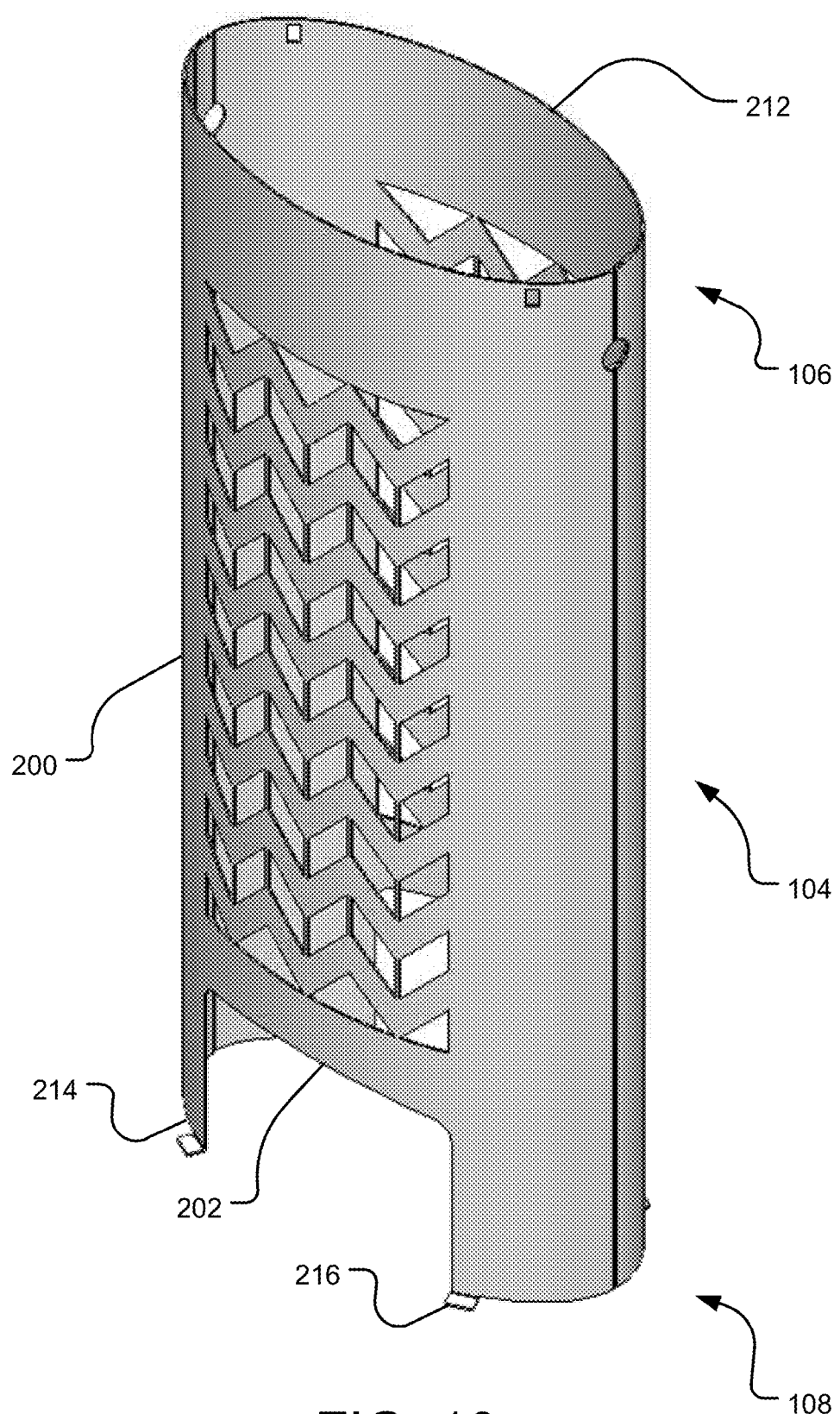
FIG. 18 shows an isometric view of an example supporting member.

Referring to FIG. 18, in one implementation, the elongated body 200 has a cylindrical shape with an elliptical circumference defined by the top section 106 and the bottom section 108. The top section 106 includes a top edge 212 configured to engage the receiving portion 206 of the cap 102, and the bottom section 108 includes a bottom edge 214 configured to engage the basin 208 using one or more securing features 216. In one implementation, the slots 202 intersect the bottom edge 214.

Figure 19:
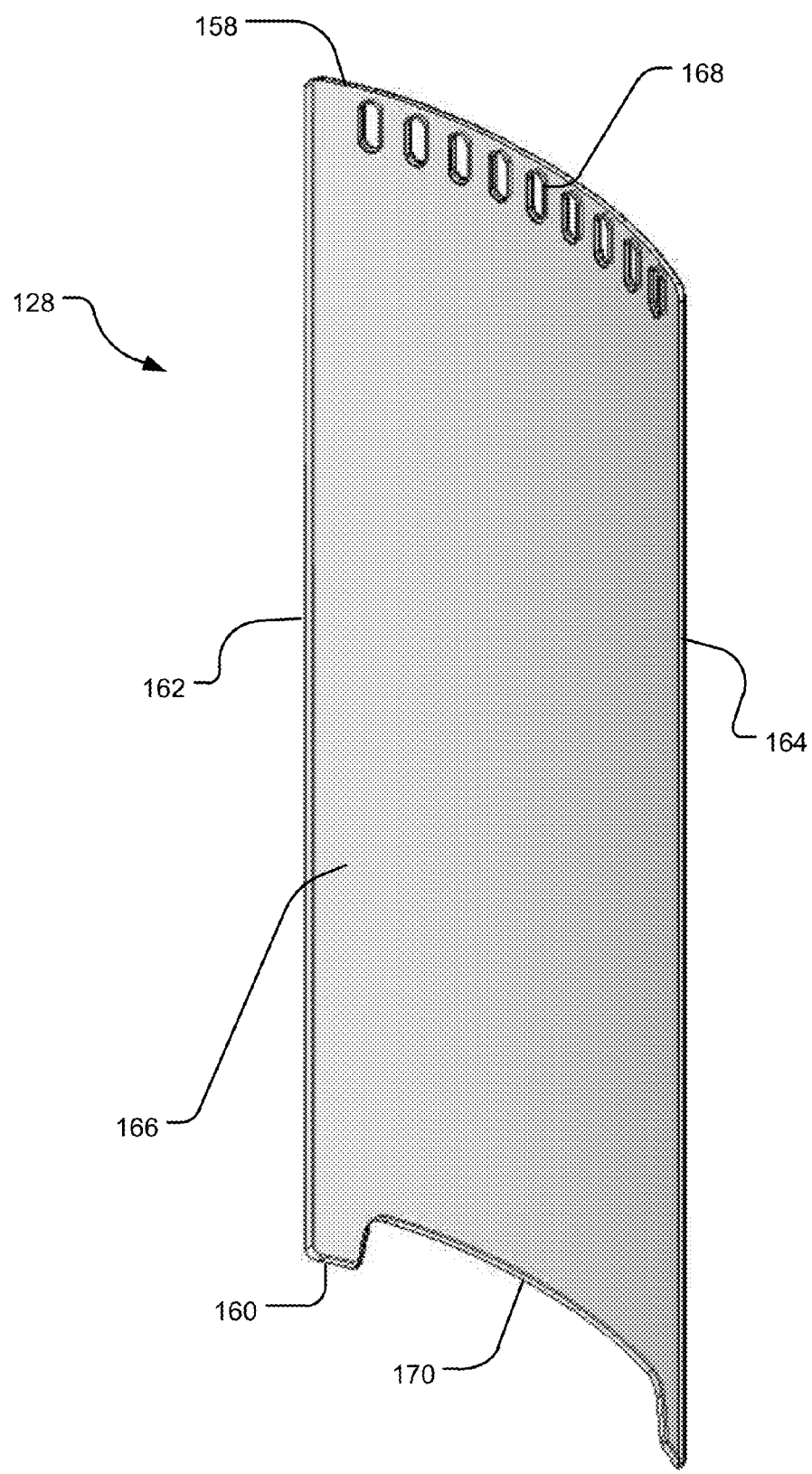
FIG. 19 illustrates an isometric view of another example reversible insert.

As can be understood from FIGS. 19-23B, in one implementation, the feeder 100 includes a pair of reversible inserts 128, each configured to be received by the elongated body 200, such that the reversible inserts 128 are positioned generally opposite each other and adjacent to the slots 202. The reversible inserts 128 may be sized and shaped to mirror the size and shape of the elongated body 200. For example, as shown in FIGS. 19-20C, the elongated body 166 of the reversible inserts 128 may be contoured, such that the elongated body 166 curves from the first side 162 to the second side 164 to match the cylindrical shape with an elliptical circumference of the elongated body 200, as shown in FIGS. 18-23B.

Figure 21:
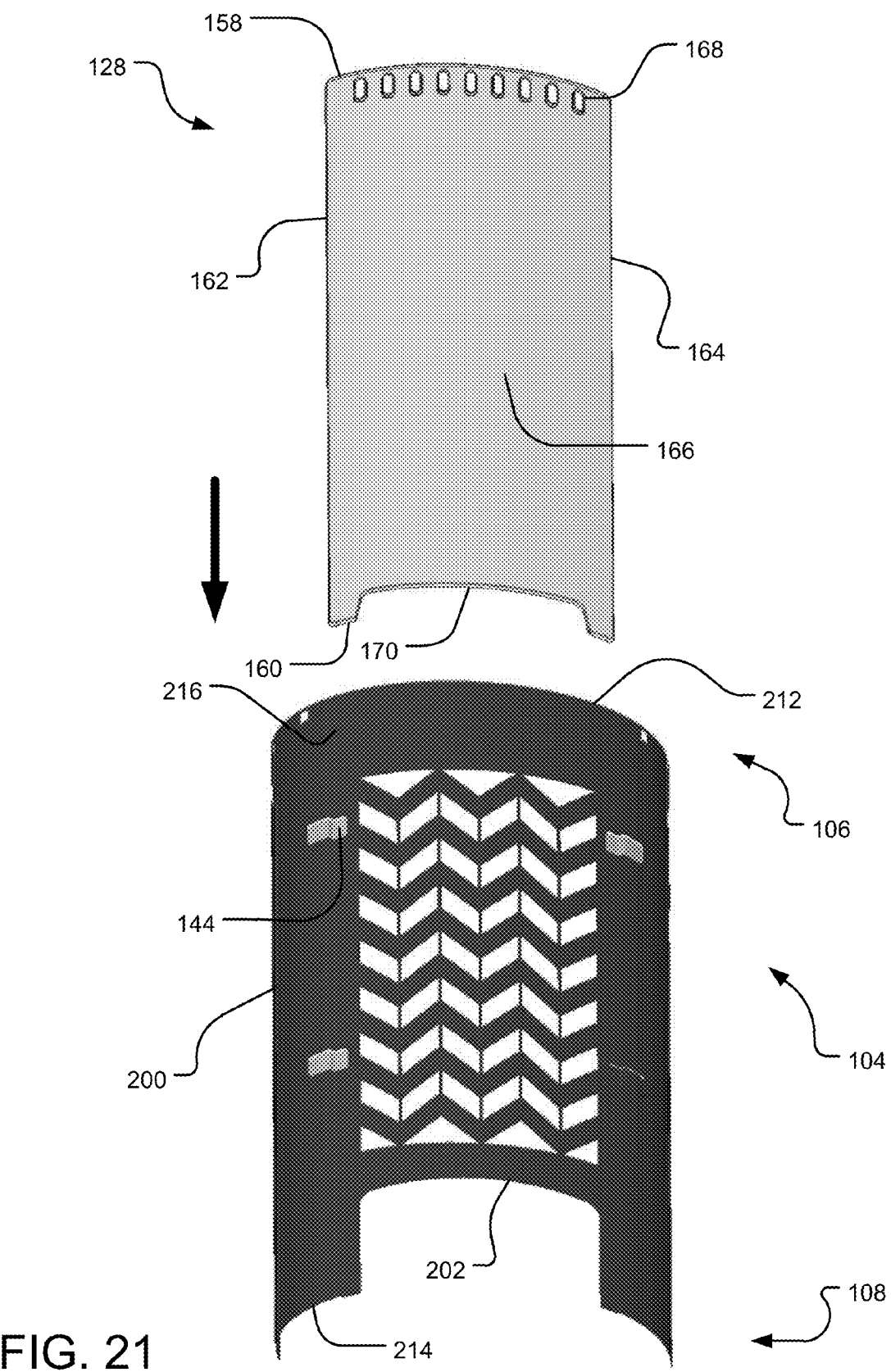
FIGS. 21 and 22 are side perspective views of the reversible insert of FIG. 19 being inserted into the supporting member of FIG. 18, removed and inserted, respectively.
Figure 22:
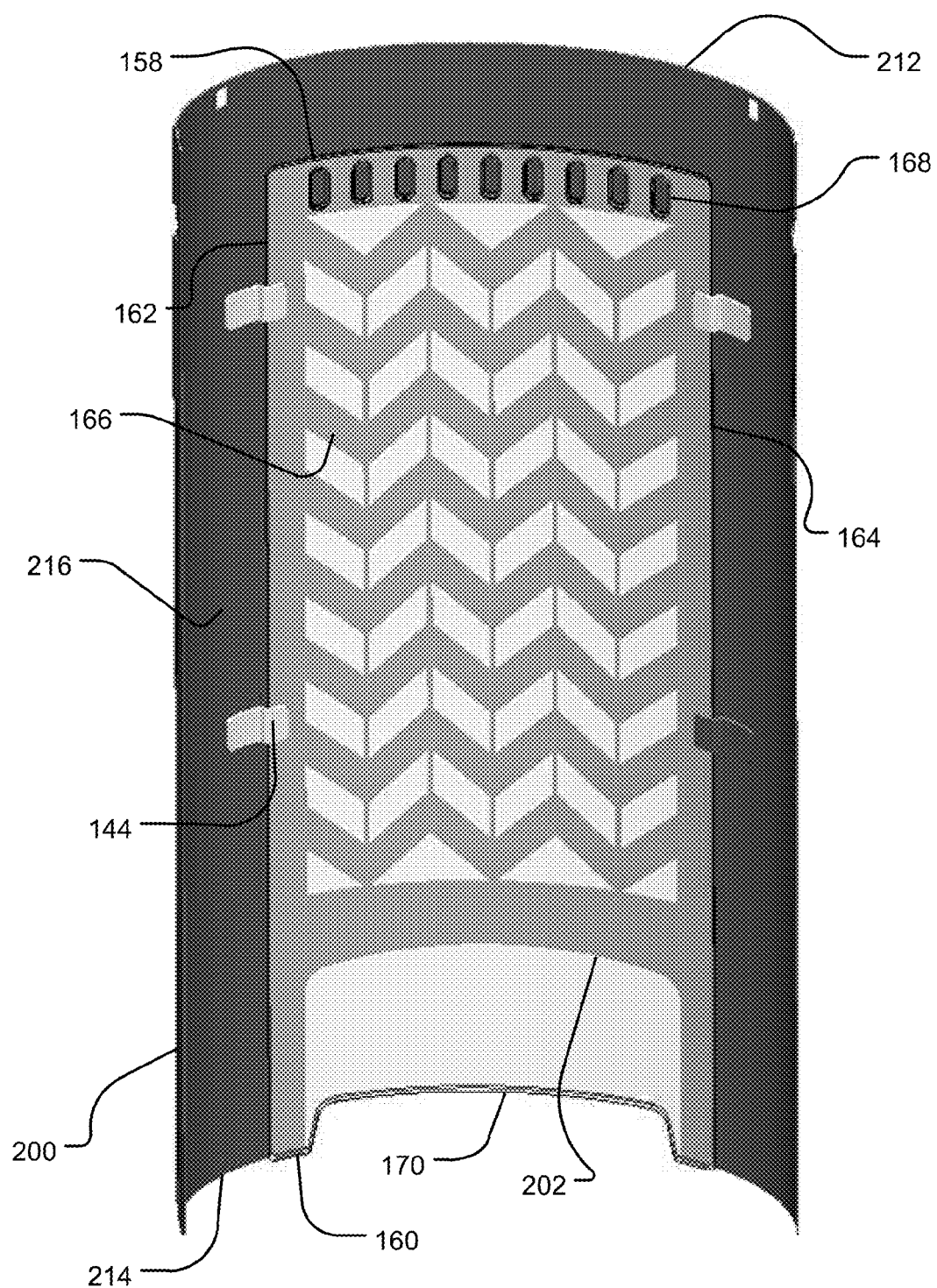

Referring to FIGS. 21-22, to configure the feeder 100 to dispense a desired seed type, in one implementation, each of the reversible inserts 128 is inserted along the guides 144 from the top section 106 until meeting the bottom section 108, such that one of the ends 158 or 160 is coplanar with the bottom edge 214. The guides 144 may be one or more tabs extending from an interior surface 218 of the elongated body 200 configured to receive the sides 162, 164 of the reversible insert 128.

As described herein, each of the reversible inserts 128 are removable and invertible, such that the frame is configured to receive the reversible inserts 128 in an orientation depending on a size of the bird seed chosen, which dictates the type of birds that will be attracted to the bird feeder.

In one implementation, the orientation includes positioning either the first end 158 or the second end 160 adjacent to the feeding station 110, defined by the slot 202, depending on the size of the bird seed to be dispensed. For large seed, such as sunflower seeds, the orientation includes positioning the second end 160 adjacent to the feeding station 110, such that the large seed is dispensed through the slot(s) 170, and for small seed, such as thistle seeds, the orientation includes positioning the first end 158 adjacent to the feeding station 110, such that the small seed is dispensed through the ports 168.

To position each of the reversible inserts 128, in one implementation, the cap 102 is removed, and each of the reversible inserts 128 is slidably inserted along the guides 144 until meeting the bottom section 108. Once inserted, the reversible inserts 128 are held in place by the supporting member 104, the bottom section 108, and/or the top section 106. In one implementation, once inserted, one of the ends 158 or 160 is positioned adjacent to the slot 202 and the sides 162, 164 are positioned in the guides 144. In the example shown in FIG. 22, the reversible insert 128 is oriented to dispense large seed, with the second end 160 positioned adjacent to the slot 202. If the user wishes to attract birds that eat smaller seeds, the reversible insert 128 may be removed, inverted, and inserted along the guides 144 until the first end 158 is positioned adjacent to the slot 202. Accordingly, the feeder 100 is convertible between a large seed feeder and a small seed feeder, such that the user may choose which birds to attract.

Figure 23A:
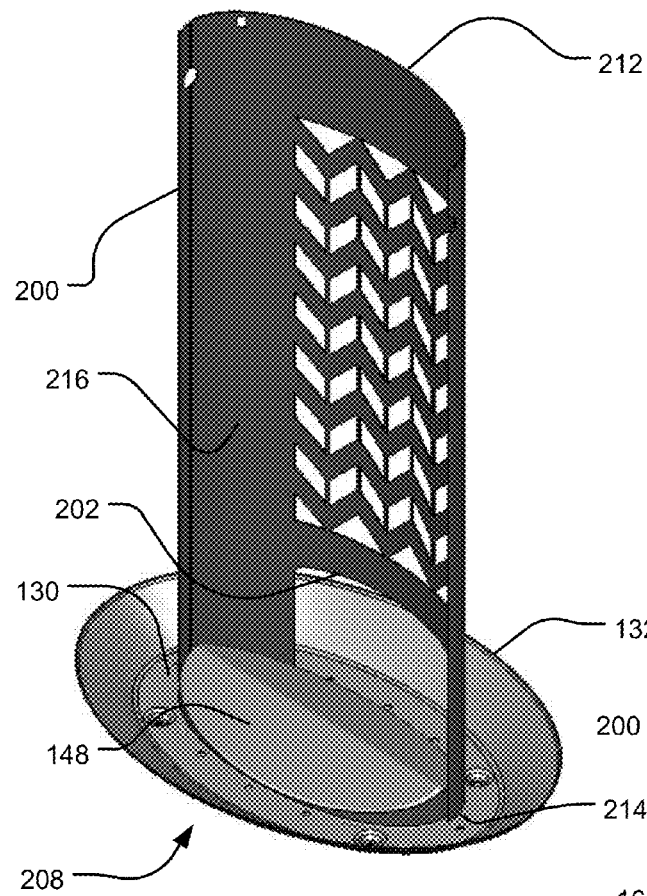
FIGS. 23A and 23B are isometric views of the supporting member of FIG. 18 engaging the basin with the reversible insert of FIG. 19, removed and inserted, respectively.
Figure 23B:
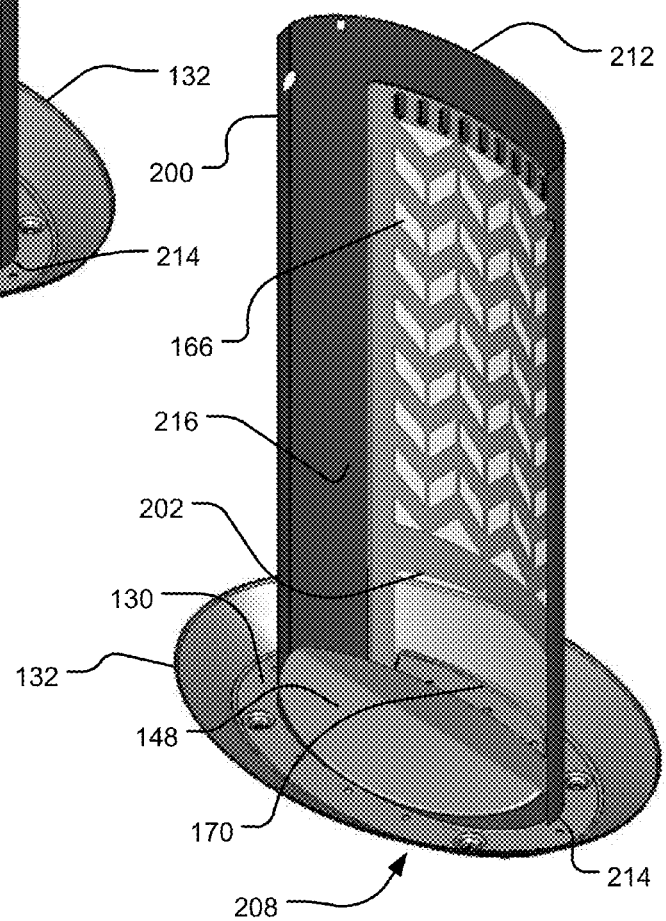

As can be understood from FIGS. 23A-B, in one implementation, the basin 208 includes the base 148 protruding from the trough 130 and extending generally perpendicularly to the elongated body 200. The base 148 may include one or more surfaces configured to direct the supply of seed to the slots 202. For example, as shown in FIGS. 23A-B, in one implementation, the base 148 includes a pair of surfaces angled toward the slots 202 to direct the seed to the slots 202.

Referring to FIGS. 24-33, the bottom section 108 includes four feeding stations 110, each defined by an opening in the elongated body 200 formed by a slot 202. In one implementation, the slots 202 are oriented as two pairs of opposing slots 202, such that the four slots 202 are spaced equally from each other along the bottom edge 214. It will be appreciated that any number of slots 202 may be provided in various orientations.

Figure 24:
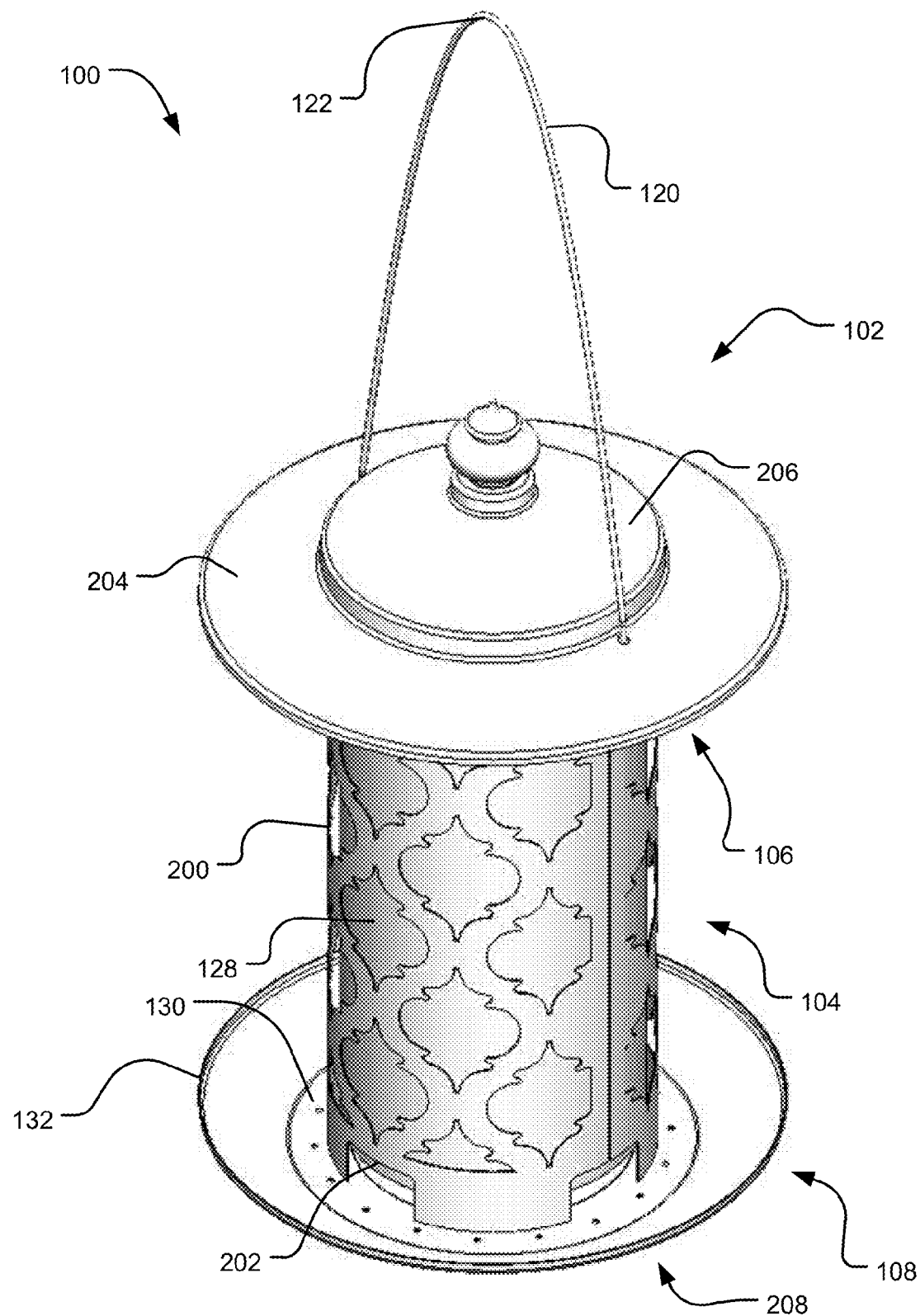
FIG. 24 illustrates an isometric view of another example bird feeder having a reversible insert for selectively attracting one or more types of wild birds.
Figure 25:
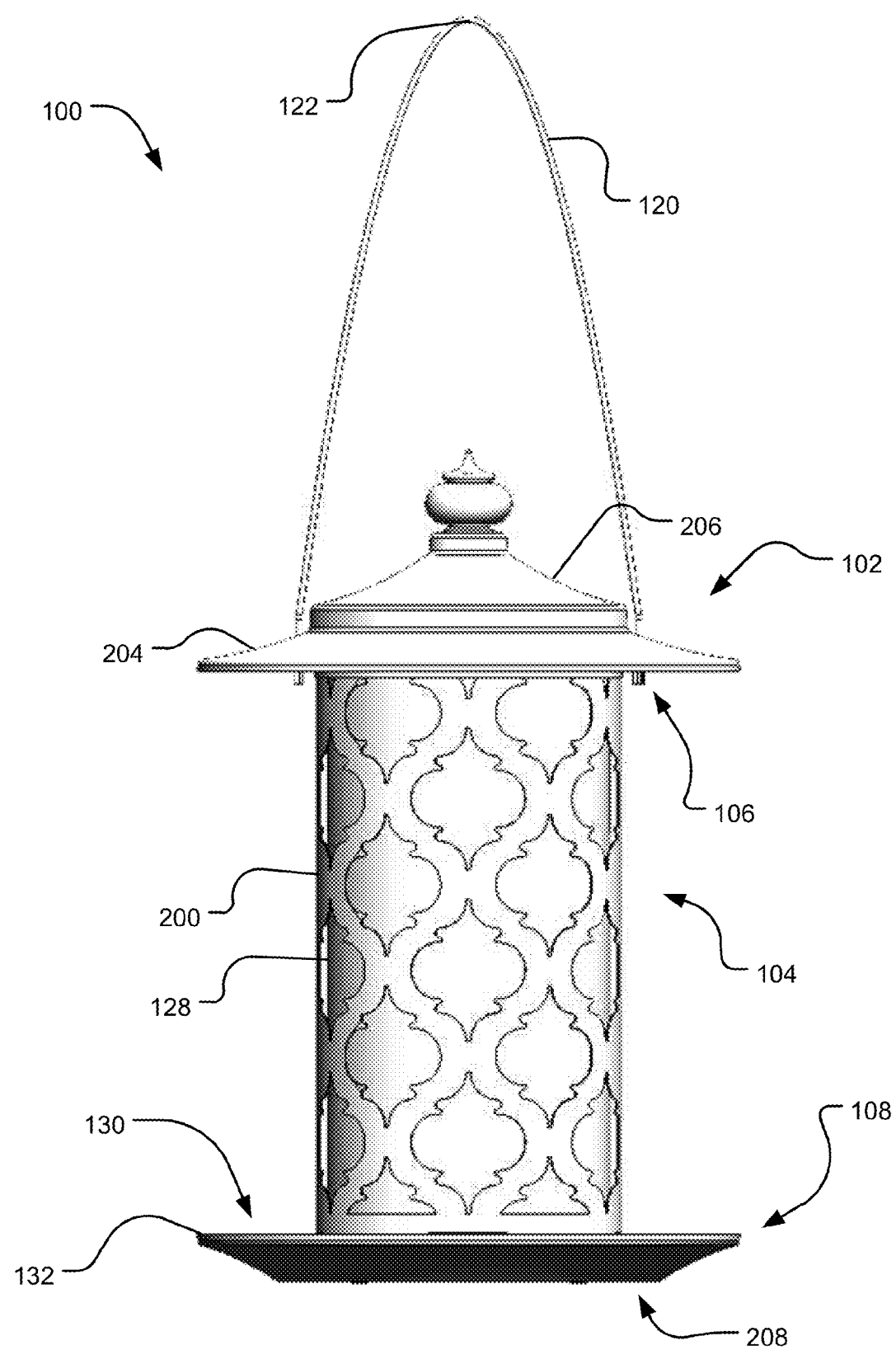

As described herein, the slots 202 may be a variety of sizes and shapes, including, but not limited to, arched, circular, elliptical, rectangular, triangular, contoured, angled, and/or the like. For example, as shown in FIG. 24, the slots 202 may have a rectangular shape with curved corners. In one implementation, the slots 202 are sized to expose the slot 170 of the reversible insert 128 and the ports 168 when positioned adjacent to the slots 202.

Figure 28:
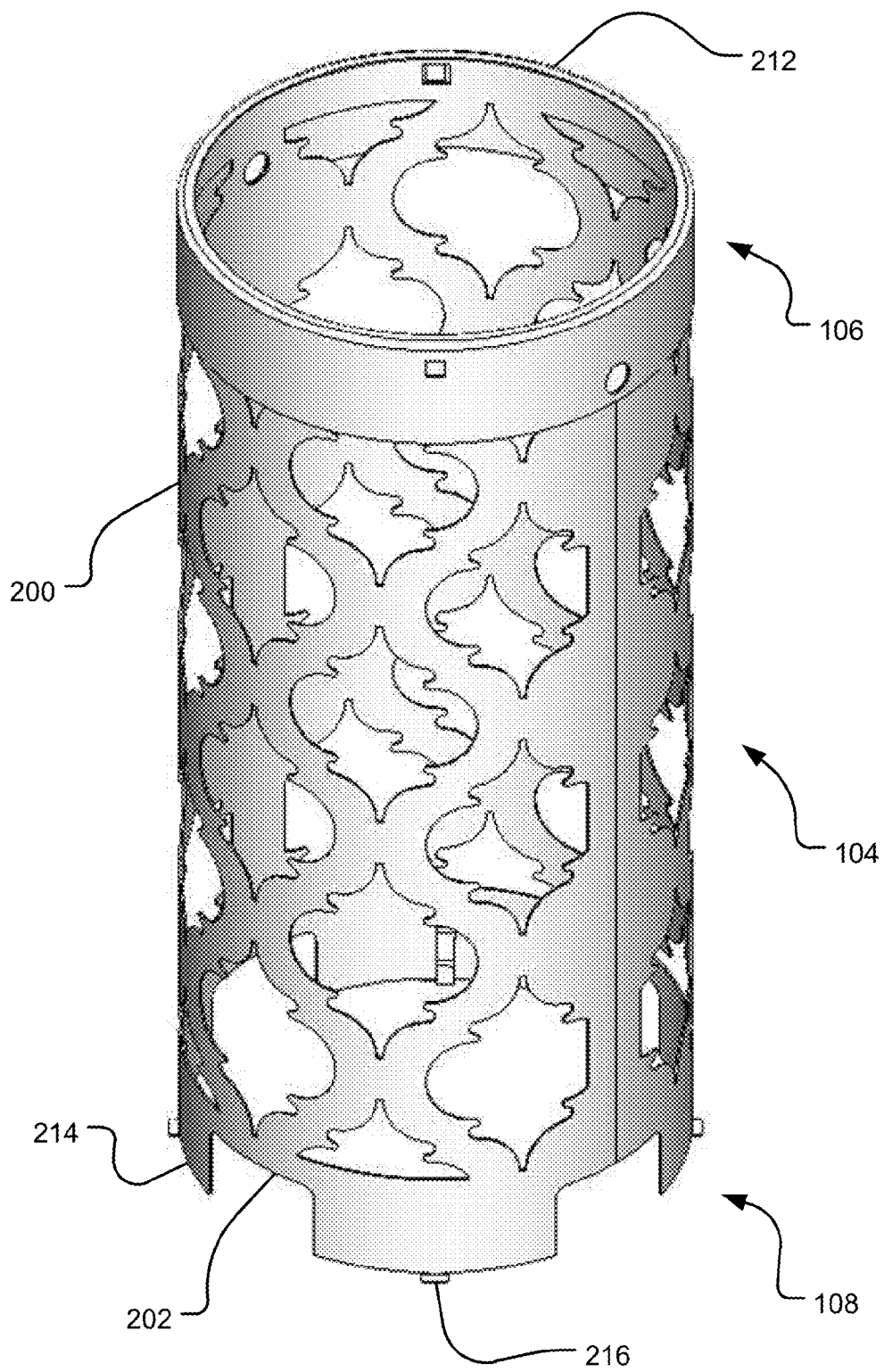
FIG. 28 shows an isometric view of an example supporting member.

Referring to FIG. 28, in one implementation, the elongated body 200 has a cylindrical shape with a circular circumference defined by the top section 106 and the bottom section 108. The top section 106 includes the top edge 212 configured to engage the receiving portion 206 of the cap 102, and the bottom section 108 includes the bottom edge 214 configured to engage the basin 208 using the securing features 216. In one implementation, the slots 202 intersect the bottom edge 214.

As can be understood from FIGS. 29-32, in one implementation, the feeder 100 includes one reversible insert 128 configured to be received by the elongated body 200. The reversible insert 128 may be sized and shaped to mirror the size and shape of the elongated body 200. For example, as shown in FIGS. 29-32B, the elongated body 166 of the reversible insert 128 is cylindrical in shape extending from the first edge 158 to the second edge 160 to match the cylindrical shape of the elongated body 200, as shown in FIGS. 29-32.

Figure 31:
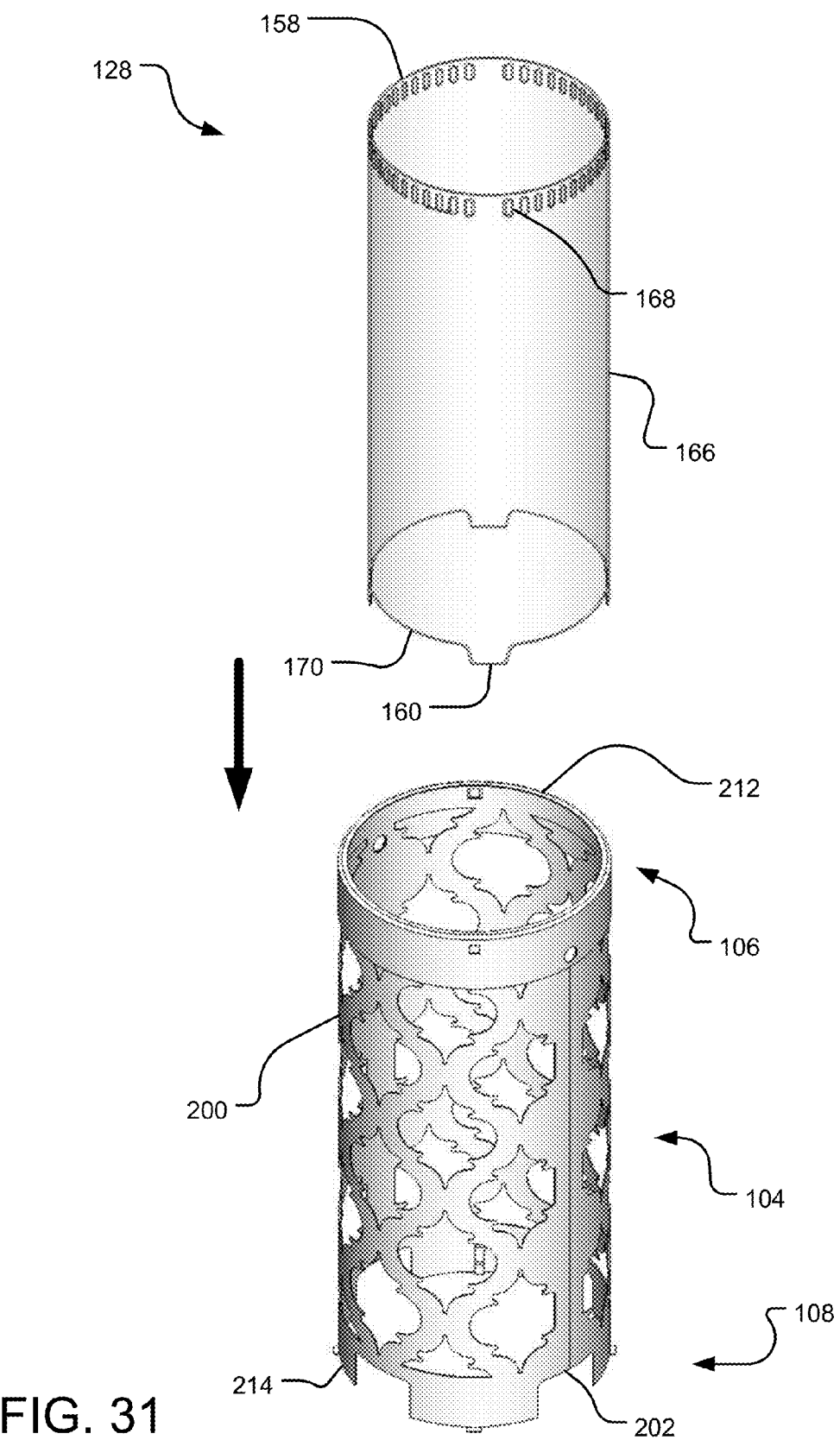
FIGS. 31 and 32 are side perspective views of the reversible insert of FIG. 29 being inserted into the supporting member of FIG. 28, removed and inserted, respectively.
Figure 32:
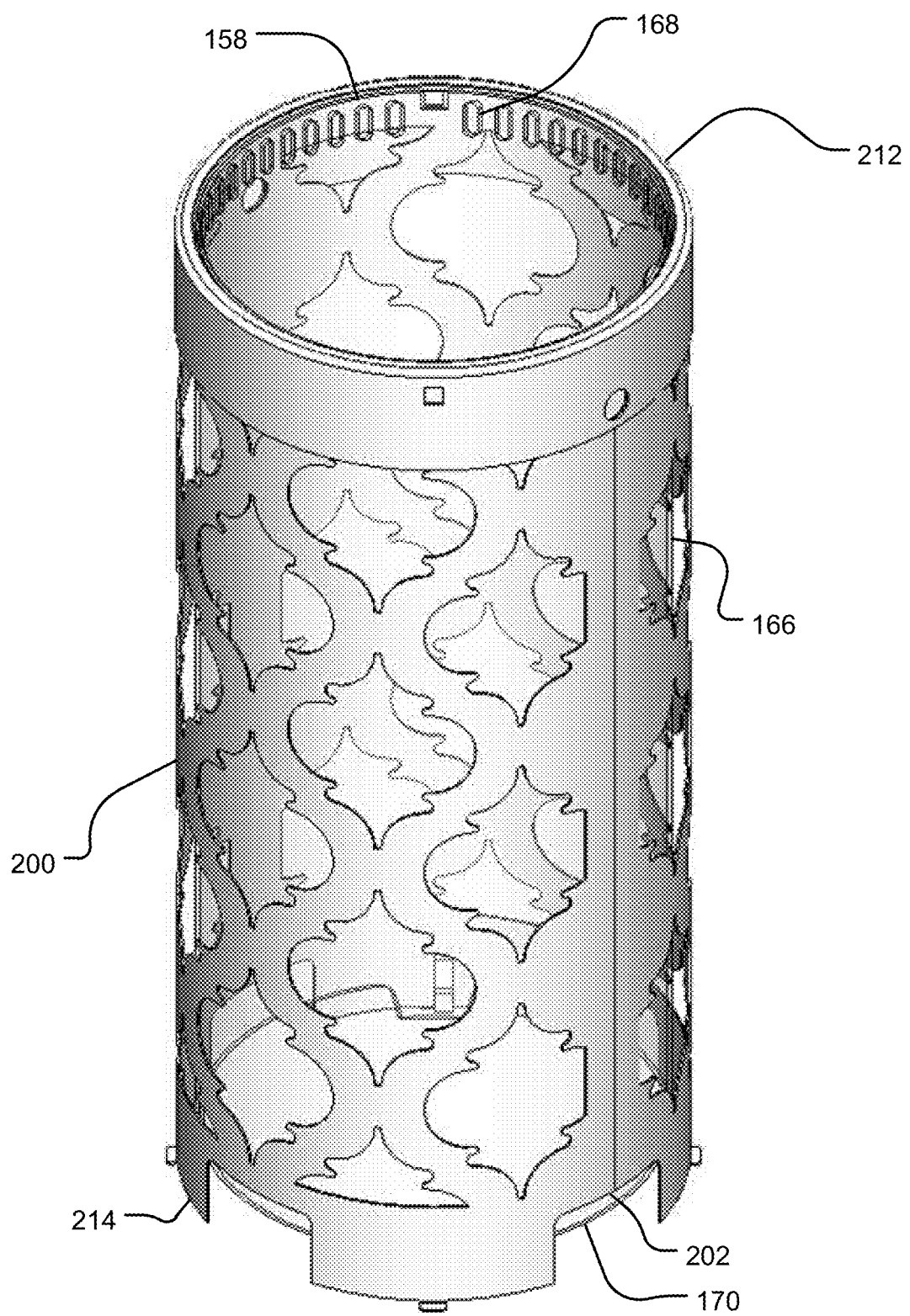
Figure 33:
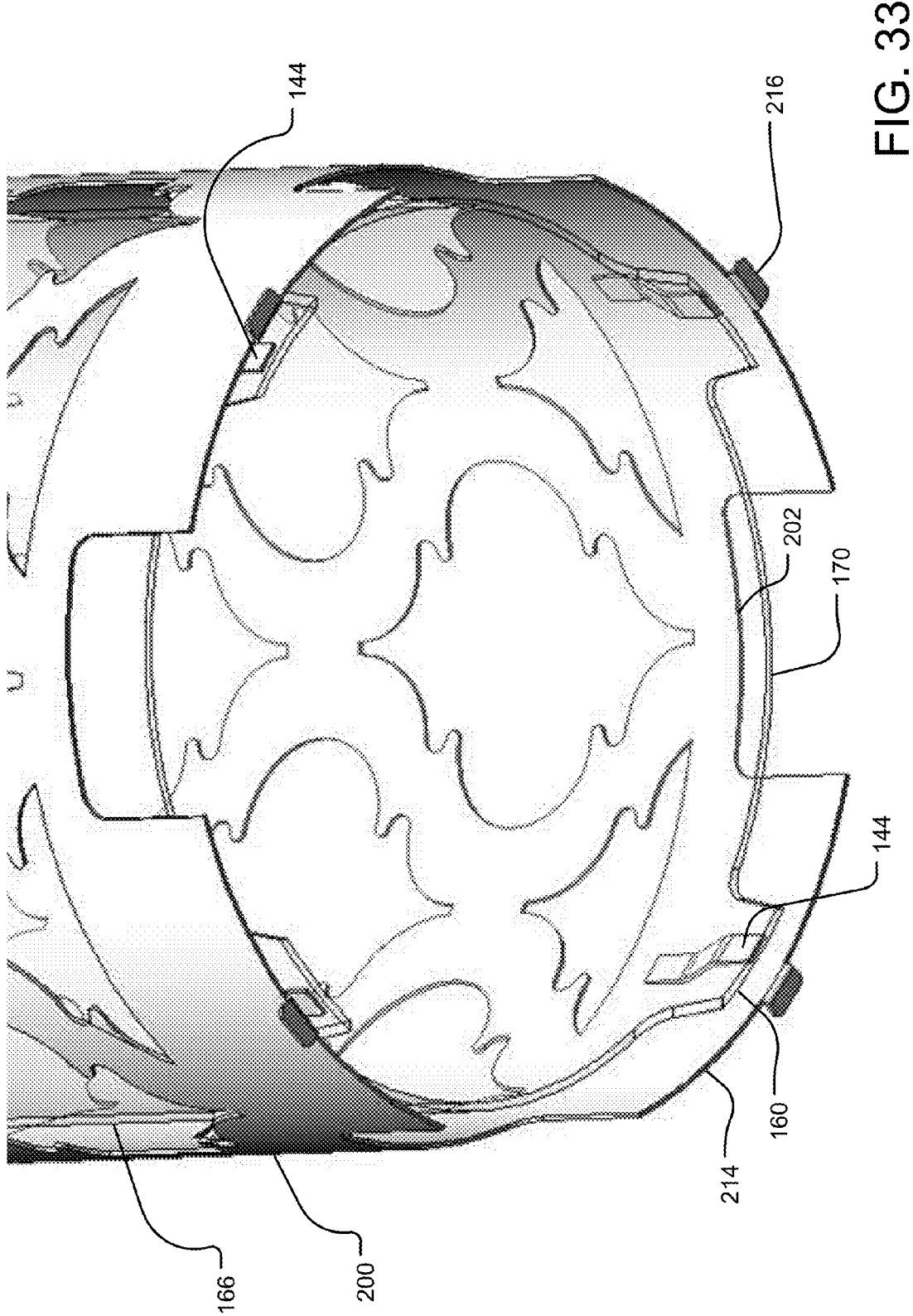
FIG. 33 shows a bottom perspective view of the reversible insert of FIG. 29 inserted into the supporting member of FIG. 28.

Referring to FIGS. 31-33, to configure the feeder 100 to dispense a desired seed type, in one implementation, the reversible insert 128 is inserted along a length of the elongated body. 200 from the top section 106 until meeting the bottom section 108, such that one of the ends 158 or 160 engages the guides 144. The guides 144 may be one or more members protruding from the interior surface 218 of the elongated body 200 to position the sides 162, 164 of the reversible insert 128.

As described herein, the reversible insert 128 is removable and invertible, such that the frame is configured to receive the reversible insert 128 in an orientation depending on a size of the bird seed chosen, which dictates the type of birds that will be attracted to the bird feeder.

In one implementation, the orientation includes positioning either the first end 158 or the second end 160 adjacent to the feeding station 110, defined by the slot 202, depending on the size of the bird seed to be dispensed. For large seed, such as sunflower seeds, the orientation includes positioning the second end 160 adjacent to the feeding station 110, such that the large seed is dispensed through the slot(s) 170, and for small seed, such as thistle seeds, the orientation includes positioning the first end 158 adjacent to the feeding station 110, such that the small seed is dispensed through the ports 168.

To position the reversible insert 128, in one implementation, the cap 102 is removed, and the reversible insert 128 is slidably inserted along a length of the elongated body 200 until meeting the bottom section 108. Once inserted, the reversible insert 128 is held in place by the supporting member 104, the bottom section 108, and/or the top section 106. In one implementation, once inserted, one of the ends 158 or 160 is positioned adjacent to the slots 202 with the other end positioned near the top section 106. The guides 144 may hold the reversible insert 128 in place. In the example shown in FIG. 32, the reversible insert 128 is oriented to dispense large seed, with the second end 160 positioned adjacent to the slots 202. If the user wishes to attract birds that eat smaller seeds, the reversible insert 128 may be removed, inverted, and inserted along a length of the elongated body 200 until the first end 158 is positioned adjacent to the slots 202. Accordingly, the feeder 100 is convertible between a large seed feeder and a small seed feeder, such that the user may choose which birds to attract.

Referring to FIGS. 34-41, in one implementation, the supporting member 104 includes a cage formed by a plurality of elongated rods 300 extending vertically from the bottom section 108 to the top section 106 and a plurality of looped rods 302 extending around the elongated body 166 of the reversible insert 128. There may be any number of the elongated rods 300 and/or the looped rods 302 of any shape or size according to design preferences.

In one implementation, the bottom section 108 includes four feeding stations 110, each defined by an opening in a body 306 formed by a slot 202. In one implementation, the slots 202 are oriented as two pairs of opposing slots 202, such that the four slots 202 are spaced equally from each other along the bottom edge 214. It will be appreciated that any number of slots 202 may be provided in various orientations.

Figure 34:
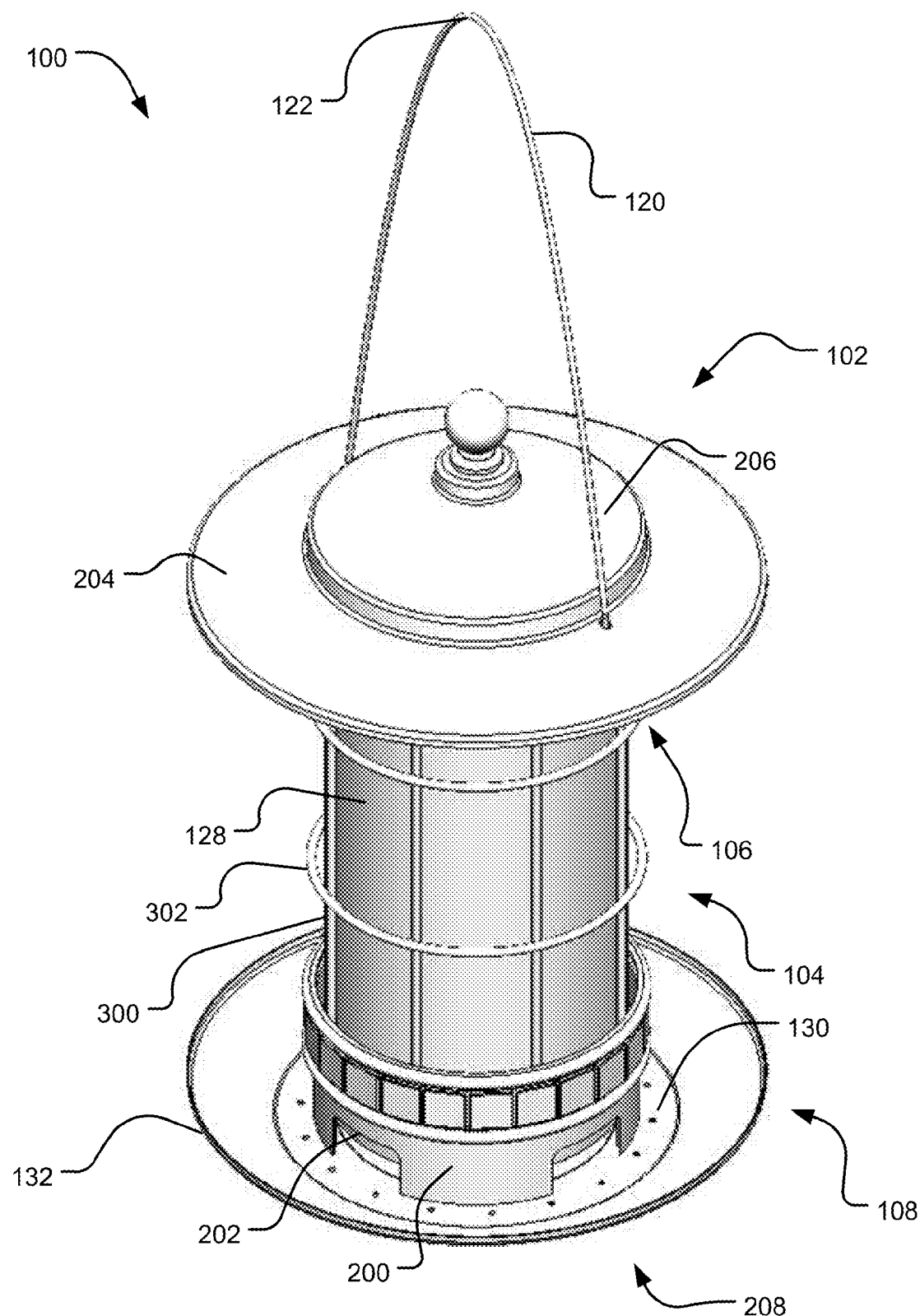
FIG. 34 illustrates an isometric view of another example bird feeder having a reversible insert for selectively attracting one or more types of wild birds.
Figure 35:
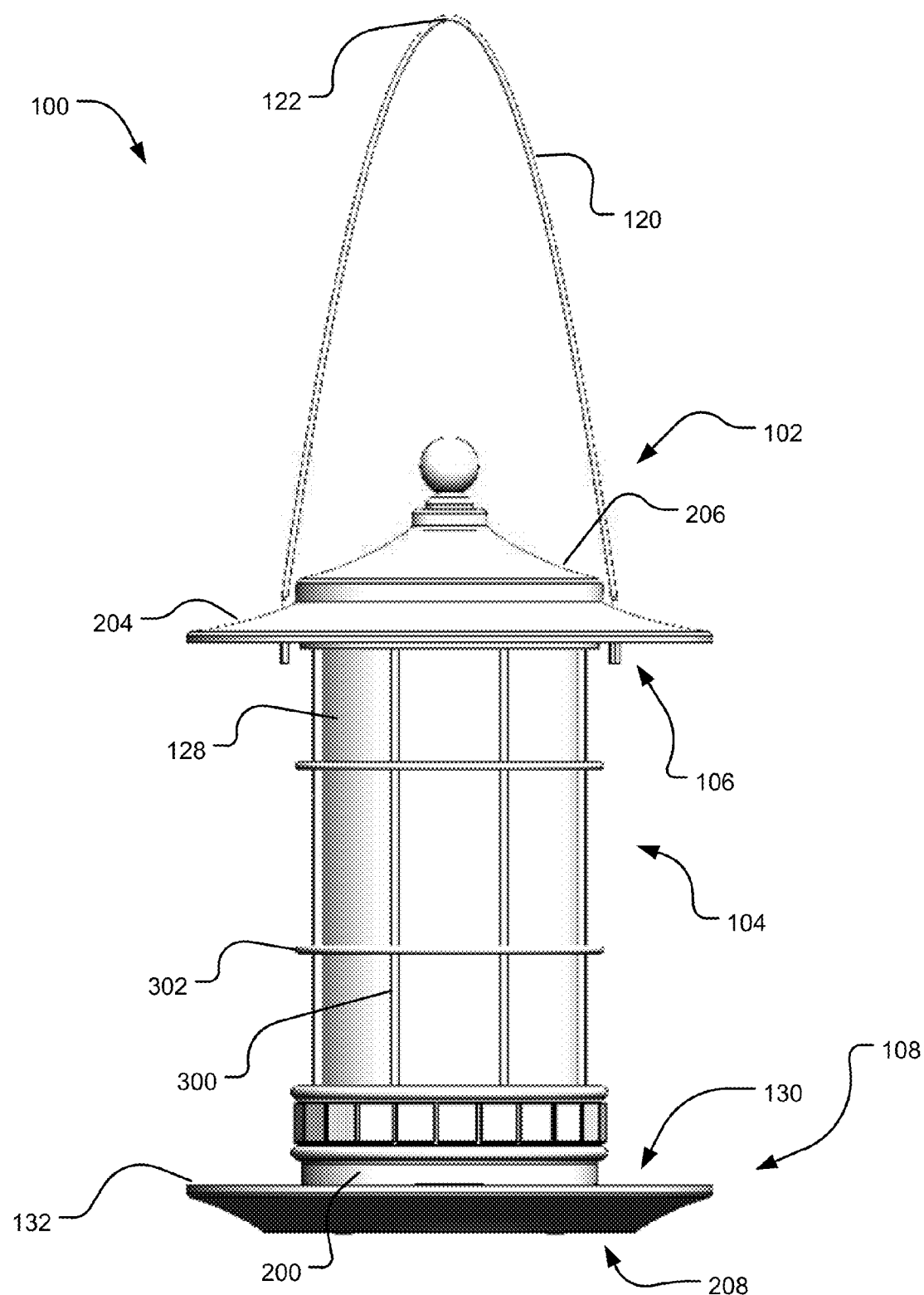
FIGS. 35 and 36 are side and front views, respectively, of the bird feeder of FIG. 34.
Figure 36:
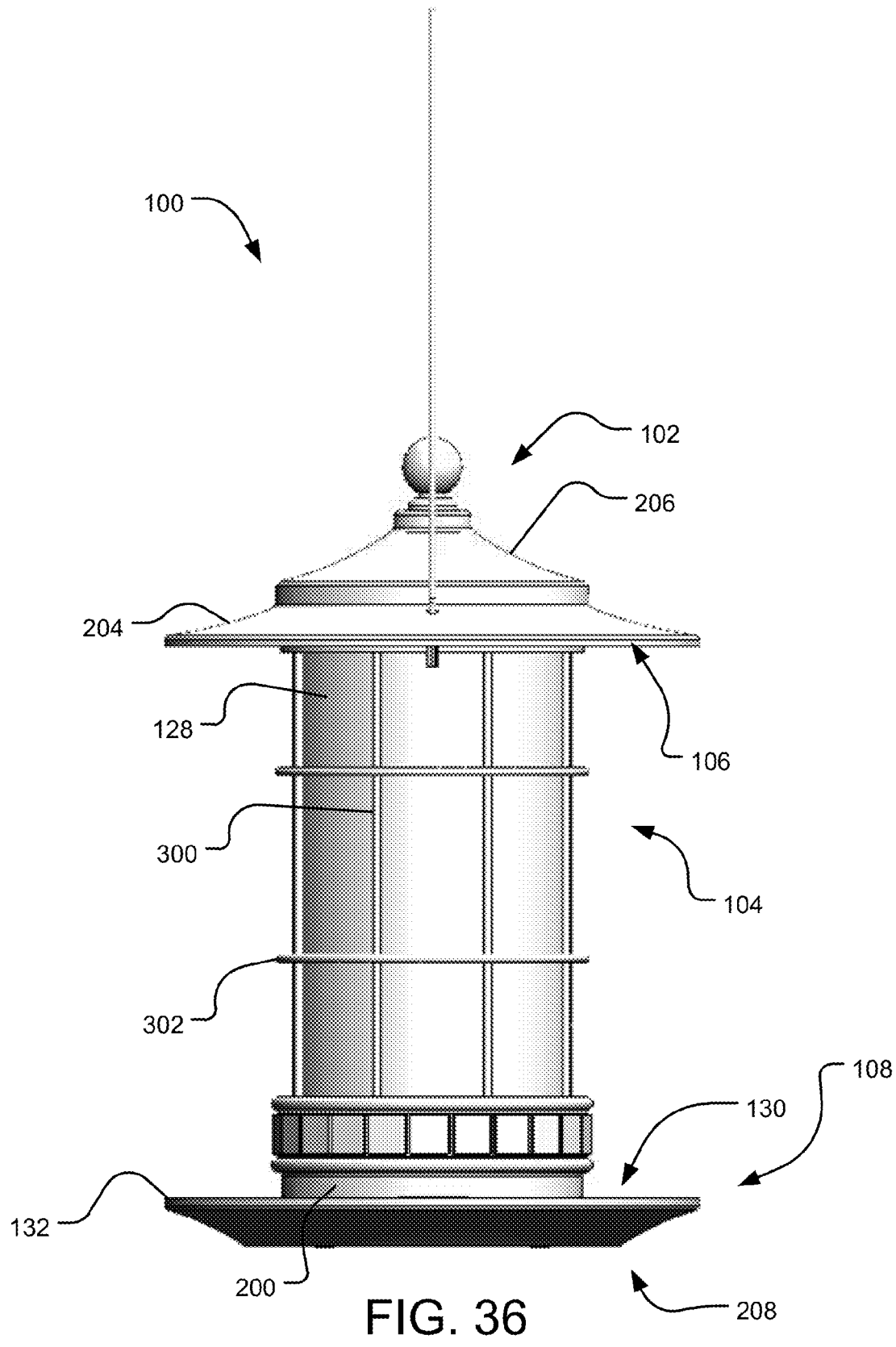
Figure 37:
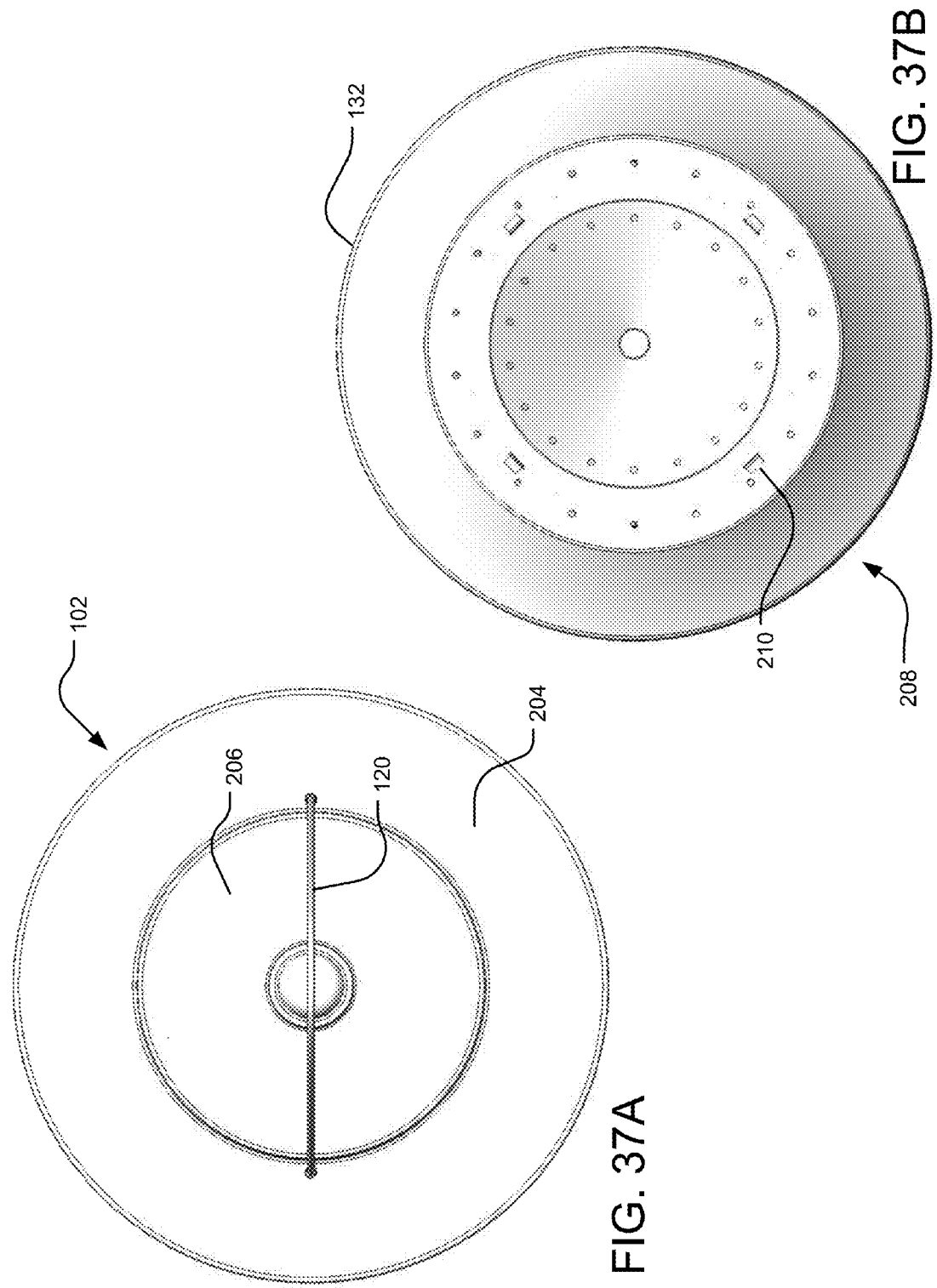
FIGS. 37A and 37B are top and bottom views, respectively, of the bird feeder of FIG. 34.
Figure 38:
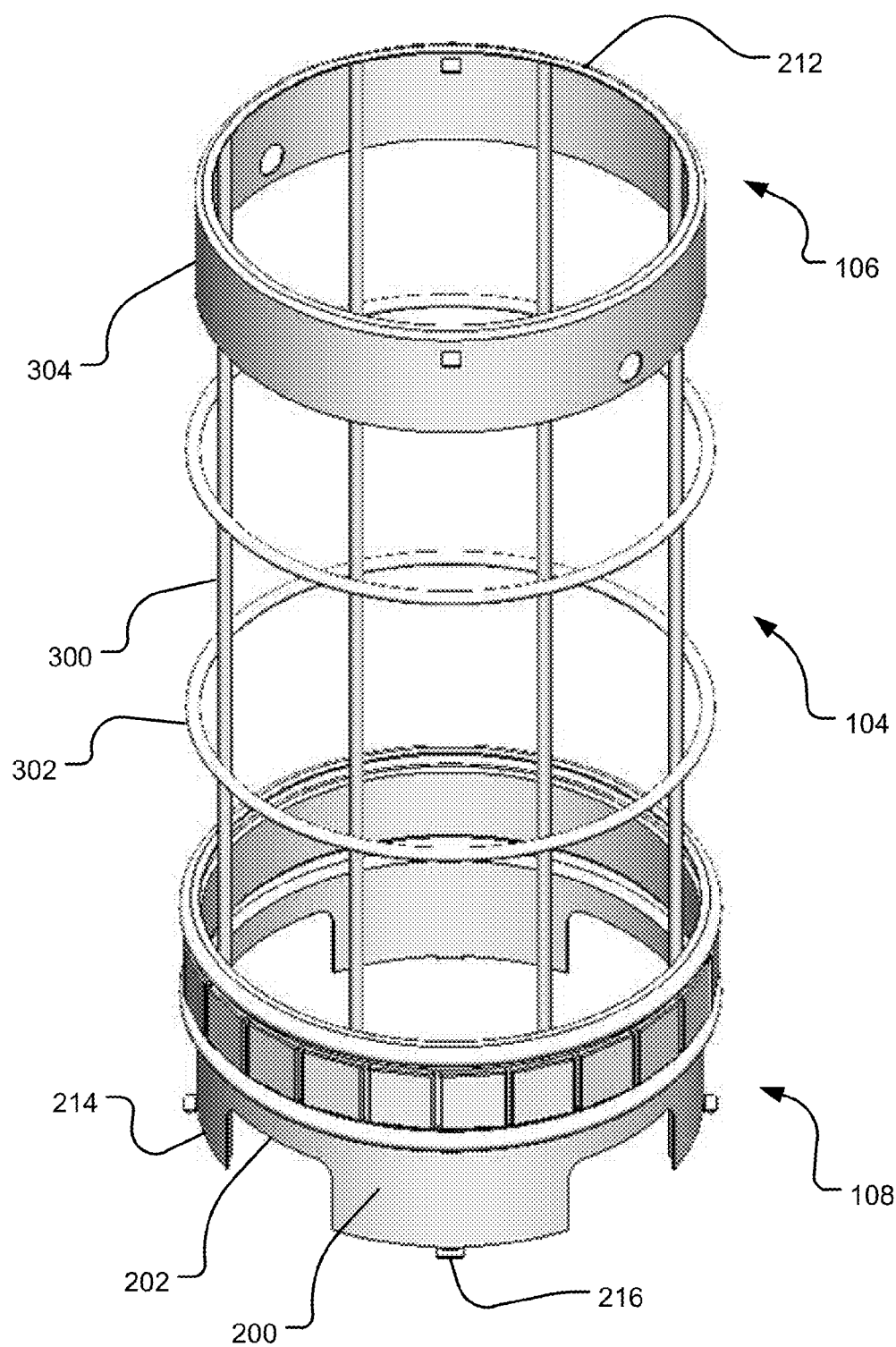
FIG. 38 shows an isometric view of an example supporting member.

As described herein, the slots 202 may be a variety of sizes and shapes, including, but not limited to, arched, circular, elliptical, rectangular, triangular, contoured, angled, and/or the like. For example, as shown in FIG. 34, the slots 202 may have a rectangular shape with curved corners. In one implementation, the slots 202 are sized to expose the slot 170 of the reversible insert 128 and the ports 168 when positioned adjacent to the slots 202.

Referring to FIG. 28, in one implementation, the top section 106 includes a collar 304 extending around and connecting the elongated rods 300. The collar 304 is configured to engage the cap 102. In one implementation, the frame formed by the body 306, the collar 304, and the cage has a cylindrical shape with a circular circumference defined by the top section 106 and the bottom section 108. The top section 106 includes the top edge 212 configured to engage the receiving portion 206 of the cap 102, and the bottom section 108 includes the bottom edge 214 configured to engage the basin 208 using the securing features 216. In one implementation, the slots 202 intersect the bottom edge 214.

Figure 29:
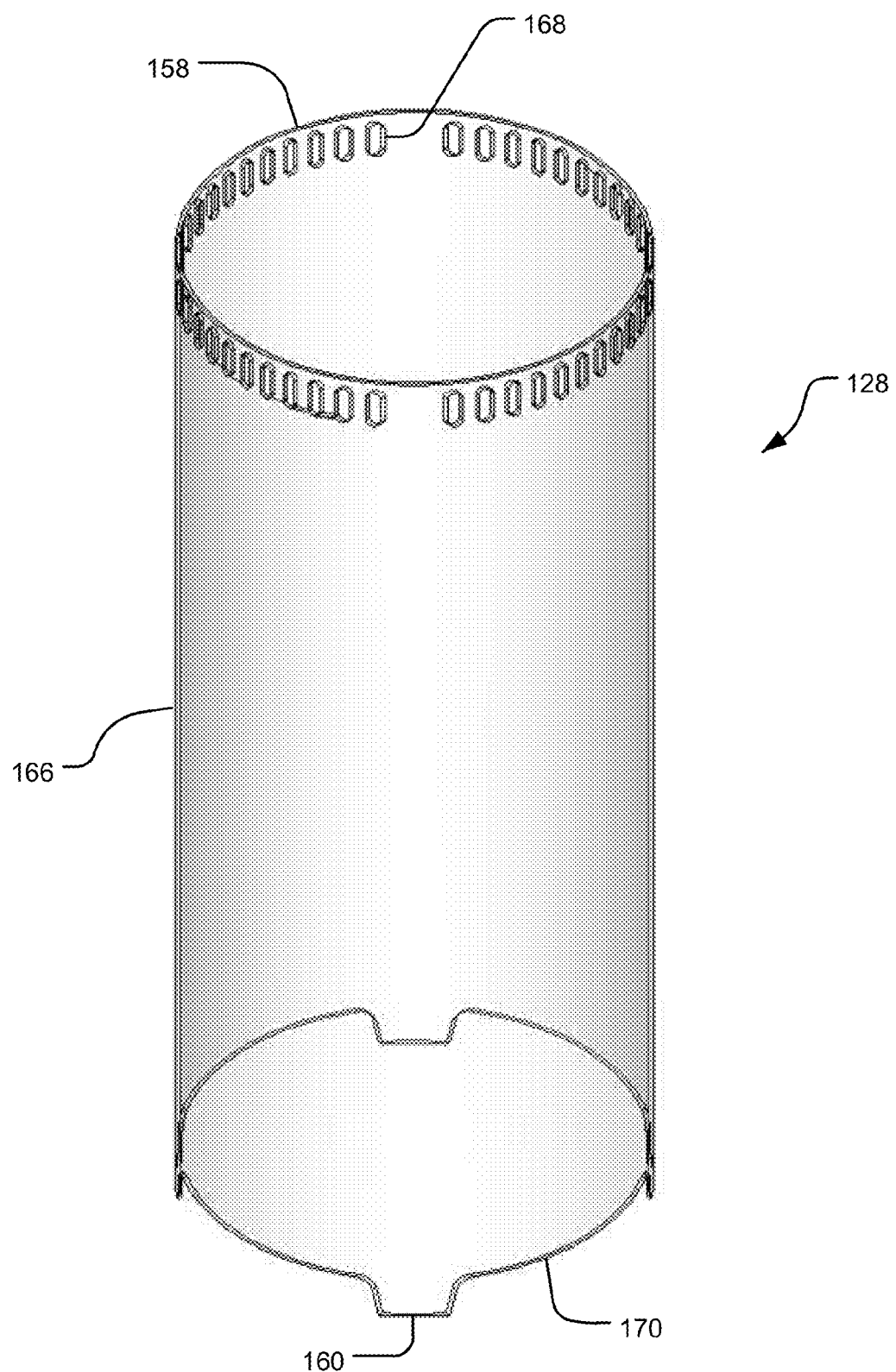
FIG. 29 illustrates an isometric view of another example reversible insert.
Figures 30A, 30B:
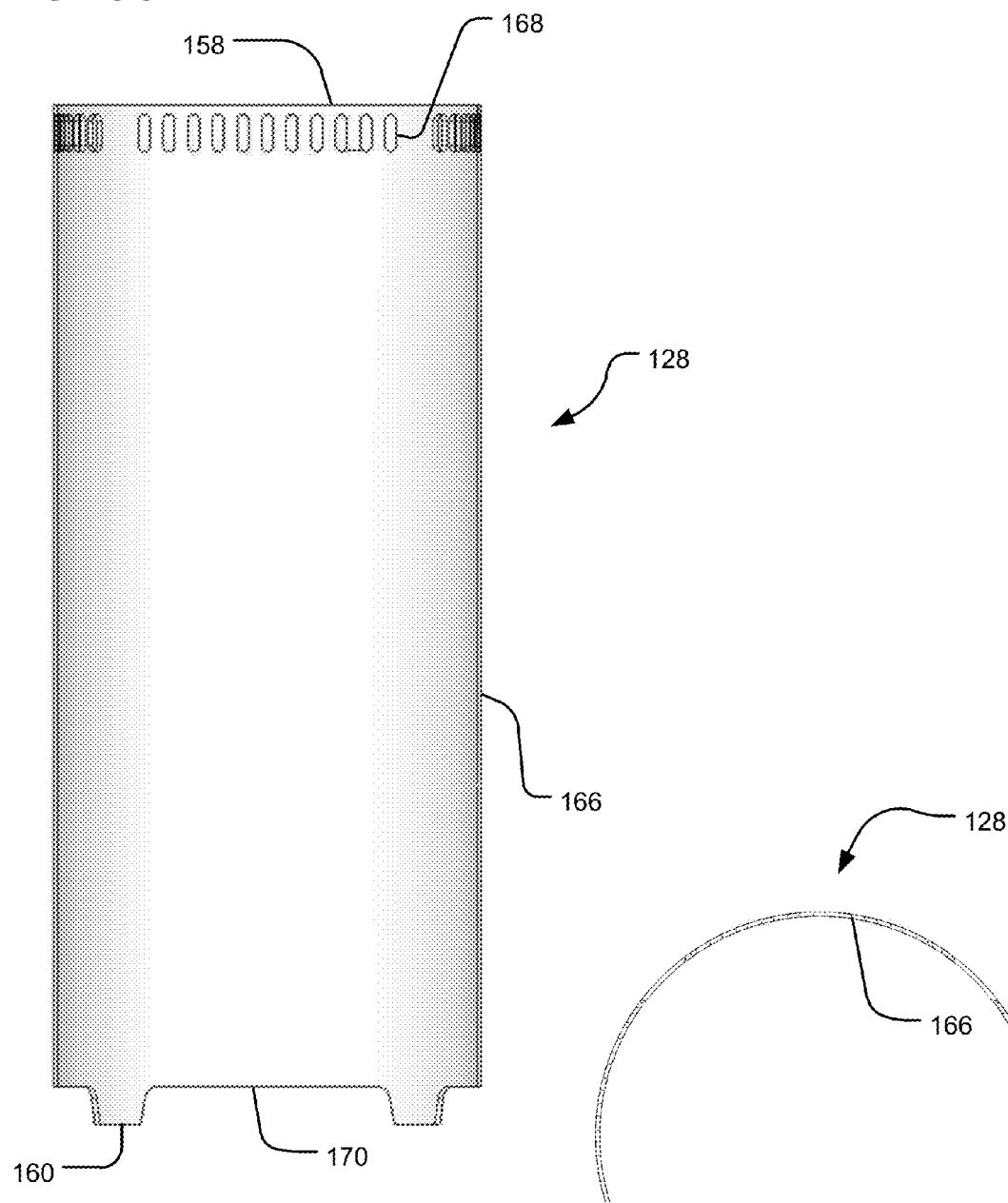
FIGS. 30A and 30B show side and top views, respectively of the reversible insert of FIG. 29.
Figure 39:
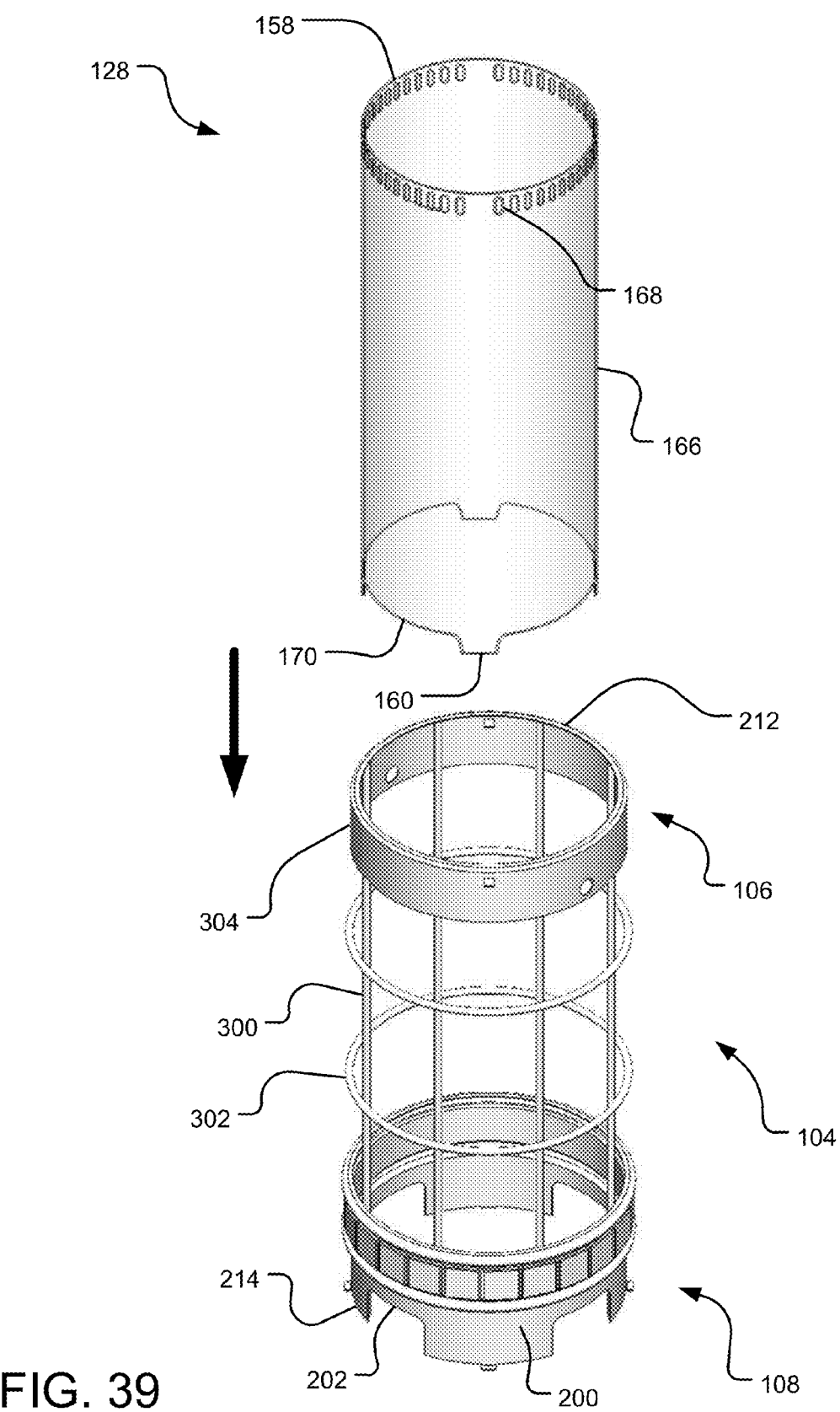
FIGS. 39 and 40 are side perspective views of the reversible insert of FIG. 29 being inserted into the supporting member of FIG. 38, removed and inserted, respectively.
Figure 40:
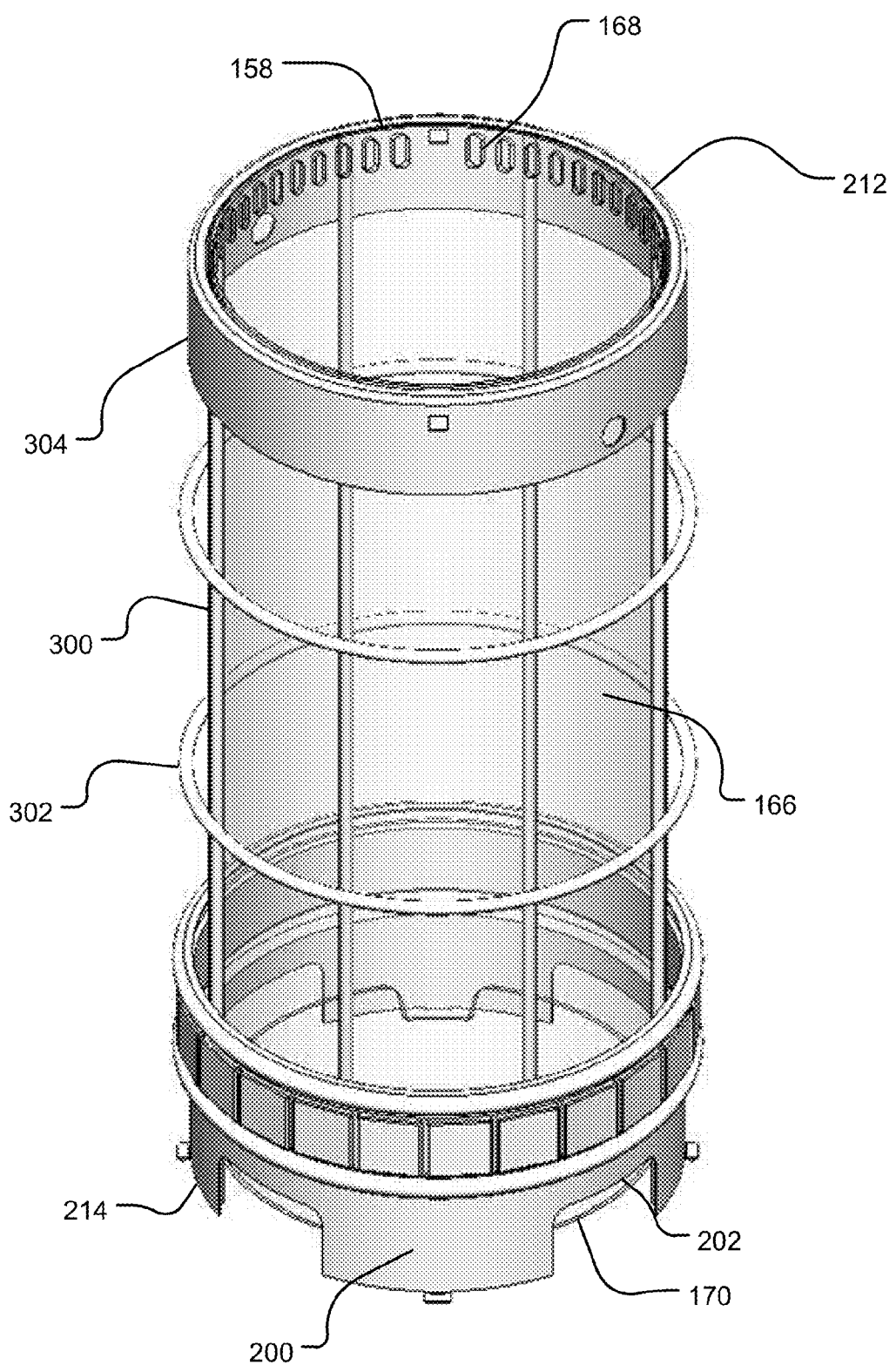
Figure 41:
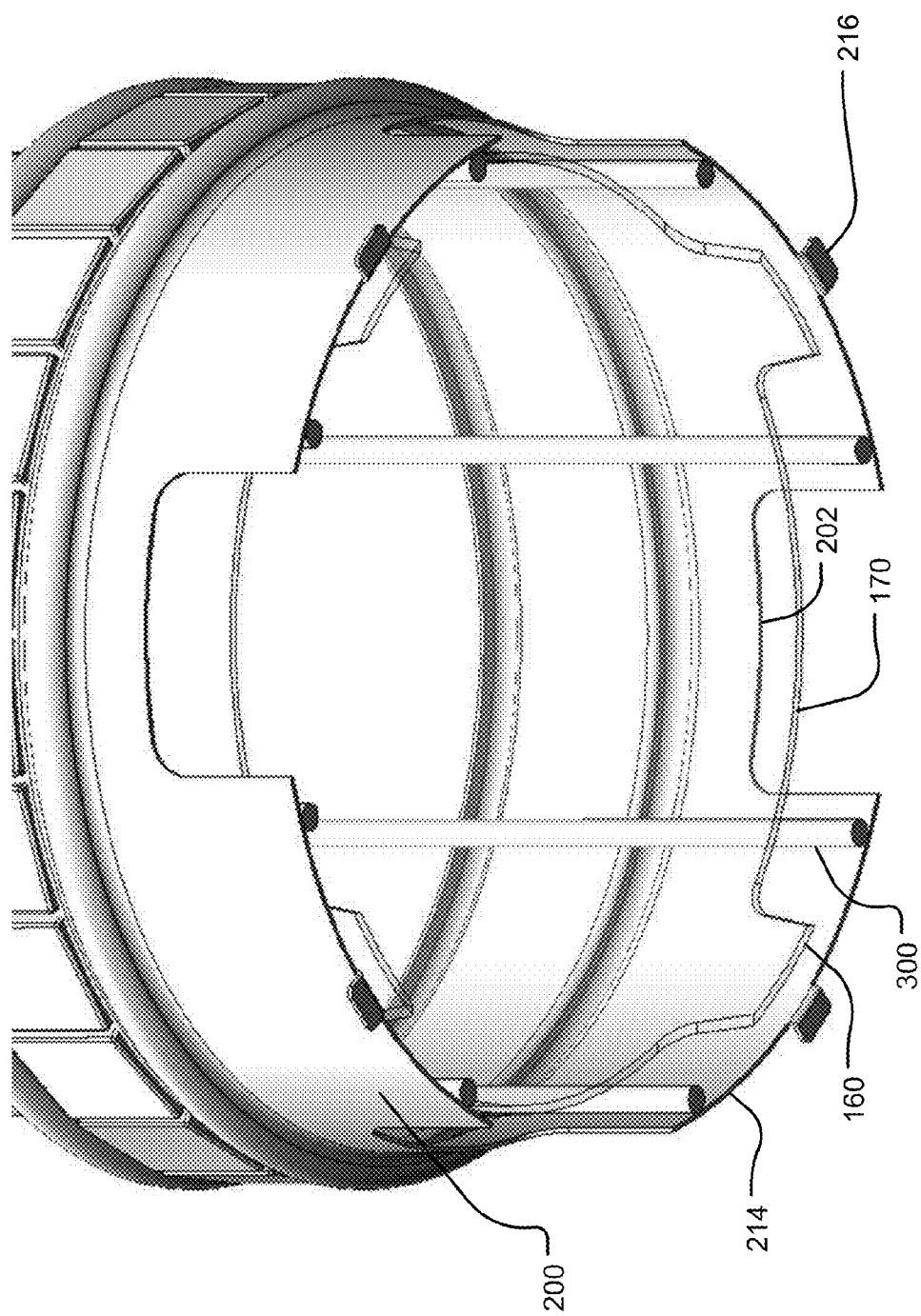
FIG. 41 shows a bottom perspective view of the reversible insert of FIG. 29 inserted into the supporting member of FIG. 38.

As can be understood from FIGS. 39-41, in one implementation, the feeder 100 includes one reversible insert 128, for example as shown in FIGS. 29-30B, configured to be received by the frame. The reversible insert 128 may be sized and shaped to mirror the size and shape of the frame. For example, as shown in FIGS. 39-41, the elongated body 166 of the reversible insert 128 is cylindrical in shape extending from the first edge 158 to the second edge 160 to match the cylindrical shape of the frame, as shown in FIGS. 39-41.

Referring to FIGS. 39-41, to configure the feeder 100 to dispense a desired seed type, in one implementation, the reversible insert 128 is inserted along a length of the elongated rods 300 from the top section 106 until meeting the bottom section 108. As described herein, the reversible insert 128 is removable and invertible, such that the frame is configured to receive the reversible insert 128 in an orientation depending on a size of the bird seed chosen, which dictates the type of birds that will be attracted to the bird feeder.

In one implementation, the orientation includes positioning either the first end 158 or the second end 160 adjacent to the feeding station 110, defined by the slots 202, depending on the size of the bird seed to be dispensed. For large seed, such as sunflower seeds, the orientation includes positioning the second end 160 adjacent to the feeding station 110, such that the large seed is dispensed through the slot(s) 170, and for small seed, such as thistle seeds, the orientation includes positioning the first end 158 adjacent to the feeding station 110, such that the small seed is dispensed through the ports 168.

To position the reversible insert 128, in one implementation, the cap 102 is removed, and the reversible insert 128 is slidably inserted along a length of the elongated rods 300 until meeting the bottom section 108. Once inserted, the reversible insert 128 is held in place by the supporting member 104, the bottom section 108, and/or the top section 106. In one implementation, once inserted, one of the ends 158 or 160 is positioned adjacent to the slots 202 with the other end positioned near the top section 106. In the example shown in FIG. 40, the reversible insert 128 is oriented to dispense large seed, with the second end 160 positioned adjacent to the slots 202. If the user wishes to attract birds that eat smaller seeds, the reversible insert 128 may be removed, inverted, and inserted along a length of the elongated rods 300 until the first end 158 is positioned adjacent to the slots 202. Accordingly, the feeder 100 is convertible between a large seed feeder and a small seed feeder, such that the user may choose which birds to attract.

Figure 42:
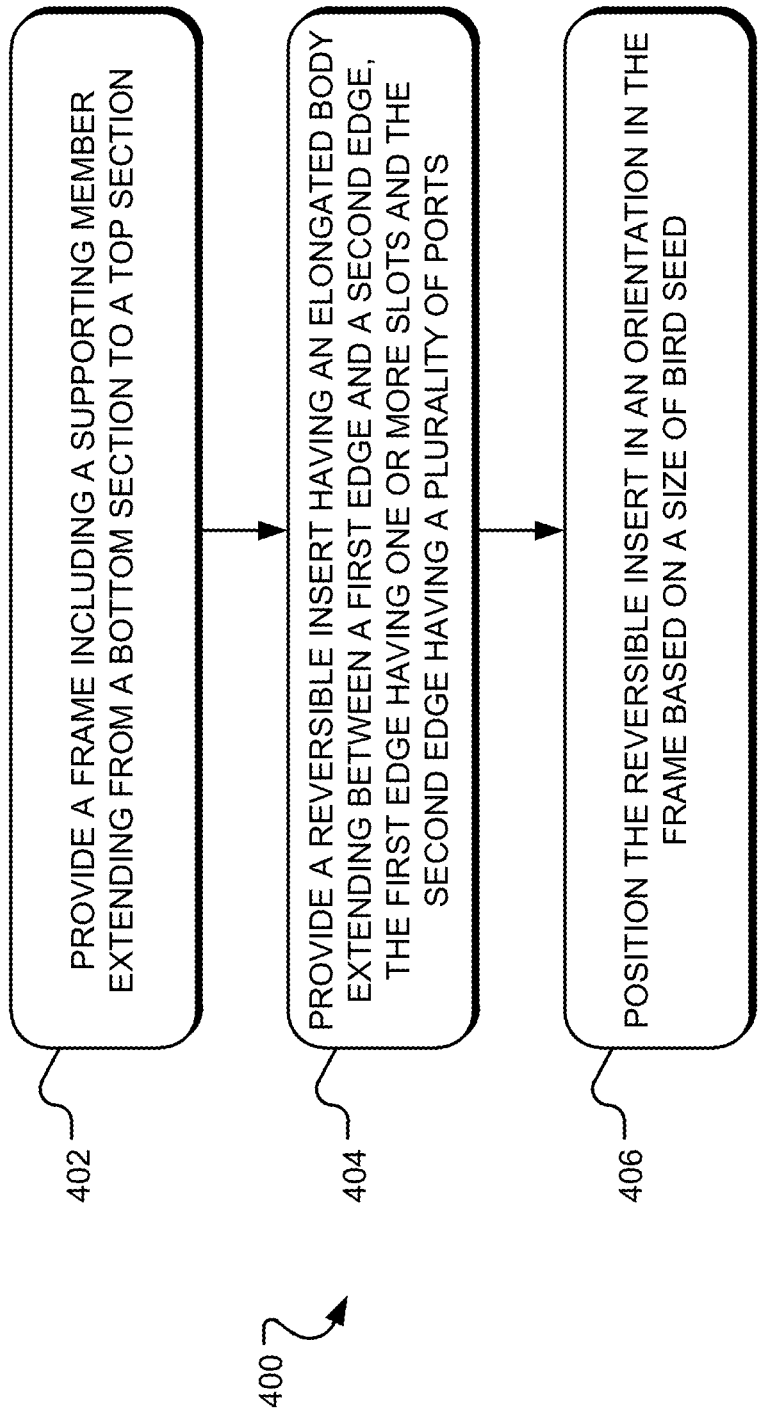
FIG. 42 illustrates example operations for attracting different types of wild birds.

For a detailed description of example operations for attracting different types of wild birds, reference is made to FIG. 42. In one implementation, an operation 402 provides a frame including a supporting member extending from a bottom section to a top section. The supporting member may be, for example, an elongated body, a pair of opposing edge portions, a cage comprising elongated rods, and/or the like. Such examples of the supporting member, as illustrated herein, are exemplary only and not intended to be limiting. In one implementation, the top section is configured to engage a cap, and the bottom section includes at least one feeding station.

An operation 404 provides at least one reversible insert having an elongated body extending between a first edge and a second edge. The first edge includes a plurality of ports configured to dispense small seed, and the second edge includes one or more slots configured to dispense large or mixed seed. The elongated body of the reversible insert(s) may be a variety of shapes, including, without limitation, planar, cylindrical, cubical, pyramidal, and/or the like. An operation 406 positions the reversible insert(s) in an orientation in the frame based on a size of bird seed. To attract smaller birds, such as finches, the orientation of the reversible insert positions the first end having the plurality of ports adjacent to the feeding station. A user may then fill the bird feeder with small seed, which will be dispensed through the ports and accessible from the feeding station by the small birds. To attract larger birds, the orientation of the reversible insert positions the second end having the slot adjacent to the feeding station. A user may then fill the bird feeder with large or mixed seed, which will be dispensed through the slot and accessible from the feeding station by the large birds. As a result, the user is able to choose which birds to attract.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for selectively dispensing bird seed, the method comprising:

holding a reversible insert with a frame in a first vertical orientation, the frame including a support member extending vertically between a top section and a bottom section having at least one feeding station, wherein a perch is positioned adjacent the at least one feeding station, the reversible insert having an elongated body extending between a first edge and a second edge creating a continuous cavity extending from the first edge to the second edge, the first edge disposed on an opposite end of the elongated body from the second edge, the first edge having a plurality of ports in the elongated body sized to dispense a first sized bird seed and the second edge having one or more slots in the elongated body sized to dispense a second sized bird seed different from the first sized bird seed, the first vertical orientation positioning the first edge of the reversible insert adjacent to the feeding station for the plurality of ports to dispense the first sized bird seed;

releasing the reversible insert from the frame based on a selection of the second sized bird seed for dispensing;

receiving the elongated body of the reversible insert inverted into a second orientation based on the selection, the frame receiving the elongated body of the reversible insert; and positioning the second edge adjacent to the feeding station for the one or more slots to dispense the second sized bird seed.

2. The method of claim 1, further comprising:

rereleasing the reversible insert from the frame based on a subsequent selection of the first sized bird seed for dispensing;

receiving the elongated body of the reversible insert reinverted into the first vertical orientation based on the subsequent selection, the frame receiving the elongated body of the reversible insert; and repositioning the first edge adjacent to the feeding station for the one or more slots to dispense the first sized bird seed.

3. The method of claim 1, wherein the reversible insert is released from the frame by sliding.

4. The method of claim 1, wherein the top section is configured to engage a cap.

5. The method of claim 4, wherein the cap includes at least one of: a roof or a lid.

6. The method of claim 1, wherein the first sized bird seed is small and the second sized bird seed is large.

7. The method of claim 1, wherein the elongated body of the reversible insert is made from a transparent material.

8. The method of claim 1, wherein a shape of the elongated body is at least one of: planar, contoured, or cylindrical.

9. The method of claim 1, wherein the supporting member includes at least one of: a cage, a pair of opposing edge portions, or an elongated body.

* * * * *